US012694219B2

(12) United States Patent
Grosset et al.

(10) Patent No.: US 12,694,219 B2
(45) Date of Patent: Jul. 28, 2026

(54) METHOD AND APPARATUS FOR SHAPING DATA IN A GENERAL LEDGER

(71) Applicant: MINDBRIDGE ANALYTICS INC., Ottawa (CA)

(72) Inventors: Robin Neil Grosset, Ottawa (CA); Wing-Leung Chan, Ottawa (CA); Michael Thomas Smith, Ottawa (CA); Corey Matthew Yanofsky, Ottawa (CA)

(73) Assignee: MINDBRIDGE ANALYTICS INC., Ottawa (CA)

( * ) Notice: Subject to any disclaimer, the term of this patent is extended or adjusted under 35 U.S.C. 154(b) by 1207 days.

(21) Appl. No.: 17/098,403

(22) Filed: Nov. 15, 2020

(65) Prior Publication Data

US 2021/0248325 A1 Aug. 12, 2021

Related U.S. Application Data

(63) Continuation of application No. 16/119,708, filed on Aug. 31, 2018, now Pat. No. 10,839,163.

(51) Int. Cl.
*G06F 40/30* (2020.01)
*G06F 16/25* (2019.01)
*G06Q 40/12* (2023.01)

(52) U.S. Cl.
CPC ............ *G06F 40/30* (2020.01); *G06F 16/258* (2019.01); *G06Q 40/12* (2013.12)

(58) Field of Classification Search
CPC ........ G06F 40/30; G06F 16/258; G06F 40/12; G06Q 40/12
See application file for complete search history.

(56) References Cited

U.S. PATENT DOCUMENTS

| | | | | |
|---|---|---|---|---|
| 5,189,608 A ‡ | 2/1993 | Lyons | .................. | G06F 17/246 |
| | | | | 705/30 |
| 6,442,533 B1 * | 8/2002 | Hinkle | ................ | G06Q 40/025 |
| | | | | 705/37 |
| 6,714,918 B2 | 3/2004 | Hullmer et al. | | |
| 7,113,932 B2 ‡ | 9/2006 | Tayebnejad | ........... | G06Q 40/08 |
| | | | | 706/15 |

(Continued)

*Primary Examiner* — Thierry L Pham
(74) *Attorney, Agent, or Firm* — Sean Murray; Murray IP Consulting Inc.

(57) ABSTRACT

Methods are provided for semantic processing of data files including detecting formats of data embedded in the data files and converting the data to formats compatible with a data analysis tool. The method may comprise semantically analyzing components of the data files to assess formatting across a required set of criterions needed by the data analysis tool and determining sets of data manipulation operations to perform to convert the data file to a compatible format. Semantic analysis of values in criterions across data entries may allow for groups of entries to be associated together with transaction ID values common to and unique to the groups of entries associated with a common transaction. The method may group data entries based on values in criterions, test potential groupings based on a behavior test to assess characteristics of entries when grouped in the proposed manner, and generate a new transaction ID criterion in each of the data entries.

27 Claims, 11 Drawing Sheets

(56)                  References Cited

U.S. PATENT DOCUMENTS

| | | | | |
|---|---|---|---|---|
| 7,143,066 B2 ‡ | 11/2006 | Shear | ............... | G06Q 20/3674 |
| | | | | 705/54 |
| 7,418,415 B1 | 8/2008 | Wasserman | | |
| 8,065,233 B2 | 11/2011 | Lee et al. | | |
| 8,191,053 B2 | 5/2012 | Grimaldi et al. | | |
| 8,290,834 B2 * | 10/2012 | Mundy | ............... | G06Q 30/06 |
| | | | | 705/30 |
| 8,924,269 B1 * | 12/2014 | Seubert | ............... | G06Q 40/00 |
| | | | | 705/35 |
| 10,019,468 B1 | 7/2018 | Day et al. | | |
| 10,115,106 B2 | 10/2018 | Peace et al. | | |
| 10,459,820 B2 * | 10/2019 | Sykora | ............... | G06F 11/3457 |
| 10,491,748 B1 | 11/2019 | Wu et al. | | |
| 10,497,065 B1 | 12/2019 | Sheehy et al. | | |
| 10,581,613 B2 | 3/2020 | Ford et al. | | |
| 10,608,910 B2 | 3/2020 | Moeller | | |
| 2002/0133721 A1 ‡ | 9/2002 | Adjaoute | ............. | G06Q 20/4016 |
| | | | | 726/23 |
| 2002/0161731 A1 ‡ | 10/2002 | Tayebnejad | ............. | G06Q 40/08 |
| | | | | 706/20 |
| 2002/0184148 A1 ‡ | 12/2002 | Kahn | ............... | G06Q 40/12 |
| | | | | 705/40 |
| 2003/0069820 A1 ‡ | 4/2003 | Hillmer | ............. | G06Q 20/4016 |
| | | | | 705/35 |
| 2003/0182214 A1 | 9/2003 | Taylor | | |
| 2005/0002399 A1 ‡ | 1/2005 | Peterson | ............. | G06F 9/5083 |
| | | | | 370/392 |

| | | | | |
|---|---|---|---|---|
| 2005/0222929 A1 * | 10/2005 | Steier | ............... | G06Q 40/00 |
| | | | | 705/35 |
| 2005/0288920 A1 | 12/2005 | Green et al. | | |
| 2006/0004814 A1 | 1/2006 | Lawrence et al. | | |
| 2006/0004866 A1 | 1/2006 | Lawrence et al. | | |
| 2007/0094067 A1 * | 4/2007 | Kumar | ............. | G06Q 30/0201 |
| | | | | 705/26.2 |
| 2007/0106754 A1 ‡ | 5/2007 | Moore | ............... | G06F 21/604 |
| | | | | 709/217 |
| 2008/0046334 A1 ‡ | 2/2008 | Lee | ............... | G06Q 20/4016 |
| | | | | 705/318 |
| 2008/0256523 A1 | 10/2008 | Grimaldi et al. | | |
| 2008/0306808 A1 * | 12/2008 | Adjali | ............. | G06Q 30/0204 |
| | | | | 705/7.41 |
| 2010/0250338 A1 * | 9/2010 | Banerjee | ............. | G06Q 40/12 |
| | | | | 705/16 |
| 2011/0029490 A1 * | 2/2011 | Agarwal | ............. | G06F 9/467 |
| | | | | 712/228 |
| 2014/0344898 A1 * | 11/2014 | Chen | ............... | G06Q 20/40 |
| | | | | 726/4 |
| 2016/0364794 A1 * | 12/2016 | Chari | ............... | G06Q 40/02 |
| 2017/0236216 A1 * | 8/2017 | Sarkar | ............... | G06Q 20/405 |
| | | | | 705/30 |
| 2019/0005408 A1 * | 1/2019 | Tolpin | ............... | G06N 3/08 |
| 2019/0108440 A1 * | 4/2019 | Adib | ............... | G06N 3/0445 |
| 2019/0188579 A1 * | 6/2019 | Manoharan | ........ | G06Q 20/4016 |
| 2019/0205993 A1 * | 7/2019 | Rodriguez | ............. | H04L 67/535 |
| 2021/0042724 A1 * | 2/2021 | Rathod | ............... | G07G 1/0054 |

* cited by examiner

‡ imported from a related application

METHOD AND APPARATUS FOR SHAPING DATA IN A GENERAL LEDGER

CROSS-REFERENCE TO RELATED APPLICATION

The present application claims the benefit under 35 U.S.C. 120, as a continuation of U.S. patent application Ser. No. 16/119,708, filed on Aug. 31, 2018, which is hereby incorporated by reference herein.

FIELD OF THE INVENTION

The invention relates generally to shaping data processes and, more particularly, to method and apparatus for shaping data in a general ledger.

BACKGROUND OF THE INVENTION

Traditional audits of financial data are a very manual process which requires significant time exerted by accounting professionals. The accountants involved in an audit will typically sample the financial data and attempt to isolate data sets and transactions that could potentially highlight an increased risk of improper activities or accounting practises. The isolated transactions may lead to questions for the business that generated the transactions to determine if the transactions abide by Generally Accepted Accounting Principles (GAAP) and whether there are issues related to improper process, data entry or potentially intentional manipulation or fraud. Key problems with traditional audits are that they require significant high cost professional labor to rigorously review financial data and typically only a very small sample of the financial data is reviewed. Unless a full forensic audit is conducted, sampling of the financial data is limited which reduces the potential to identify and isolate the transactions with the highest risk of improper activities.

Recently, data analysis tools have been developed to assist accounting professionals with audits of financial data, herein referred to as audit assistance systems. These audit assistance systems can be used to review large amounts of financial data to identify anomalies in the transactions that may require closer analysis by an accounting professional. This two-stage process can reduce the amount of brute force labor required to review the financial data and can allow the accounting professionals to focus their energy on the transactions identified as the highest risk of improper activities.

In order to properly operate, the audit assistance software systems require the financial data to be formatted in a specific manner so the software understands the accounts each transaction belongs to and the interactions between the various transactions in the financial data. Unfortunately, businesses use a wide range of accounting systems for managing their financial data and those inputting the data into these accounting systems may use a wide range of processes, nomenclature and database management techniques to enter the data. The accounting systems used by businesses to manage financial data may be off-the-shelf programs with relatively standard data formatting systems or may be custom built programs with proprietary data formatting systems. Further, the accounting systems used may only allow for an incomplete set of data to be export for analysis. Yet further, the sheer fact that a large portion of the financial data is entered by humans means that the entry of the data may not be consistent over time or across users.

Prior to being processed by an audit assistance software system, financial data may be reviewed by a database professional and modified to enable the software system to properly understand the transactions and the interactions between transactions that make up the financial data. This manual process can be significantly time consuming and cost prohibitive and, since it is limited by the skills of the database professional, the resulting format of the financial data may still not be sufficient to be processed successfully by the audit assistance software system.

Against this background, there is a need for solutions that will mitigate at least one of the above problems, particularly an improved system for shaping data prior to a data analysis tool.

SUMMARY OF THE INVENTION

Provided are method and apparatus for semantic processing of a data file by a data ingress tool including detecting a format of data embedded in the data file and converting the data to a format compatible with a data analysis tool. The data file may comprise a plurality of distinct entries that include values across a plurality of criterions. The data ingress tool may be operable to semantically analyze the components of the data file to assess formatting across a required set of criterions needed by the data analysis tool and determine a set of data manipulation operations to perform to convert the data file to a format compatible with the data analysis tool. In some embodiments of the present invention, semantic analysis of values in one or more criterions across the plurality of entries may allow the data ingress tool to associate groups of entries together with transaction ID values common to and unique to the group of entries associated with a common transaction. In some cases, the data ingress tool may group data entries based on values in one or more criterions, test potential groupings based on a behavior test to assess characteristics of entries when grouped in the proposed manner, and generate a new transaction ID criterion in each of the data entries if the behavior test is sufficient based on the assessed characteristics of entries when grouped in the proposed manner.

According to a first broad aspect, the present invention is a method implemented by a computing apparatus for shaping data into a desired data format for a data analysis tool. The method comprises: receiving a first data set comprising a plurality of data entries organized in a first data format, each of the data entries comprising a value for each of a plurality of criterions; determining a semantic understanding for each of the criterions based on analysis of signifiers in the values for the criterion; determining a plurality of data manipulation operations based on the semantic understanding for each of the criterions in order to convert the first data set into the desired data format for the data analysis tool; and conducting the plurality of data manipulation operations on the first data set.

In some embodiments, determining the semantic understanding for a first one of the criterions may comprise comparing signifiers in the values for the first criterion across a set of the data entries to identify patterns consistent with one of a plurality of required criterions for the data analysis tool. In this case, determining the semantic understanding for the first criterion may comprise determining the first criterion is a temporal criterion based on the comparison of the signifiers in the values for the first criterion across the set of data entries; and the data manipulation operations may comprise reformatting the values of the first criterion for each of the data entries into a temporal format understood by the data analysis tool. Comparing the signifiers in the values for the first criterion across the set of data entries may comprise determining a numeric range of signifiers for each of a plurality of subsets of signifiers in the values and determining a temporal period represented by each of the subsets of signifiers based on their respective numeric ranges. Comparing the signifiers in the values for the first criterion across the set of data entries may comprise determining a frequency of change of signifiers for each of a plurality of subsets of signifiers in the values and determining a temporal period represented by each of the subsets of signifiers based on their respective frequency of change.

In some embodiments, determining the semantic understanding for a first one of the criterions may comprise comparing signifiers in values for the first criterion to signifiers in values known to be associated with a particular criterion; and, if the signifiers in the values for the first criterion and the signifiers in the values known to be associated with a particular criterion are similar, determining the first criterion is the particular criterion. In this case, the method may further comprise accessing values known to be associated with the particular criterion from a database containing one or more sets of values known to be associated with respective criterions. In some cases, the values known to be associated with the particular criterion may be learned values from semantically understanding criterion in one or more previously analysed data files.

In some embodiments, determining the semantic understanding for a first one of the criterions may comprise comparing signifiers in values for the first criterion to a known format associated with a particular criterion; and, if the signifiers in the values for the first criterion are in the known format, determining the first criterion is the particular criterion. In this case, the method may further comprise accessing the known format associated with the particular criterion from a database containing one or more known formats associated with respective criterions. In some cases, the known format associated with the particular criterion may be learned from semantically understanding criterion in one or more previously analysed data files.

In some embodiments, determining the semantic understanding for each of the criterion may comprise identifying a first one of the criterions as a grouping criterion based upon grouping headers that divide the data entries into groups based on common values for the grouping criterion. In this case, the data manipulation operations may comprise, for each of the groups, adding the common value for the grouping criterion to each of the data entries in the group and deleting the grouping header.

In some embodiments, determining the semantic understanding for a first one of the criterions may comprise determining that the first criterion is a monetary amount criterion based on identifying numeric signifiers in each of the values for the first criterion and identifying a negative indication signifier in a portion of the values for the first criterion. In this case, the data manipulation operations may comprise reformatting the values of the first criterion for each of the data entries into a monetary amount format understood by the data analysis tool.

In some embodiments, determining the semantic understanding for a first one of the criterions may comprise sorting data entries by values for the first criterion and determining if groups of data entries with a common value for the first criterion meet a validation test for the first criterion to be a transaction identifier criterion that link a plurality of data entries to each of a plurality of transactions. In this case, the validation test may be met if the data entries in each of the groups have values for a financial amount criterion that sum to zero; whereby the data entries in each of the groups balance. Further, the validation test may be met if a confidence level is met for the data entries in each of the groups being associated with a common transaction.

In some embodiments, determining a semantic understanding for each of the criterions may comprise identifying one or more data signature characteristics associated with a known data format in the first data set. In this case, determining a plurality of data manipulation operations may comprise determining a predefined set of data manipulation operations associated with the known data format to convert data of the known data format to the desired data format for the data analysis tool.

In some implementations, the method may further comprise truncating each of the data entries in the first data set to remove values for one or more criterions not required by the data analysis tool; and transmitting the truncated first data set to a computing apparatus operable to apply the data analysis tool on the truncated first data set.

According to a second broad aspect, the present invention is a computing apparatus for shaping data into a desired data format for a data analysis tool, the computing apparatus comprising a processing entity. The processing entity is operable to receive a first data set comprising a plurality of data entries organized in a first data format, each of the data entries comprising a value for each of a plurality of criterions; determine a semantic understanding for each of the criterions based on analysis of signifiers in the values for the criterion; determine a plurality of data manipulation operations based on the semantic understanding for each of the criterions in order to convert the first data set into the desired data format for the data analysis tool; and conduct the plurality of data manipulation operations on the first data set.

In some embodiments, to determine the semantic understanding of a first one of the criterions, the processing entity may be operable to compare signifiers in the values for the first criterion across a set of the data entries to identify patterns consistent with one of a plurality of required criterions for the data analysis tool. In some cases, to determine the semantic understanding of a first one of the criterions, the processing entity may be operable to compare signifiers in values for the first criterion to signifiers in values known to be associated with a particular criterion; and, if the signifiers in the values for the first criterion and the signifiers in the values known to be associated with a particular criterion are similar, determine the first criterion is the particular criterion. In some cases, to determine the semantic understanding of a first one of the criterion, the processing entity may be operable to compare signifiers in values for the first criterion to a known format associated with a particular criterion; and, if the signifiers in the values for the first criterion are in the known format, determine the first criterion is the particular criterion.

In some embodiments, to determine the semantic understanding of each of the criterion, the processing entity may be operable to identify a first one of the criterions as a grouping criterion based upon grouping headers that divide the data entries into groups based on common values for the grouping criterion. In this case, the data manipulation operations may comprise, for each of the groups, adding the common value for the grouping criterion to each of the data entries in the group and deleting the grouping header.

In some embodiments, to determine the semantic understanding of a first one of the criterion, the processing entity may be operable to sort data entries by values for the first criterion and determine if groups of data entries with a common value for the first criterion meet a validation test for the first criterion to be a transaction identifier criterion that link a plurality of data entries to each of a plurality of transactions.

In some embodiments, to determine a semantic understanding for each of the criterions, the processing entity may be operable to identify one or more data signature characteristics associated with a known data format in the first data set. In this case, to determine a plurality of data manipulation operations, the processing entity may be operable to determine a predefined set of data manipulation operations associated with the known data format to convert data of the known data format to the desired data format for the data analysis tool.

In some implementations, the computing apparatus further comprises a network adaptor coupled to the processing entity. In this case, the processing entity may be operable to transmit the modified first data set to a network computing apparatus via the network adaptor, the network computing apparatus operable to apply the data analysis tool on the modified first data set. Further, the processing entity may be operable to truncate each of the data entries in the first data set to remove values for one or more criterions not required by the data analysis tool prior to transmitting the modified first data set to the network computing apparatus.

According to a third broad aspect, the present invention is a non-transitory computer-readable media containing a program element executable by a computing system to perform a method for shaping data into a desired data format for a data analysis tool. The computer-readable media comprises first, second, third and fourth program code. The first program code is for receiving a first data set comprising a plurality of data entries organized in a first data format, each of the data entries comprising a value for each of a plurality of criterions. The second program code is for determining a semantic understanding for each of the criterions based on analysis of signifiers in the values for the criterion. The third program code is for determining a plurality of data manipulation operations based on the semantic understanding for each of the criterions in order to convert the first data set into the desired data format for the data analysis tool. The fourth program code is for conducting the plurality of data manipulation operations on the first data set. In some embodiments, the computer-readable media may further comprise fifth program code for truncating each of the data entries in the first data set to remove values for one or more criterions not required by the data analysis tool; and sixth program code for transmitting the truncated first data set to a computing apparatus operable to apply the data analysis tool on the truncated first data set.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the invention is provided herein below, by way of example only, with reference to the accompanying drawings, in which.

Figure 1A:
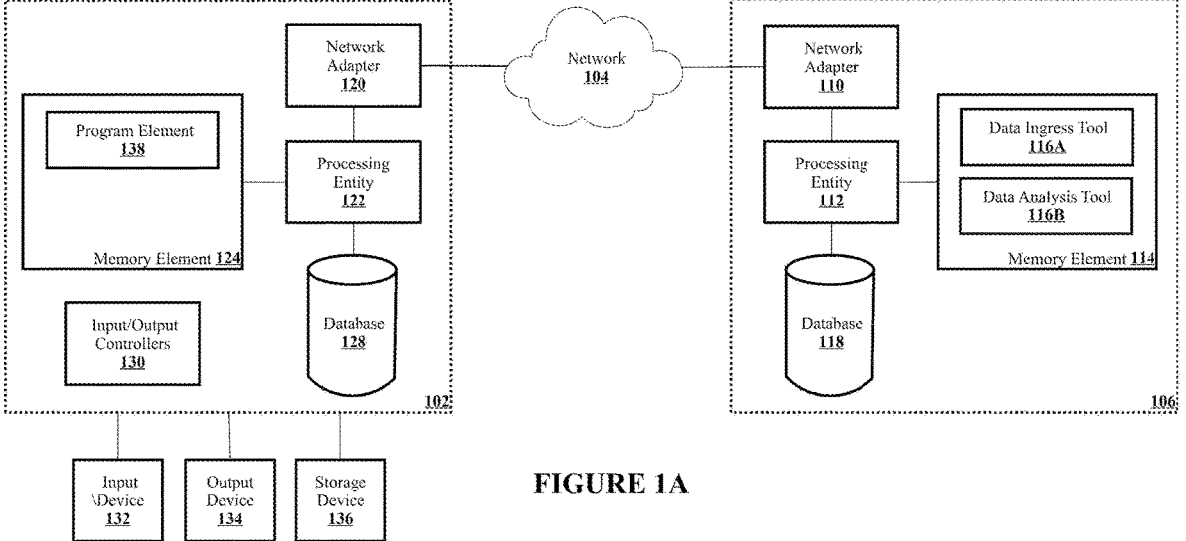
FIGS. 1A, 1B, 1C and 1D are architecture block diagrams of client computing apparatus and network computing apparatus according to embodiments of the present invention.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Embodiments of the present invention relate to semantic processing of a data file by a data ingress tool including detecting a format of data embedded in the data file and converting the data to a format compatible with a data analysis tool. The data file may comprise a plurality of distinct entries that include values across a plurality of headers or criterions, though alternative data structures may be used. The data ingress tool may be operable to detect a signature in the data file that indicates a predetermined format for the data file and a predetermined set of data manipulation operations to perform to convert the data file to a format compatible with the data analysis tool. If a signature is not detected associated with a predetermined format, the data ingress tool may be operable to semantically analyze the components of the data file to assess formatting across a required set of criterions needed by the data analysis tool and determine a set of data manipulation operations to perform to convert the data file to a format compatible with the data analysis tool.

The data ingress tool may conduct semantic analysis on labels or criterion indications associated with the criterions in the data file in order to identify and/or isolate one or more of the required criterions needed by the data analysis tool. The data ingress tool may conduct semantic analysis on values expected to be in the same criterion across a plurality of entries. This semantic analysis on values linked to the same criterion may allow the data ingress tool to determine a criterion indication for the values and a set of data manipulation operations that may be necessary to convert the values to a format compatible with the data analysis tool. Further, the semantic analysis on values in the data file may allow the data ingress tool to identify entries that have been grouped together by a particular value for a criterion and to determine a set of data manipulation operations that may be necessary to ungroup the entries.

Yet further, in some embodiments of the present invention, semantic analysis of values in one or more criterions across the plurality of entries may allow the data ingress tool to associate groups of entries together with transaction ID values common to and unique to the group of entries associated with a common transaction, wherein the transaction ID values may sometimes be referred to as journal entry ID values. In some cases, through semantic analysis, the data ingress tool may determine one criterion can be used as a transaction ID criterion and the value associated with this criterion in each data entry can be used as a transaction ID value. The determination that a particular criterion can be used as a transaction ID criterion can be made by the data ingress tool in a number of manners as will be described including using a behavior test to assess characteristics of entries when grouped by the potential transaction ID values. In some cases, instead of using an existing criterion in the data entries, the data ingress tool may group data entries into potential transaction groups based on values in one or more other criterions, test the potential transaction groups based on a behavior test to assess characteristics of entries when grouped in the proposed manner, and generate a new transaction ID criterion in each of the data entries if the behavior test is sufficient based on the assessed characteristics of entries when grouped in the proposed manner.

FIGS. 1A, 1B, 1C and 1D are architecture block diagrams according to embodiments of the present invention. As depicted, a client computing apparatus 102 is coupled to a network computing apparatus 106 via a network 104. The network 104 may be an Internet Protocol (IP) based network and the client computing apparatus 102 and the network computing apparatus 106 may be operable to communicate over an IP-based network. The network computing apparatus 106 may be a real or virtual instance of an Internet based server in a system that performs computation that may be connected to one or more remote clients. In some embodiments, the network computing apparatus 106 may be a locally based server which serves a similar function.

Figure 1B:
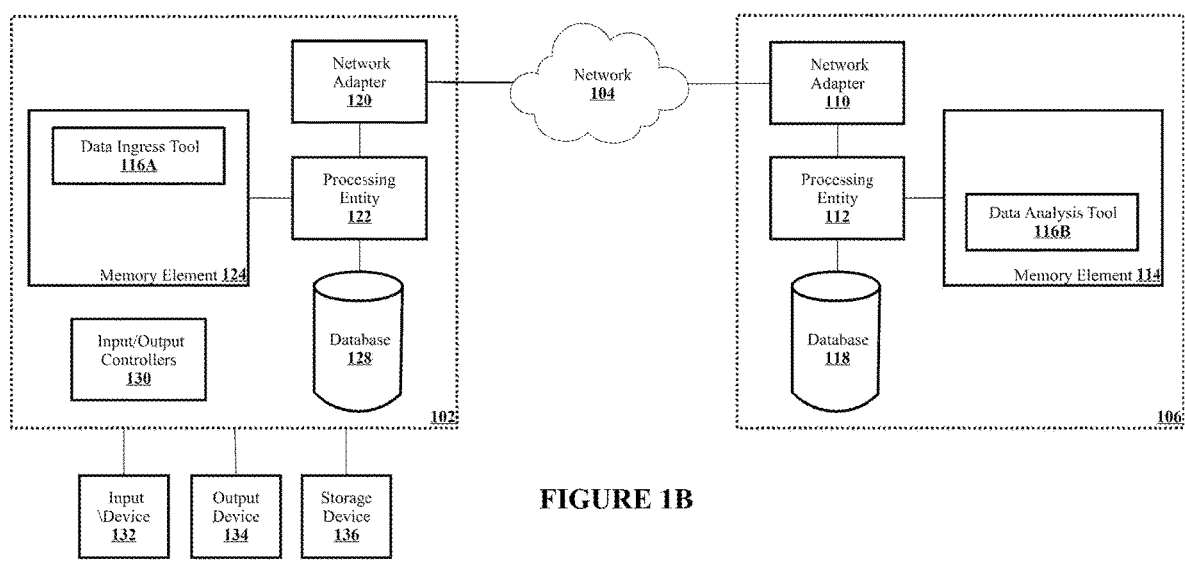
Figure 1C:
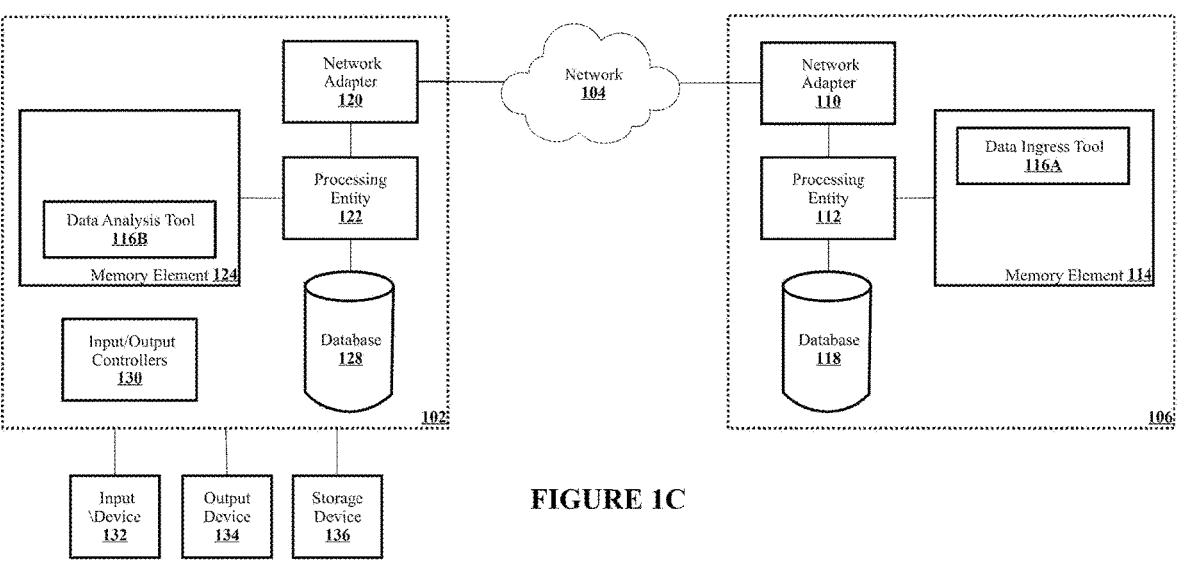
Figure 1D:
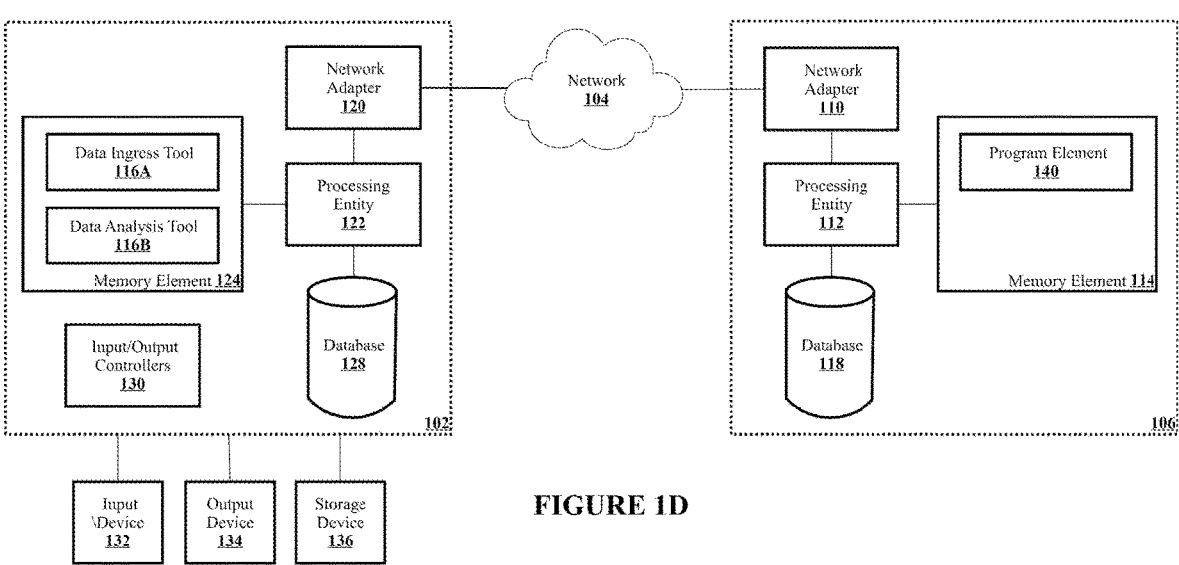

In FIGS. 1A-1D, the network computing apparatus 106 comprises a network adaptor 110 coupled to the network 104, a processing entity 112, a memory element 114 and a database 118. In this specific architecture, the processing entity 112 is coupled to the network adaptor 110, the memory element 114 and the database 118 and the processing entity 112 may operate software programs and access each of the coupled elements to perform specific functions. In FIG. 1A, the memory element 114 is shown to contain software programs referred to as data ingress tool 116A and data analysis tool 116B. In FIG. 1B, the memory element 114 is shown to contain only the software program referred to as the data analysis tool 116B, while, in FIG. 1C, the memory element 114 is shown to contain only the software program referred to as the data ingress tool 116A. In FIG. 1D, the memory element 114 is shown to contain neither of the software programs 116A, 116B but instead program element 140. The software programs 116A, 116B and 140 will be described in more detail herein.

The processing entity 112 may comprise various physical forms including one or more multi-purpose microprocessors capable of performing large numbers of computing operations simultaneously. The network adaptor 110 may comprise one or more components coupled to one or more networks, capable of operating as a gateway for the processing entity 112 to the network 104 or other public or private data networks. The memory element 114 may comprise one or more physical components locally implemented (as shown) or remotely accessible. Although showing the memory element 114 containing the data ingress tool 116A, the data analysis tool 116B and/or the program element 140, it should be understood that separate memory elements may comprise the software programs 116A, 116B, 140 and one or more of the programs 116A, 116B, 140 could be stored in duplicate memory elements or distributed across a plurality of memory elements. Further, the memory element 114 may comprise other software programs related or unrelated to embodiments of the present invention. The database 118 may contain a plurality of different data references and instructions that may be used by the processing entity 112, including, but not limited, to references for comparison and predetermined data manipulation operations that be used to process a data file.

Further, as depicted in FIGS. 1A-1D, the client computing apparatus 102 comprises a network adaptor 120 coupled to the network 104, a processing entity 122, a memory element 124, a database 128 and a set of input/output controllers 130. In the specific architecture of FIGS. 1A-1D, the processing entity 122 is coupled to the network adaptor 120, the memory element 124 and the database 128 and the processing entity 122 may operate software programs and access each of the coupled elements to perform specific functions. In FIG. 1A, the memory element 124 in the client computing apparatus 102 is shown to comprise a program element 138. In FIG. 1B, the memory element 124 is shown to contain only the data ingress tool 116A, while, in FIG. 1C, the memory element 124 is shown to contain only the data analysis tool 116B. In FIG. 1D, the memory element 124 is shown to contain both the data ingress tool 116A and the data analysis tool 116B.

The client computing apparatus 102 is coupled to an input device 132, an output device 134 and a storage device 136. The input device 132 may comprise a variety of user interface devices operable to allow user information or selections to be processed by the processing entity 122, including, but not limited to, a keyboard, a mouse, a microphone and an external disk drive. The output device 134 may comprise a variety of devices operable to allow information to be output from the client computing apparatus, including, but not limited to, a display, a printer, a speaker and an external disk drive. The storage device 136 may comprise a variety of memory storage devices either local to the client computing apparatus 102 or remote via a network. The input/output controllers 130 may be used by the processing entity 122 to interface with the input device 132, output device 134 and/or storage device 136 as one skilled in the art would understand for a computing apparatus.

Similar to the processing entity 112, the processing entity 122 may comprise various physical forms including one or more multi-purpose microprocessors capable of performing large numbers of computing operations simultaneously. The network adaptor 110 may comprise one or more components coupled to one or more networks, capable of operating as a gateway for the processing entity 122 to the network 104 or other public or private data networks. The memory element 124 may comprise one or more physical components locally implemented (as shown) or remotely accessible. Although showing the memory element 124 containing the program element 138, the data ingress tool 116A and/or the data analysis tool 116B, it should be understood that these software programs could be stored in duplicate memory elements or distributed across a plurality of memory elements. Further, the memory element 124 may comprise other software programs related or unrelated to embodiments of the present invention. The database 128 may contain a plurality of different data references and instructions that may be used by the processing entity 122, including, but not limited, to references for comparison and predetermined data manipulation operations that be used to process a data file.

In a first operational scenario with reference to FIG. 1A, the client computing apparatus 102 may engage with the program element 138 and transmit a data file for data analysis via the network 104 to the network computing apparatus 106. In this case, the program element 138 may be a user interface program for accessing network-based applications such as web browser or may comprise a proprietary software program used specifically to access the network-based software programs such as the data ingress tool 116A and/or the data analysis tool 116B. The data file may have been saved on the memory element 124, the database 130 or another local or remote data storage element or may have been received by the client computing apparatus 102 via the input device 132. The processing entity 112 may receive the data file via the network adaptor 110 and store the received data file in a memory element such as the memory element 114 or alternatively in a database such as the database 118. The processing entity 112 may then process the data file using the data ingress tool 116A which may include conducting one or more data manipulation operations on data entries in the data file in order to make the data file compatible with the data analysis tool 116B. Once the processing entity 112 ensures the data file is compatible with the data analysis tool 116B using the data ingress tool 116A, the processing entity 112 may then process the compatible data file using the data analysis tool 116B. Once the processing entity 112 has completed the processing of the data file using the data analysis tool 116B, the processing entity 112 may report information concerning the data analysis tool 116B to the client computing apparatus 102 via the network adaptor 110 and the network 104. The program element 138, or another program element on the memory element 124 may allow the client computing apparatus 102 to display the reported information, to output the reported information to the output device 134 (display, printer, etc) or the storage device 136, or may trigger further actions in response to the reported information such as initiating further data analysis. In other cases, information concerning the data analysis tool 116B may not be transmitted to the client computing apparatus 102 but instead to a third party for review and/or further analysis.

In FIG. 1B, the data ingress tool 116A is operated by the client computing apparatus 102 and the data analysis tool 116B is operated by the network computing apparatus 106. In a second operational scenario with reference to FIG. 1B, the processing entity 122 in the client computing apparatus 102 may receive a data file from the input device 132 or from a network based source or access a data file stored on a memory element such as the memory element 124 or a database such as the database 128. The processing entity 122 may then process the data file using the data ingress tool 116A which may include conducting one or more data manipulation operations on data entries in the data file in order to make the data file compatible with the data analysis tool 116B. Once the processing entity 122 ensures the data file is compatible with the data analysis tool 116B using the data ingress tool 116A, the processing entity 122 may then transmit the compatible data file to the network computing apparatus 106 via the network adaptor 120 and the network 104. The processing entity 112 may receive the data file compatible with the data analysis tool 116B via the network adaptor 110 and store the received data file in a memory element such as the memory element 114 or in a database such as the database 118. The processing entity 112 in the network computing apparatus 106 may then use the data analysis tool 116B to analyze the compatible data file. Once the processing entity 112 has completed the processing of the data file using the data analysis tool 116B, the processing entity 112 may report information concerning the data analysis tool 116B to the client computing apparatus 102 via the network adaptor 110 and the network 104. A program element such as the program element 138 may allow the client computing apparatus 102 to display the reported information, to output the reported information to the output device 134 (display, printer, etc) or the storage device 136, or may trigger further actions in response to the reported information such as initiating further data analysis. In other cases, information concerning the data analysis tool 116B may not be transmitted to the client computing apparatus 102 but instead to a third party for review and/or further analysis.

In FIG. 1C, the data ingress tool 116A is operated by the network computing apparatus 106 and the data analysis tool 116B is operated by the client computing apparatus 102. In a third operational scenario with reference to FIG. 1C, the client computing apparatus 102 may transmit a data file for data analysis via the network 104 to the network computing apparatus 106. The processing entity 112 may receive the data file via the network adaptor 110 and store the received data file in a memory element such as the memory element 114 or in a database such as the database 118. The processing entity 112 may then process the data file using the data ingress tool 116A which may include conducting one or more data manipulation operations on data entries in the data file in order to make the data file compatible with the data analysis tool 116B. Once the processing entity 112 ensures the data file is compatible with the data analysis tool 116B using the data ingress tool 116A, the processing entity 112 may then transmit the compatible data file back to the client computing apparatus 102 via the network adaptor 110 and the network 104. The processing entity 122 in the client computing apparatus 102 may then use the data analysis tool 116B to analyze the compatible data file. Once the processing entity 122 has completed the processing of the data file using the data analysis tool 116B, the processing entity 122 may report information and output the reported information to the output device 134 (display, printer, etc) or the storage device 136, or may trigger further actions in response to the reported information such as initiating further data analysis.

In FIG. 1D, the data ingress tool 116A and the data analysis tool 116B are operated by the client computing apparatus 102 and the network computing apparatus 106 operates the program element 140. The program element 140 may be used to allow the processing entity 112 in the network computing apparatus 106 to interface with the data ingress tool 116A and/or the data analysis tool 116B operating in the client computing apparatus 102. In particular, the program element 140 operating on the processing entity 112 may allow the processing entity 122 to initially download the data ingress tool 116A and/or the data analysis tool 116B; to update the data ingress tool 116A and/or the data analysis tool 116B; and to access references and predetermined and/or learned lists maintained in the database 118. Further, the program element 140 may authorize the processing entity 122 to use the data ingress tool 116A and/or the data analysis tool 116B in order for a per usage payment structure could be implemented.

In a fourth operational scenario with reference to FIG. 1D, the processing entity 122 in the client computing apparatus 102 may receive a data file from the input device 132 or from a network based source or access a data file stored on a memory element such as the memory element 124 or a database such as the database 128. The processing entity 122 may process the data file using the data ingress tool 116A which may include conducting one or more data manipulation operations on data entries in the data file in order to make the data file compatible with the data analysis tool 116B. Once the processing entity 122 ensures the data file is compatible with the data analysis tool 116B using the data ingress tool 116A, the processing entity 122 may then use the data analysis tool 116B to analyze the compatible data file. Once the processing entity 122 has completed the processing of the data file using the data analysis tool 116B, the processing entity 122 may report information and output the reported information to the output device 134 (display, printer, etc) or the storage device 136, or may trigger further actions in response to the reported information such as initiating further data analysis. The processing entity 122 may access references, predetermined lists, updates and/or other centrally managed information from the database 118 in the network computing apparatus 106 during the operation of the data ingress tool 116A and/or the data analysis tool 116B. Alternatively, the processing entity 122 may access such information from its own database 128 if stored locally.

Although the network architectures of FIGS. 1A, 1B, 1C and 1D depict four potential network structures for the implementation of the present invention, it should be understood that they are not meant to limit the scope of the present invention. The particular physical components including processing entities, memory elements, databases, network adaptors and other network and interface components may be implemented. The methods of the present invention may be implemented centrally, remotely or across a distributed computing system. Storage, operation and transmission of data files, software tools, program elements and other reference and database information as described herein are meant as sample implementations. Other implementations are possible without diverging from the scope of the present invention. Although not described, implementations in which data files and information related to the analysis reports may be encrypted when communicated over network 104.

Figure 2A:
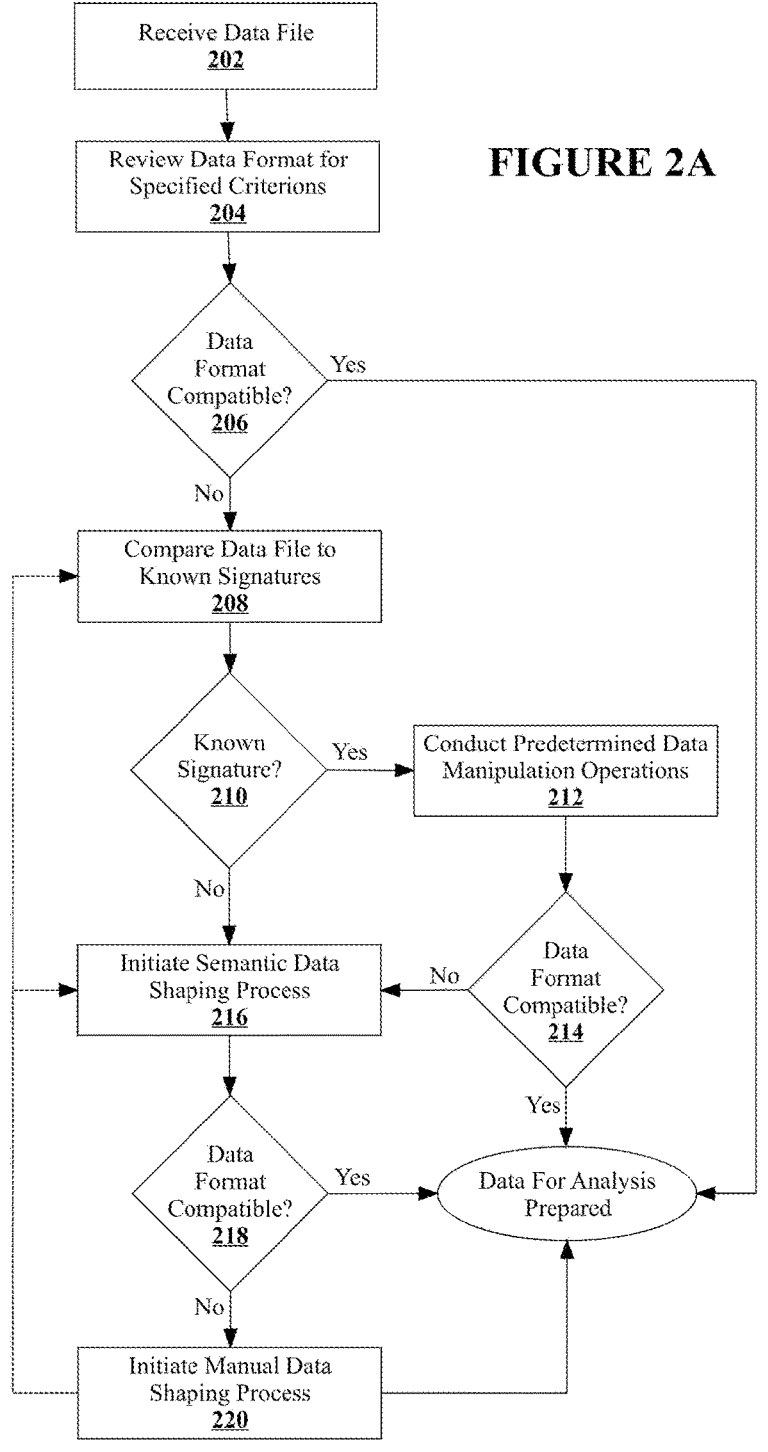
FIGS. 2A and 2B are flow charts depicting first and second steps performed by a processing entity implementing a data ingress tool according to one embodiment of the present invention.

FIG. 2A is a flow chart depicting steps performed by the processing entity implementing the data ingress tool 116A according to one embodiment of the present invention. In this case, the data ingress tool 116A may be operating on the network computing apparatus 106 as per the network architectures of FIGS. 1A and 1C and the processing entity 112 may implement the steps of FIG. 2A as part of the data ingress tool 116A. In alternative embodiments in which the data ingress tool 116A is being operated on the client computing apparatus 102 as per the network architecture of FIGS. 1B and 1D, the processing entity 122 may implement the steps of FIG. 2A as part of the data ingress tool 116A. It should be understood that one or more other processing entities (not shown) in alternative network architectures could be used to implement the steps of FIG. 2A and one skilled in the art would understand different processing designs that could be used, including multi-parallel processing systems to potentially improve efficiency of the implementation of the data ingress tool 116A or portions thereof.

As shown in FIG. 2A, the processing entity first receives a data file at step 202. The data file may be received from a wide range of sources including via a network such as the network 104 via the network adaptor 110 or 120, via the input device 132, or via a local storage element such as the memory element 124 that also stores the program element 138. In one sample implementation, the data file may comprise a spreadsheet document consistent with the Excel spreadsheet software developed and sold by Microsoft Corporation of Redwood, Calif., USA. In other embodiments, the data file may comprise a spreadsheet document consistent with another spreadsheet software or may not be a spreadsheet document and instead another document type comprising a plurality of data entries that may be desired to analyze.

The data file may comprise a plurality of data entries organized in a first data format, each of the data entries having a value for each of a plurality of criterions. Each of the criterions may be labelled with a criterion indication. Some of the data entries may be grouped together based on values for one or more of the criterions being the same across the data entries. In some implementations, the data file may comprise a general ledger including a plurality of transactions as data entries. In this case, the criterion indications may comprise: a) a transaction identifier (ID) or journal entry identifier (ID), b) date, c) amount, d) account identifier (ID), e) account description, and f) memo, though fewer than these six criterion indications could be included and additional criterion indications could also be included. In many data files, the criterion indications may not be consistent with this nomenclature and/or structure and will need to be semantically understood in order to process the data entries in the data file.

As shown in FIG. 2A, after the processing entity 112 receives the data file, the processing entity at step 204 is operable to review the data format of the data file to determine if the data entries are compatible with the data analysis tool 116B. This review of the data file could take many forms and depends heavily upon the requirements for the data file specified for the data analysis tool 116B. For instance, the data analysis tool 116B may have specific requirements for formatting related to one or more specified criterions for the data analysis tool 116B, herein referred to as required criterions. In determining if the data in the data file is in a format acceptable for processing by the data analysis tool 116B, the processing entity may ensure the required criterions are identified in the data entries and values associated to the required criterions are in the proper format. In this case, the required criterions may be particular criterions either mandatory or optional for the data analysis tool 116B to operate properly.

In the example in which the data file is a general ledger, the required criterions may comprise a) a transaction ID or journal entry ID, b) date, c) amount, d) account ID, e) account description, and f) memo, though it should be understood that more or less of these criterion may be required for processing by the data analysis tool 116B and some may be optional or not necessary depending on the data analysis tool 116B. At step 206, the processing entity determines if the data format of the data file is compatible with the proper format for each of the required criterions for the data analysis tool 116B. This comparison may comprise identifying a criterion indication or header for each required criterion and reviewing the format of the values across the data entries for the particular criterion compared to the data format needed for processing by the data analysis tool 116B. For instance, in some particular implementations, a value for a transaction ID criterion may be required to be included in each data entry to uniquely group the data entries into transactions; a value for a date criterion may be required to provide the day, month, year in a particular format for each data entry; a value for an amount criterion may be required with separate values for credit and debit criterions for each data entry; a value for an account ID criterion may need to be included in each data entry and comprise a particular format sequence of alphanumeric signifiers; a value for an account description criterion (shortened to account criterion herein) may need to be included in each data entry and comprise an account name from that may be on a list of potential account names or on a list of required account names; and a value for a memo criterion may need to comprise a string of alphanumeric signifiers. If the data format is deemed to be compatible with the data analysis tool 116B at step 206, the data file is deemed to be prepared for analysis.

If the data format is not deemed to be fully compatible with the data analysis tool 116B at step 206, the processing entity at step 208 is operable to review the data file and compare aspects of the data file to known signatures in particular data formats stored in a database such as the database 118 or 128. Specifically, the processing entity is operable to attempt to detect characteristics in the data structure, nomenclature or format of the data entries associated with a known signature that would indicate that the data file is of a particular known data format. To accomplish this, the processing entity may semantically analyze the criterion indications, the format of signifiers in values of the criterion in one or more of the data entries and/or other labels or distinct markers related to a particular predetermined data format. In some implementations, the processing entity may compare particular characteristics of the data file and its data entries and criterion indications compared to signatures stored in the database 118 or 128 or another storage location local or remote. At step 210, the processing entity determines if the data format of the data file is known based on the comparison of the characteristics to the known signatures.

In one particular example implementation, a known signature for an accounting software program such as the Sage 50 software sold by The Sage Group plc may comprise the following:

{Format Detector: Sage 50 Ledger
    {
    Operation: Case insensitive search
    Optional: within 4 rows a field on a row contains
        character sequence: "transaction by account"
    Optional: within 3 rows a field on a row contains
        character sequence: "sorted by"
    Require: within 3 rows on a single row contains character sequence: "date", "comment", "source",
        "trans" or "je####" (where #### is a number), "deb"
        also matches debit, "cr" also matches credit
    Require: Should not contain character sequence "acc"
    }
}

In this example, the known signature for a general ledger generated by the Sage 50 software includes a requirement that within 3 rows there is a single row with character sequences "date", "comment", "source", "trans" or "je####", "deb" and "cr"; and a requirement that there not be a character sequence of "acc". As well, optionally, a character sequence of "transaction by account" may occur within 4 rows and a character sequence of "sorted by" may occur within 3 rows. It should be understood that other distinct aspects of formatting for a general ledger generated by the Sage 50 software could be used as a known signature for the Sage 50 software and this example should not be considered a unique or complete signature. Further, other accounting software may have other distinct aspects of formatting for a general ledger.

If the format of the data file is determined to be known at step 210, the processing entity is operable to conduct a predetermined set of data manipulation operations at step 212. Based on the known signature identified, the processing entity may look-up a corresponding set of data manipulation operations linked in the database 118 or 128 to the known signature. The data manipulation operations may comprise a wide variety of operations that can be used to modify a plurality of data entries in a data file such as a spreadsheet to adjust values linked to one or more particular criterions. The data file may comprise a very high quantity of data entries; in some examples, a general ledger may comprise hundreds of thousand or millions of data entries that may be desired to be analyzed by the data analysis tool 116B. The data manipulation operations may comprise operations including, but not limited to: splitting cells/columns/rows; joining cells/columns/rows; adding/deleting columns/rows; modifying cells; adding/deleting cells; reformatting cells; grouping cells; ungrouping cells; deleting signifiers in cells; modifying signifiers in cells; adding signifiers in cells; and/or other modification actions that can be applied in a spreadsheet. The data manipulation operations may further include modifications to the criterion indications such as the replacement of terms due to differences in nomenclature or language or adding of criterion indications to sets of values such as column which did not have a criterion indication (for example a new column that is added).

As the values linked to a particular criterion may comprise a column of values in a very large set of data entries, the data manipulation operations may comprise modifications applied to one or more columns for all of the data entries in the data file. The data manipulation operations may also be applied to one or more specific cells of specific data entries in the data file. In one specific implementation, each of the data manipulation operations may comprise a series of commands programmed in a data shaping tool. In one implementation, a software application such as Open Refine (formally known as Google Refine) with URL www.openrefine.org could be used to complete the data manipulation operations. Open Refine is an open source software application for data cleanup and transformation to other formats. In other implementations, other data shaping software tools could be used to implement the data manipulation operations. The objective of the predetermined data manipulation operations is to modify the data file such that it is compatible with the data analysis tool 116B.

In the particular example implementation of the Sage 50 software described above, if the signature a general ledger generated for the Sage 50 software is detected at step 210, a specific set of data manipulation operations may be known to be required to modify the data file such that it is compatible with the data analysis tool 116B. For instance, it may be known that a general ledger generated by the Sage 50 software includes a new set of journal entry IDs each calendar day and thus data entries linked to a common transaction are not associated with a unique journal entry ID or transaction ID across all data entries as journal entry IDs are repeated daily. In this case, a data manipulation operation may be necessary to generate a new field to act as a unique journal entry ID or transaction ID. In one implementation, a new column labelled as "transaction ID" may be generated with the value for each data entry comprising the value from a date criterion such as "TRANSACTION_DATE" combined with the value from a journal entry ID criterion such as "JOURNAL_ID". This column can be generated by filling the value for each row in the data file (where each row represents a data entry) with the code: grel:cells["TRANS-ACTION_DATE"].value+"−"+ cells["JOURNAL_ID"].value. Further, in this case, a data manipulation operation may be necessary to reformat the date in the data entries to a supported date format for the data analysis tool 116B. In one implementation, a new column labelled as "posted date" may be generated with the value for each data entry comprising a reformatted version of another date criterion such as "TRANSACTION_DATE". This column can be generated by filling the value for each row in the data file (where each row represents a data entry) with the code: grel: value.toDate('dd-MMM-yy').toString('yyyy-MM-dd'). It should be understood that other data manipulation operations may be necessary to modify a general ledger generated by the Sage 50 software such that it is compatible with the data analysis tool 116B and this example should not be considered a unique or complete set of data manipulation operations. Further, other accounting software may have other data manipulation operations required to make a general ledger generated with its software to be compatible with a particular data analysis tool 116B.

After conducting the predetermined data manipulation operations, the processing entity at step 214 determines if the data format of the data file as modified is now compatible with the proper format for each of the required criterions for the data analysis tool 116B. Similar to step 206, this comparison may comprise identifying a criterion indication or header for each required criterion and reviewing the format of the values across the data entries for the particular criterion compared to the data format needed for processing by the data analysis tool 116B. If the data format is deemed to be compatible with the data analysis tool 116B at step 214, the data file is deemed to be prepared for analysis.

If the format of the data file is determined to not be known at step 210 or is deemed to still not be compatible with the data analysis tool 116B at step 214, the processing entity is operable to initiate a semantic data shaping process at step 216. In the semantic data shaping process, the processing entity is operable to semantically analyze values in the data entries and/or criterion indications in the data file as received by reviewing signifiers in the values and/or signifiers in the criterion indications; and determine a set of data manipulation operations to perform on the data file. The objective of the semantic data shaping process is to modify the data file such that the data entries are compatible with the data analysis tool 116B so the data file can be analyzed. Embodiments of the semantic data shaping process are described in more detail with reference to FIGS. 3A, 3B and 3C as well as specific examples described with reference to FIGS. 4, 5A-5F and 6A-6B.

After initiating the semantic data shaping process at step 216 which may lead to a series of data manipulation operations being conducted on the data file, the processing entity at step 218 determines if the data format of the data file as modified is now compatible with the proper format for each of the required criterions for the data analysis tool 116B. Similar to steps 206 and 214, this comparison may comprise identifying a criterion indication or header for each required criterion and reviewing the format of the values across the data entries for the particular criterion compared to the data format needed for processing by the data analysis tool 116B. If the data format is deemed to be compatible with the data analysis tool 116B at step 218, the data file is deemed to be prepared for analysis.

If the format of the data file is deemed to still not be compatible with the data analysis tool 116B at step 218, the processing entity may initiate a manual data shaping process at step 220. In this manual process, a number of triggers could be initiated to request input from an individual who has knowledge of the formatting of the data file and/or to request input from one skilled in the art of data shaping and has access to the data file. This manual process may include mapping of criterion indications to alternative criterion indications not previously known to the processing entity and/or may include an individual reviewing the data entries and coding a set of data manipulation operations to enable the data file to be compatible to the data analysis tool 116B. After the manual data shaping process is completed and approved by one knowledgeable in the data analysis tool 116B, the data file is deemed to be prepared for analysis. Learning from the manual data shaping process at step 220 may lead to improvements in the references and data manipulation operations used in the semantic data shaping process of step 216. For instance, any alternative nomenclature used for specified criterion indications may be fed into the semantic data shaping process. Further, patterns in the data entries of the data file used by individuals during the manual data shaping procedures may be input as references in the database 118 or 128 and used to better identify the specified criterions in data files. Yet further, as specific characteristics for a type of data format are identified, an additional signature can be defined and used in steps 208 and 210 and an associated set of data manipulation operations can be preset for use in step 212.

In one particular implementation, the data analysis tool 116B is a general ledger analysis tool that, among other things, detects potential risks and anomalies in data generated by accounting management software applications. The general ledger analysis tool may be used to aid professionals when conducting an audit of a company, government entity or other entity. In one particular implementation, the general ledger analysis tool may require the data to be analyzed to include a specific set of criterions to be present and formatted in a specific structure in order to be properly processed. In this case, the required criterions for the general ledger analysis tool to properly process the data file may be reviewed in steps 206, 214 and 218 when determining if the data format is compatible with the data analysis tool 116B.

Figure 2B:
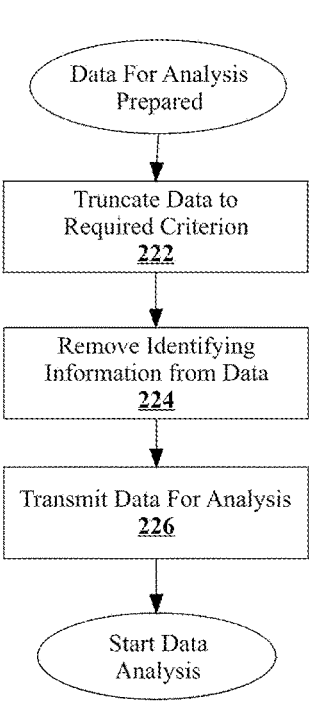

In some embodiments, all of the data from the data file is not required for the data analysis tool 116B to operate properly and, in some embodiments, including only the data associated with the required criterions is preferred. Further, in some embodiments, the data entries in the data file should be anonymized for security and/or privacy purposes. FIG. 2B is a flow chart depicting a second set of steps performed by the processing entity implementing the data ingress tool 116A in some embodiments. Similar to FIG. 2A, the processing entity implementing the steps of FIG. 2B may be the processing entity 112, though alternatively the processing entity 122 may implement the steps if the data ingress tool 116A is implemented by the client computing apparatus 102. As shown, after the data file is deemed to be prepared for analysis, the processing entity may truncate the data to the required criterions at step 222. By removing some or all of the criterions that are not required by the data analysis tool 116B, the data file can be reduced in size and eliminate transmitting information that is not essential to the processing of the data by the data analysis tool 116B.

At step 224, the processing entity may remove identifying information from the data file. This process can include substituting names of people, customers and vendors with unique references; changing product names to none identifying terms; and truncating or editing strings of information stored in string based criterions such as a memo criterion in a general ledger. Replacing identifying information from the data file can allow for a set of data that has lower security and/or privacy risks being transmitted to the computing apparatus that will run the data analysis tool 116B. Further, anonymizing the data file can allow the owners of the data to be more willing to allow the information to be used in the overall machine learning process that can improve the effectiveness and efficiency of the data ingress tool 116A.

At step 226, the processing entity may transmit the modified data file that has been truncated and/or modified to remove identifying information to the computing apparatus that is to implement the data analysis tool 116B. In the case of the implementation illustrated in FIG. 1B, the processing entity 122 may run the data ingress tool 116A and implement the steps of FIGS. 2A and 2B and transmit the modified data file via the network adaptor 120, the network 104 and the network adaptor 110 to the processing entity 112 such that the processing entity 112 in the network computing apparatus 106 may use the modified data file to run the data analysis tool 116B. In the case of the implementation illustrated in FIG. 1C, the processing entity 112 may run the data ingress tool 116A and implement the steps of FIGS. 2A and 2B and transmit the modified data file via the network adaptor 110, the network 104 and the network adaptor 120 to the processing entity 122 such that the processing entity 122 in the client computing apparatus 102 may use the modified data file to run the data analysis tool 116B. In other implementations, even ones in which the data ingress tool 116A and the data analysis tool 116B are run by the same processing entity, the implementation of step 222 and/or step 224 may be useful to reduce the size of the data file and/or reduce risks concerning security and/or privacy with the storage of the data file. In some implementations, the steps of FIG. 2B are not implemented and the data file as prepared by the data ingress tool 116A as described by the steps of FIG. 2A is used by the processing entity that runs the data analysis tool 116B.

Figures 3A, 3B:
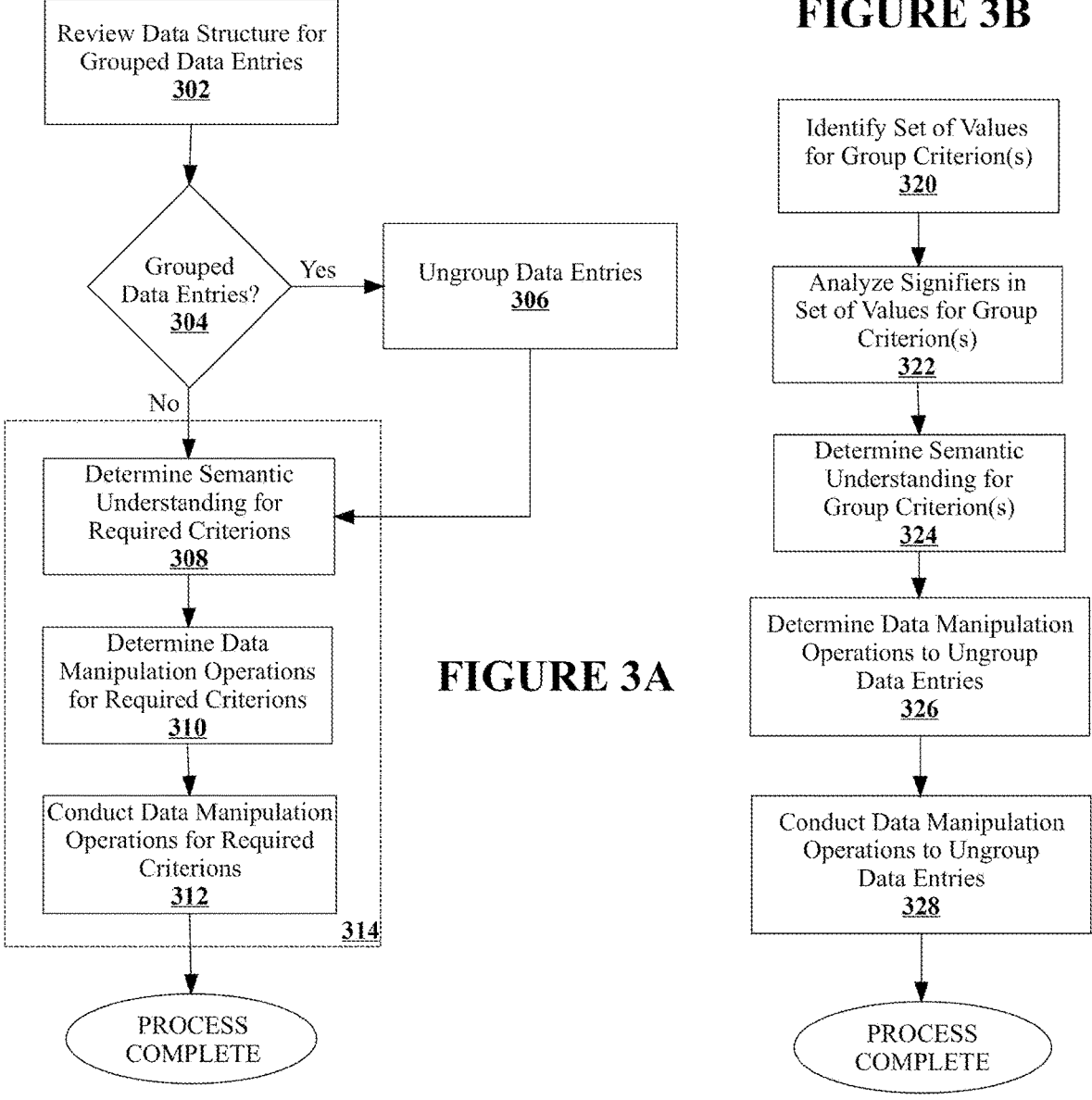
FIGS. 3A, 3B and 3C are flow charts depicting steps performed by a processing entity implementing a data shaping process according to embodiments of the present invention.
Figure 3C:
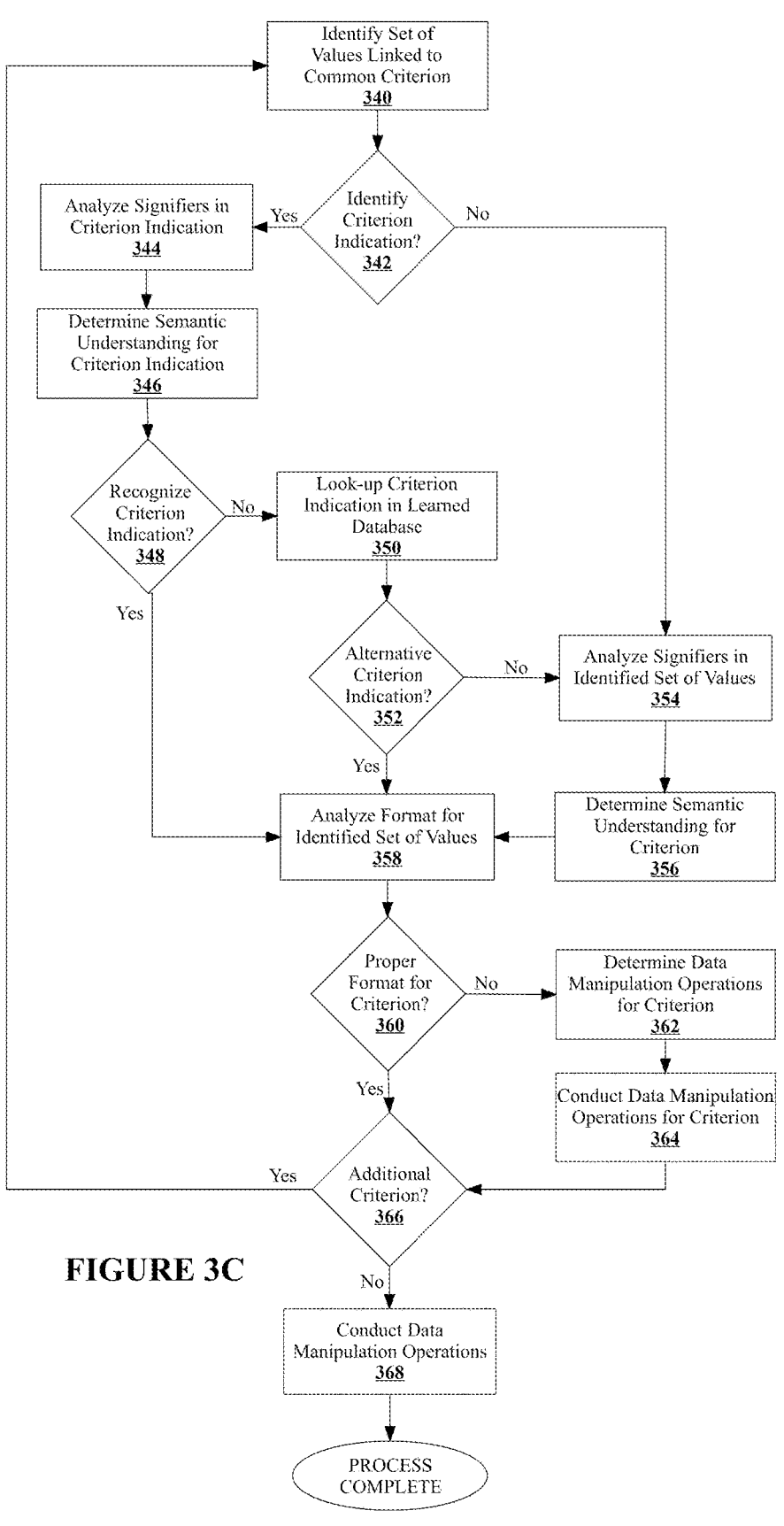

FIGS. 3A, 3B and 3C are flow charts depicting steps performed by the processing entity implementing the data shaping process of step 216 according to some embodiments of the present invention. As described with reference to FIGS. 2A and 2B, the processing entity implementing the steps of FIGS. 3A, 3B and 3C may be the processing entity 112 if the network computing apparatus 106 is implementing the data ingress tool 116A, though alternatively the processing entity 122 may implement the steps if the data ingress tool 116A is implemented by the client computing apparatus 102. Although FIGS. 3A, 3B and 3C illustrate a number of different semantic data shaping steps, it should be understood that only a subset of these steps may be implemented in the semantic data shaping process of step 216. Some of the steps presented may be eliminated and additional semantic analysis steps may be added to address particular requirements of some applications. FIGS. 4 and 5A-5F illustrate a particular implementation in which a general ledger is used as the data file and a general ledger analysis tool is used as the data analysis tool 116B.

As depicted in step 302, when initiating a semantic data shaping process, the processing entity may initially review data structures in the data file to identify grouped data entries. Grouped data entries may occur in a data file when data entries have a common value for a particular criterion and a software program that has generated the data file groups data entries together that have a common value for that particular criterion, herein referred to as a group criterion. In this case, the common value for the group criterion may appear like a section heading for a plurality of data entries and there may or may not be a clear criterion indication available to be detected. To identify potential of groups of data entries in the data structure of the data file, the processing entity may be operable to review the structure of individual rows in the data file and detect section headers that are not in the typical format of a data entry, or an indication that a particular criterion is used as a group criterion. The processing entity may further semantically analyze signifiers in the section header to determine if they are likely common values for a particular criterion for the grouped data entries.

After reviewing the data structure of the data file, the processing entity determines whether there are grouped data entries at step 304. This process can be through the semantic analysis of header rows in which signifiers may indicate that a particular criterion is a group criterion. For instance, there may be an indication such as "Transactions by Criterion A" where Criterion A is a criterion that has been used as a group criterion. Other terms may be used to indicate that a particular criterion is a group criterion. In other embodiments, no indication of which criterion is a group criterion may be included. The processing entity may determine whether there are grouped data entries by semantically analyzing rows to identify rows that are not consistent with data entries. Analyzing the signifiers in these inconsistent rows may allow the processing entity to determine a criterion that is a group criterion based on the format or content of these rows. For instance, in the case that the group criterion is a date, the format of the values of the inconsistent rows could be in a recognizable date format. Further, in the case that the group criterion is an account name and/or account identifier, the processing entity could compare signifiers in the inconsistent rows with a table of well known account names. If they are in the table of well known account names, the processing entity could conclude the group criterion is the account names. In other cases, the use of look up tables could identify other criterions and the processing entity could add to the look up tables in order for future actions to learn.

For general ledger data, some software programs may group data entries by account identifier, journal entry ID or transaction ID, date, user identifier, associated vendor or customer identifier, or a particular document identifier such as an invoice or purchase order. Below, in Table 1, is one example of a set of data that has been grouped by account, though this example is not meant to limit the scope of the present invention.

TABLE 1

| | Sample Data Set | | | | | | | |
| | Mindbridge Plumbing Ltd. | | | | | | | |
| | Transactions by Account Report Apr. 1, 2013 to Mar. 31, 2014 | | | | | | | |
| | Sorted by: Transaction Number | | | | | | | |
| | Date | Comment | Source # | Trans. # | Debits | Credits | Balance | |
| 10600 Bank | | | | | | | 0 | |
| Account X | | | | | | | | |
| | Jun. 15, 2013 | Employee 1 | payR | J0024 | — | 1,332.65 | 1,332.65 | Cr |
| | Jun. 15, 2013 | Employee 2 | payR | J0025 | — | 1,205.45 | 2,538.10 | Cr |

TABLE 1-continued

Sample Data Set
Mindbridge Plumbing Ltd.
Transactions by Account Report Apr. 1, 2013 to Mar. 31, 2014
Sorted by: Transaction Number

| | Date | Comment | Source # | Trans. # | Debits | Credits | Balance | |
|---|---|---|---|---|---|---|---|---|
| | Jun. 15, 2013 | Employee 3 | payR | J0026 | — | 1,233.86 | 3,771.96 | Cr |
| | Jun. 15, 2013 | Employee 4 | payR | J0027 | — | 1,452.98 | 5,224.94 | Cr |
| | Jun. 15, 2013 | Employee 5 | payR | J0028 | — | 1,157.55 | 6,382.49 | Cr |
| | Jun. 15, 2013 | Employee 6 | payR | J0029 | — | 1,288.07 | 7,670.56 | Cr |
| | Jun. 21, 2013 | Direct dep Rev Agency | PayR/rem | J0040 | — | 2,788.97 | 10,459.53 | Cr |
| | Jun. 25, 2013 | Customer 15 | payRe | J0048 | 14,958.15 | — | 4,498.62 | Dr |
| | Jun. 30, 2013 | Employee 1 | payR | J0063 | — | 1,332.65 | 3,165.97 | Dr |
| | Jun. 30, 2013 | Employee 2 | payR | J0064 | — | 1,205.45 | 1,960.52 | Dr |
| | Jun. 30, 2013 | Employee 3 | payR | J0065 | — | 1,233.86 | 726.66 | Dr |
| | Jun. 30, 2013 | Employee 4 | payR | J0066 | — | 1,452.98 | 726.32 | Cr |
| | Jun. 30, 2013 | Employee 5 | payR | J0067 | — | 1,157.55 | 1,883.87 | Cr |
| | Jun. 30, 2013 | Employee 6 | payR | J0068 | — | 1,288.07 | 3,171.94 | Cr |
| | Jun. 30, 2013 | MyRentalCo Ltd. | opEx | J0075 | — | 1,864.50 | 5,036.44 | Cr |
| | Jun. 30, 2013 | MyMarketingCo Ltd. | opEx | J0076 | — | 115.48 | 5,151.92 | Cr |
| | Jun. 30, 2013 | MyHydro Company | opEx | J0077 | — | 2,501.42 | 7,653.33 | Cr |
| | Jul. 1, 2013 | Customer 43 | PayRe | J0078 | 1,350.01 | — | 6,303.32 | Cr |
| | Jul. 1, 2013 | Customer 13 | PayRe | J0079 | 249.52 | — | 6,053.80 | Cr |
| 12007 A/R | | | | | | | 951.83 | Dr |
| | Jun. 13, 2013 | Customer 7 | Sal | J0020 | 5,948.91 | — | 6,900.74 | Dr |
| | Jun. 14, 2013 | Customer 7 | Sal | J0021 | 498.43 | — | 7,399.17 | Dr |
| | Jun. 16, 2013 | Customer 7 | Sal | J0034 | 13,348.55 | — | 20,747.72 | Dr |
| | Jun. 25, 2013 | Customer 7 | Sal | J0051 | 1,136.88 | — | 21,884.60 | Dr |
| | Jun. 30, 2013 | Customer 7 | Sal | J0071 | 24,777.57 | — | 46,662.17 | Dr |
| | Jul. 15, 2013 | Customer 7 | payRe | J0086 | — | 498.43 | 46,163.74 | Dr |
| | Jul. 7, 2013 | Customer 7 | Sal | J0097 | 5,726.43 | — | 51,890.17 | Dr |
| | Jul. 12, 2013 | Customer 7 | Sal | J0111 | 2,419.84 | — | 54,310.01 | Dr |
| | Jul. 18, 2013 | Customer 7 | payRe | J0136 | — | 24,777.57 | 29,532.44 | Dr |
| | Jul. 23, 2013 | Customer 7 | payRe | J0152 | — | 13,348.55 | 16,183.89 | Dr |
| | Jul. 23, 2013 | Customer 7 | Sal | J0153 | 338.12 | — | 16,522.01 | Dr |
| | Jul. 25, 2013 | Customer 7 | payRe | J0164 | — | 5,948.91 | 10,573.10 | Dr |
| | Jul. 28, 2013 | Customer 7 | Sal | J0178 | 2,178.37 | — | 12,751.47 | Dr |
| | Aug. 1, 2013 | Customer 7 | payRe | J0200 | — | 5,726.43 | 7,025.04 | Dr |
| | Aug. 1, 2013 | Customer 7 | Sal | J0201 | 4,258.73 | — | 11,283.77 | Dr |
| | Aug. 2, 2013 | Customer 7 | Sal | J0205 | 91.27 | — | 11,375.04 | Dr |
| | Aug. 2, 2013 | Customer 7 | Sal | J0206 | 7013.86 | — | 18,388.90 | Dr |
| | Aug. 5, 2013 | Customer 7 | Sal | J0223 | 1,214.81 | — | 19,603.71 | Dr |
| | Aug. 7, 2013 | Customer 7 | PayRe | J0235 | — | 338.12 | 19,265.59 | Dr |

In the example of Table 1, on the second row, there is an indication that the table comprises "Transactions by Account Report Apr. 1, 2013 to Mar. 31, 2013" which provides an indication that the data entries are grouped by account. As illustrated, there are a plurality of data entries related to account "Bank Account X" with account ID 10600 and then a plurality of data entries related to account "A/R" or Accounts Receivable with account ID 12007. Also shown are criterions "Date", "Comment", "Source #", "Trans. #" or transaction ID, "Debits", "Credits" and "Balance". In the example of Table 1, the rows that include the account names and account ID are inconsistent with other data entries and do not have values for the remaining criterions. This is a further indication that the account ID and/or account name is a group criterion in this example.

If the processing entity determines there are grouped data entries at step 304, the processing entity proceeds to ungroup the data entries at step 306. The process of ungrouping a set of data entries according to one embodiment of the present invention is described with reference to FIG. 3B. As depicted to FIG. 3B, the processing entity may identify a set of values that are associated with one or more group criterions at step 320; analyze signifiers in the set of values associated with the one or more group criterions at step 322; and determine semantic understanding for the group crite-rion(s) at step 324. To identify the values associated with the group criterion(s), the processing entity may semantically analyze signifiers in rows that are inconsistent with other data entries which may be considered group header rows. These inconsistent rows, or group header rows, potentially include values in columns that are empty in data entry rows and potentially not include values in columns associated with other criterions that have values in data entry rows. The data entry rows below a group header row may comprise data entries with the same value for the group criterion(s), that being the value(s) in the group header row.

In the example of Table 1, the row comprising the signifiers "10600" and "Bank Account X" and the row comprising the signifiers "12007" and "A/R" are inconsis-tent with other data entries and can be determined to be group header rows comprising values for two group crite-rions. Through semantically analyzing the row comprising "Transactions by Account", the processing entity may deter-mine that at least one of the group criterions relate to "account" criterions. By semantically analyzing the words in "Bank Account X", "A/R" and other potential account names in other rows, the processing entity may determine that one of the group criterions is an account name criterion. By semantically analyzing the numeric string "10600", "12007" and other similarly formatted numbers in other rows, the processing entity may determine that one of the group criterions is an account identifier criterion. In this example, the data entries below the group header row comprising values "10600" and "Bank Account X" can be determined to have common values for the account name and account identifier criterions, that being account number "10600" and account name "Bank Account X". Similarly, the data entries below the group header row comprising values "12007" and "A/R" can be determined to have common values of account number "12007" and account name "A/R".

In other examples, other criterions could be used as group criterions and, in some cases, no direct indication of the group criterion can be semantically determined. For example, in some implementations, the processing entity may determine a semantic understanding for the group criterion from known formatting or known strings that are used in values believed to be associated with a group criterion since they are identified in rows that are inconsistent with rows comprising data entries. For example, in the case that the group criterion is a date criterion, the formatting used by values associated with the group criterion may be a known date format. In this case, there may not be an at step 328. The goal of these steps is to simplify the formatting of the data file to allow the data analysis tool 116B to more easily analyze the data without having to consider the group criterions as any different than any other criterions and allow the data analysis tool 116B to be able to treat each row as a separate and distinct data entry with values for all required criterions included. The data manipulation operations required to ungroup the data entries may comprise generating a new column for each identified group criterion; labelling the new column with a header indicating the group criterion; copying in appropriate values associated with the group criterion to each data entry, the values generally being values copied from their associated group header row; and deleting the group header rows (i.e. the inconsistent rows) once the values in the group header rows are transferred to each of the associated data entries. For the example of Table 1, the processing entity may modify the data by conducting data manipulation operations to generate a data file similar to that depicted in Table 2 below.

TABLE 2

Modified Sample Data Set
Mindbridge Plumbing Ltd.
Transactions by Account Report Apr. 1, 2013 to Mar. 31, 2014

| Acc ID | Account Name | Date | Comment | Source # | Trans. # | Debits | Credits | Balance | |
|---|---|---|---|---|---|---|---|---|---|
| 10600 | Bank Account X | Jun. 15, 2013 | Employee 1 | payR | J0024 | — | 1,332.65 | 1,332.65 | Cr |
| 10600 | Bank Account X | Jun. 15, 2013 | Employee 2 | payR | J0025 | — | 1,205.45 | 2,538.10 | Cr |
| 10600 | Bank Account X | Jun. 15, 2013 | Employee 3 | payR | J0026 | — | 1,233.86 | 3,771.96 | Cr |
| 10600 | Bank Account X | Jun. 15, 2013 | Employee 4 | payR | J0027 | — | 1,452.98 | 5,224.94 | Cr |
| 10600 | Bank Account X | Jun. 15, 2013 | Employee 5 | payR | J0028 | — | 1,157.55 | 6,382.49 | Cr |
| 10600 | Bank Account X | Jun. 15, 2013 | Employee 6 | payR | J0029 | — | 1,288.07 | 7,670.56 | Cr |
| 10600 | Bank Account X | Jun. 21, 2013 | Direct dep Rev Agency | PayR/rem | J0040 | — | 2,788.97 | 10,459.53 | Cr |
| 10600 | Bank Account X | Jun. 25, 2013 | Customer 15 | payRe | J0048 | 14,958.15 | — | 4,498.62 | Dr |
| 10600 | Bank Account X | Jun. 30, 2013 | Employee 1 | payR | J0063 | — | 1,332.65 | 3,165.97 | Dr |
| 10600 | Bank Account X | Jun. 30, 2013 | Employee 2 | payR | J0064 | — | 1,205.45 | 1,960.52 | Dr |
| 10600 | Bank Account X | Jun. 30, 2013 | Employee 3 | payR | J0065 | — | 1,233.86 | 726.66 | Dr |
| 10600 | Bank Account X | Jun. 30, 2013 | Employee 4 | payR | J0066 | — | 1,452.98 | 726.32 | Cr |
| 10600 | Bank Account X | Jun. 30, 2013 | Employee 5 | payR | J0067 | — | 1,157.55 | 1,883.87 | Cr |
| 10600 | Bank Account X | Jun. 30, 2013 | Employee 6 | payR | J0068 | — | 1,288.07 | 3,171.94 | Cr |
| 10600 | Bank Account X | Jun. 30, 2013 | MyRentalCo Ltd. | opEx | J0075 | — | 1,864.50 | 5,036.44 | Cr |
| 10600 | Bank Account X | Jun. 30, 2013 | MyMarketingCo Ltd. | opEx | J0076 | — | 115.48 | 5,151.92 | Cr |
| 10600 | Bank Account X | Jun. 30, 2013 | MyHydro Company | opEx | J0077 | — | 2,501.42 | 7,653.33 | Cr |
| 10600 | Bank Account X | Jul. 1, 2013 | Customer 43 | PayRe | J0078 | 1,350.01 | — | 6,303.32 | Cr |
| 10600 | Bank Account X | Jul. 1, 2013 | Customer 13 | PayRe | J0079 | 249.52 | — | 6,053.80 | Cr |
| 12007 | A/R | Jun. 13, 2013 | Customer 7 | Sal | J0020 | 5,948.91 | — | 6,900.74 | Dr |
| 12007 | A/R | Jun. 14, 2013 | Customer 7 | Sal | J0021 | 498.43 | — | 7,399.17 | Dr |
| 12007 | A/R | Jun. 16, 2013 | Customer 7 | Sal | J0034 | 13,348.55 | — | 20,747.72 | Dr |
| 12007 | A/R | Jun. 25, 2013 | Customer 7 | Sal | J0051 | 1,136.88 | — | 21,884.60 | Dr |
| 12007 | A/R | Jun. 30, 2013 | Customer 7 | Sal | J0071 | 24,777.57 | — | 46,662.17 | Dr |
| 12007 | A/R | Jul. 15, 2013 | Customer 7 | payRe | J0086 | — | 498.43 | 46,163.74 | Dr |
| 12007 | A/R | Jul. 7, 2013 | Customer 7 | Sal | J0097 | 5,726.43 | — | 51,890.17 | Dr |
| 12007 | A/R | Jul. 12, 2013 | Customer 7 | Sal | J0111 | 2,419.84 | — | 54,310.01 | Dr |
| 12007 | A/R | Jul. 18, 2013 | Customer 7 | payRe | J0136 | — | 24,777.57 | 29,532.44 | Dr |
| 12007 | A/R | Jul. 23, 2013 | Customer 7 | payRe | J0152 | — | 13,348.55 | 16,183.89 | Dr |
| 12007 | A/R | Jul. 23, 2013 | Customer 7 | Sal | J0153 | 338.12 | — | 16,522.01 | Dr |
| 12007 | A/R | Jul. 25, 2013 | Customer 7 | payRe | J0164 | — | 5,948.91 | 10,573.10 | Dr |
| 12007 | A/R | Jul. 28, 2013 | Customer 7 | Sal | J0178 | 2,178.37 | — | 12,751.47 | Dr |
| 12007 | A/R | Aug. 1, 2013 | Customer 7 | payRe | J0200 | — | 5,726.43 | 7,025.04 | Dr |
| 12007 | A/R | Aug. 1, 2013 | Customer 7 | Sal | J0201 | 4,258.73 | — | 11,283.77 | Dr |
| 12007 | A/R | Aug. 2, 2013 | Customer 7 | Sal | J0205 | 91.27 | — | 11,375.04 | Dr |
| 12007 | A/R | Aug. 2, 2013 | Customer 7 | Sal | J0206 | 7013.86 | — | 18,388.90 | Dr |
| 12007 | A/R | Aug. 5, 2013 | Customer 7 | Sal | J0223 | 1,214.81 | — | 19,603.71 | Dr |
| 12007 | A/R | Aug. 7, 2013 | Customer 7 | PayRe | J0235 | — | 338.12 | 19,265.59 | Dr | indication such as "Transactions by date" included in the data file but the processing entity could still determine a semantic understanding of the group criterion.

Once the processing entity determines a semantic understanding for the group criterion and its associated values, the processing entity determines data manipulation operations required to ungroup the data entries at step 326 and conducts the data manipulation operations to ungroup the data entries If the processing entity determined there are not grouped data entries at step 304 or after the data entries are ungrouped at step 306, the processing entity implementing the data ingress tool 116A then proceeds to determine semantic understanding for values of criterions required by the data analysis tool 116B at step 308; determine data manipulation operations for the required criterions to modify the data file to be compatible with the data analysis tool 116B at step 310 and conduct the data manipulation operations for the required criterions on the data file at step 312. These steps 308, 310, 312 can be considered together as step 314 in which the processing entity semantically data shapes the values associated with the required criterions required by the data analysis tool 116B.

The process of step 314 of data shaping the values associated with the criterions required by the data analysis tool 116B is described in more detail in FIG. 3C according to one embodiment of the present invention. To conduct data shaping of the data file, the processing entity implementing the data ingress tool 116A may semantically analyze the data file to identify values associated with each of the required criterions to be used by the data analysis tool 116B and ensure the values are in the proper format compatible with the data analysis tool 116B. The processing entity may conduct the data shaping process for values associated with each required criterion separately or may conduct these processes for values associated with all or a portion of the required criterions simultaneously as the processing entity semantically analyzes the criterion indications and sets of values in the data entries of the data file. In some implementations, the processing entity may only proceed with the data shaping process for values associated with a limited number of the required criterions and some of the values associated with required criterions may be determined to be already in proper format for the data analysis tool 116B. FIG. 3C depicts a set of steps operated by the processing entity in which data shaping of values of each of the required criterions is done separately, though it should be understood that the processing entity could conduct one or more of the steps of FIG. 3C for values of two or more of the required criterions in parallel.

As depicted in FIG. 3C, initially the processing entity identifies a set of values across the data entries in the data file linked to a common criterion at step 340. The processing entity may determine that a set of values across the data entries are linked to a common criterion if the values are in the same column or in the same set of columns across the data entries. In other cases, the processing entity may determine that a set of values in the data file are linked to a common criterion if the values are in the same row or otherwise are logically linked in the data file. Once a set of values linked to a common criterion are identified, the processing entity determines if it can identify a criterion indication for the identified set of values at step 342. In some cases, the processing entity can identify whether a criterion indication is linked to the identified set of values by identifying a header row and determining if a header is linked to the identified set of values, the header in this case being a potential criterion indication for the identified set of values.

If a criterion indication is identified at step 342, the processing entity may analyze signifiers in the criterion indication linked to the identified set of values at step 344 and attempt to determine a semantic understanding of the criterion indication at step 346. The processing entity could compare sets of signifiers in the criterion indication against known criterion indications or partial strings of criterion indications stored in a database such as database 118 or 128. For example, in one specific case, the processing entity could determine if the criterion indication signifiers comprise: "account", "acc", "accnt" or other short forms for the word "account" along with the signifiers "identifier", "#", "No.", "ID", "number" in order to determine if the criterion indication is likely an indication of an account identifier criterion. In another specific case, the processing entity could determine if the criterion indication signifiers comprise: "comment", "memo" or other synonyms or acronyms to determine if the criterion indication is likely an indication of a memo criterion. At step 348, the processing entity determines if it recognizes the criterion indication linked to the identified set of values. In some cases, the processing entity may determine a probability of the criterion indication being known and, if the probability is above a minimum acceptable probability, the processing entity determines that it recognizes the criterion indication at step 348.

If the processing entity does not recognize the criterion indication at step 348, the processing entity may look-up the criterion indication in a learned database at step 350 and determine if there is an alternative criterion indication for the unrecognized criterion indication associated with the identified set of values at step 352. The learned database may be in the database 118 or 128 or another database, local or networked, that includes alternative criterion indications that may be linked to criterion indications in different languages, synonyms of criterion indications, acronyms or shorthand of criterion indications and/or alternatives to criterion indications previously entered manually. Further, the learned database may comprise associations between known criterion indications and criterion indications identified but unrecognized by the processing entity when processing other data files. In this case, the processing entity may have determined an identified set of values linked to an unknown criterion indication were associated with a particular known criterion through semantic analysis of the identified set of values. In this case, the processing entity could enter the known criterion indication as an alternative to the unknown criterion indication for use when processing data files with similar criterion indications in the future. In some cases, the processing entity may not add the association between the known criterion indication and the unknown criterion indication into the database until the correlation is determined a minimum number of times, therefore increasing the likelihood that there is a true correlation that can be relied upon when processing data files in the future.

If the processing entity cannot associate the identified set of values with a known criterion indication, the processing entity may analyze signifiers in the identified set of values at step 354 and determine a semantic understanding for the criterion associated with the identified set of values at step 356. This step may be triggered if there is no criterion indication identified for the set of values linked to the common criterion at step 342, if there is no alternative criterion indication at step 352 in the case that the criterion indication is unrecognized at step 348, or if the criterion indication is unrecognized at step 348 and there is no learned database implemented. Specific examples of analyzing signifiers of the identified set of values and determining a semantic understanding for the criterion based on the signifiers of the identified set of values are described with reference to FIGS. 4 and 5A-5F. In one case, the signifiers of the identified set of values may be reviewed for structure concerning quantity and/or sequence of numeric and/or letter signifiers that may indicate that the identified set of values are linked to a specific criterion. In another case, the signifiers of the identified set of values may be reviewed for a specific formatting structure that would link the identified set of values to a particular criterion, such as a known date format that may include numeric signifiers within a set range for month, day and year and separators such as dashes or slashes. In another case, the signifiers of the identified set of values may be reviewed for a specific string that may be looked up in a database such as database 118 or 128 that would link the identified set of values to a specific criterion.

In yet other cases, a specific signifier combination or pattern of signifiers may indicate that the identified set of values are linked to a specific criterion. In yet further cases, a relative change in the signifiers across the identified set of values may indicate that the identified set of values are linked to a specific criterion, such as a systemic change in numeric signifiers or a combination of different strings across the identified set of values.

Once the processing entity has an understanding of the criterion associated with the identified set of values either due to recognition of the criterion indication at step 348 or 352 or due to semantic understanding of the identified set of values at step 356, the processing entity may analyze the format of the identified set of values at step 358 and determine if the format is proper for the associated criterion at step 360. The processing entity operating the data ingress tool 116A may have knowledge of proper formats for each of the criterions that the data analysis tool 116B requires and may compare these formats to the formats of the identified set of values. In various embodiments, the processing entity may look-up the proper formats for each of the required criterions from a database such as database 118 or 128; the processing entity may communicate with a processing entity operable to process the data analysis tool 116B to determine the proper formats for each of the required criterions; or the proper formats for each of the required criterions may be embedded in the data ingress tool 116A operated by the processing entity. For example, the data analysis tool 116B may require values associated with a date criterion to be provided in one of a set number of proper formats. In another example, the data analysis tool 116B may require values associated with an amount criterion to be divided into separate credit and debit columns. In yet another example, the data analysis tool 116B may require the identified set of values associated with a transaction ID criterion to meet a set of behavior characteristics. A wide range of particular formats may be required for the identified set of values associated with each of the required criterions and the specific format requirements described herein and more specifically with reference to FIGS. 4 and 5A-5F should not limit the scope of the present invention.

If the identified set of values are deemed to not be in the proper format for the associated criterion at step 360, the processing entity operating the data ingress tool 116A may determine one or more data manipulation operations to apply to the data file at step 362 to ensure values associated with the criterion in each data entry are in the proper format for the data analysis tool 116B. The data manipulation operations may comprise a wide variety of operations that can be used to modify a set of data such as a spreadsheet which may comprise a high quantity of data entries. In some examples, a general ledger may comprise hundreds of thousand or millions of data entries that may be desired to be analyzed by the data analysis tool 116B. The data manipulation operations may comprise operations such as splitting cells, joining cells, deleting cells, modifying cells, adding cells, reformatting cells, grouping cells, ungrouping cells, deleting signifiers in cells, modifying signifiers in cells, adding signifiers in cells and other modification actions that can be applied in a spreadsheet. As the identified set of values may comprise a column of values within a very large set of data entries, the data manipulation operations may comprise modifications applied to one or more columns for all of the data entries in the data file. The processing entity may then conduct the data manipulation operations for the criterion associated with the identified set of values at step 364. In one implementation, an open source software such as Open Refine (www.openrefine.org) could be used to complete the data manipulation operations, though other data shaping software tools could be used to implement the data manipulation operations. In some embodiments, rather than conduct the data manipulation operations for a single criterion as shown in step 364 for each criterion, the processing entity may conduct the data manipulation operations for two or more criterions at one time at step 368. This may be more efficient in some implementations when manipulating large numbers of data entries in a data file.

If the format of the identified set of values associated with the determined criterion is deemed to be proper for the data analysis tool 116B, the processing entity may determine if a set of values associated with an additional criterion is required to be identified and reviewed for proper formatting at step 366. Similarly, once the data manipulation operations for the criterion associated with the identified set of values is conducted, the processing entity may determine if a set of values associated with an additional criterion is required to be identified and reviewed for proper formatting. If an additional criterion is required, the processing entity can return to step 340 and identify another set of values linked to a common criterion. If an additional criterion is not required (i.e. sets of values associated with all required criterion have been identified) and the processing entity has not conducted all of the data manipulation operations determined for the identified sets of values associated with the determined criterions, the processing entity may then conduct the data manipulation operations for the identified sets of values associated with criterions that had not yet been conducted at step 368. At this point, the processing entity can conclude that the data shaping process of FIG. 3C is complete. In some embodiments, the processing entity operating the data ingress tool 116A may then complete step 216 of FIG. 2A and proceed to step 218 previously described and the steps of FIG. 2B.

Figure 4:
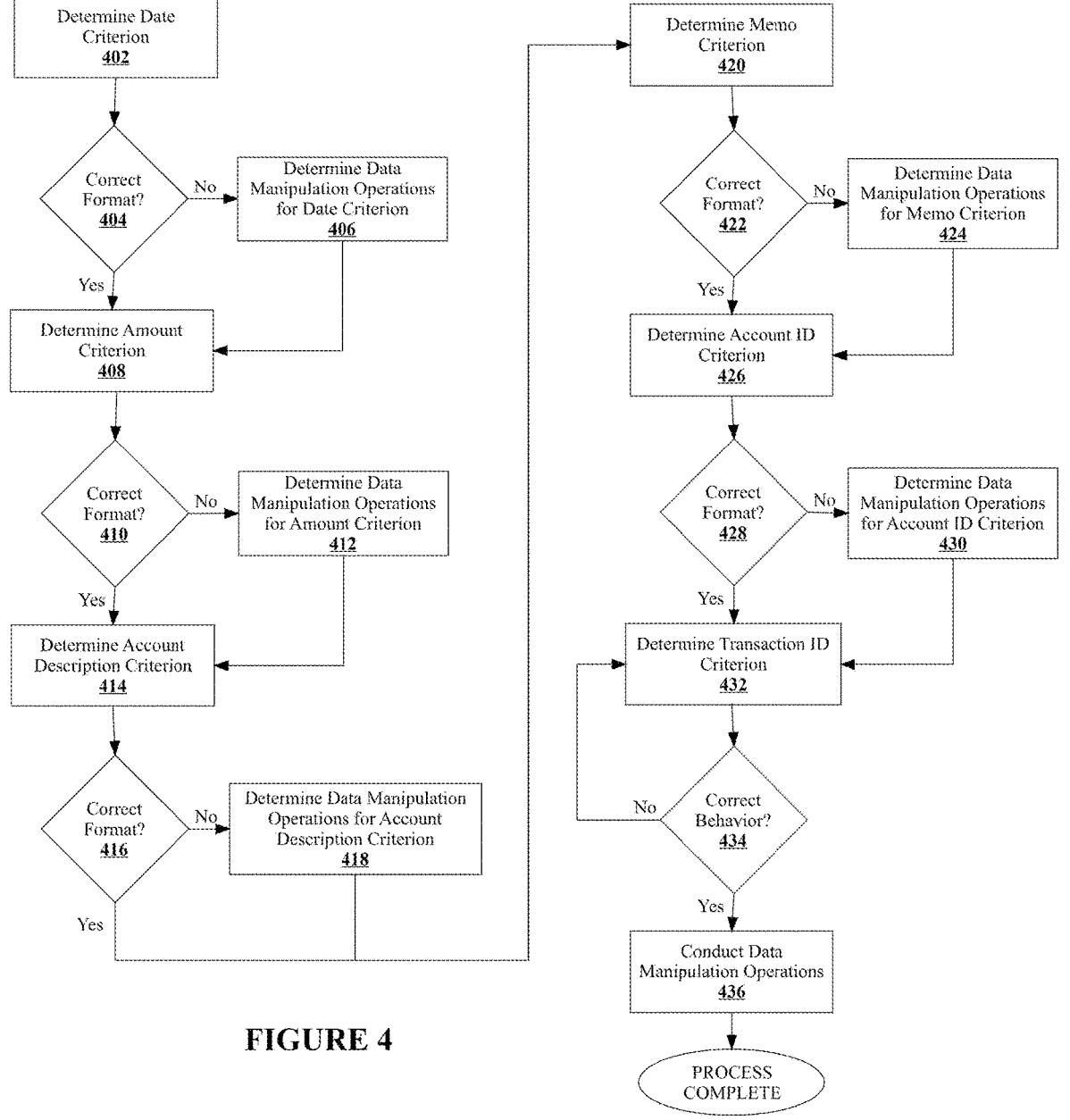
FIG. 4 is a flow chart depicting steps performed by a processing entity implementing a data shaping process on a general ledger according to a sample implementation.

FIG. 4 is a flow chart depicting steps performed by a processing entity implementing a data shaping process on a general ledger according to a sample implementation of the present invention and FIGS. 5A, 5B, 5C, 5D, 5E and 5F are flow charts depicting steps performed by the processing entity of FIG. 4 to ensure data in the general ledger are prepared properly based on a set of required criterions for the data analysis tool 116B. As described with reference to FIGS. 3A-3C, the processing entity implementing the steps of FIGS. 4 and 5A-5F may be the processing entity 112 if the network computing apparatus 106 is implementing the data ingress tool 116A, though alternatively the processing entity 122 may implement the steps if the data ingress tool 116A is implemented by the client computing apparatus 102. FIGS. 4 and 5A-5F illustrate a specific implementation of FIG. 3C that may be used for a specific application in which the data file is a general ledger, though one skilled in the art will understand that other implementations may be modelled off of the implementation of FIGS. 4 and 5A-5F and this description should not limit the scope of present invention.

FIG. 4 depicts steps for the processing entity implementing the data ingress tool 116A to identify sets of values in a general ledger file associated with a set of six criterions that the data analysis tool 116B may require to properly analyze the data file. The required criterions may need to be in specific formats to be properly processed and the general ledger file may need to be manipulated to ensure the file is in the format required for analysis. More or less than these six required criterion may be necessary for a data analysis tool that is to analyze a general ledger file and the specific criterion used and number of required criterion should not limit the scope of the present invention. As shown in FIG. 4, the processing entity determines a set of values in the general ledger file associated with a variety of criterions specifically used by the data analysis tool 116B, confirms if the values associated with the criterions are in the correct format for the data analysis tool 116B and, if not, determines a set of data manipulation operations to apply to the general ledger file in order for the values associated with the criterions to be converted to the correct format. The steps of FIG. 4 illustrate a particular set of required criterions for a particular implementation and illustrate an order for processing each required criterion. It should be understood that in other implementations some, if not all, of the required criterions may be different; more or less required criterions may be processed for; and the order of the analyzing of different required criterions may be different. In some cases, the analyzing of different required criterions may be simultaneous rather in a series logic design as shown in FIG. 4.

In the sample implementation of FIG. 4, the processing entity determines a set of values in the general ledger file associated with a date criterion at step 402, confirms if the values associated with the date criterion are in the correct format for the data analysis tool 116B at step 404 and, if not, determines a set of data manipulation operations to apply to the general ledger file at step 406 in order for the values associated with the date criterion to be converted to the correct format. The date criterion may be values in the data entries linked to a date in which a transaction took place, date in which the data entry was entered by a user or computing apparatus, a date in which a document related to the data entry was generated such as an order date or ship date, and/or another date associated with the data entry that may have been recorded and included in the data entry. The values for the date criterion may include a time of day indication or may only include information related to the relevant day. Steps 402, 404 and 406 are described in more detail with reference to FIG. 5A for one particular sample implementation.

Next, the processing entity determines a set of values in the general ledger file associated with an amount criterion at step 408, confirms if the values associated with the amount criterion are in the correct format for the data analysis tool 116B at step 410 and, if not, determines a set of data manipulation operations to apply to the general ledger file at step 412 in order for the values associated with the amount criterion to be converted to the correct format. The values in the amount criterion may comprise numeric values in each of the data entries linked to a financial amount of a transaction or portion of a transaction and may be categorized as a credit or debit amount or may be included simply as a numeric value with a positive or negative indication indicating whether the amount is a credit or debit amount (positive for a credit amount and negative for a debit amount). Steps 408, 410 and 412 are described in more detail with reference to FIG. 5B for one particular sample implementation.

Next, the processing entity determines a set of values in the general ledger file associated with an account criterion at step 414, confirms if the values associated with the account criterion are in the correct format for the data analysis tool 116B at step 416 and, if not, determines a set of data manipulation operations to apply to the general ledger file at step 418 in order for the values associated with the account criterion to be converted to the correct format. The values in the account criterion may comprise alphanumeric values in each of the data entries linked to a description of an account which in a general ledger data file may represent any one of a wide array of financial accounts (ex. COGS, inventory, accounts receivable etc.) and may be entered in a wide range of manners, shorthand and languages. Steps 416, 418 and 420 are described in more detail with reference to FIG. 5C for one particular sample implementation.

Next, the processing entity determines a set of values in the general ledger file associated with a memo criterion at step 420, confirms if the values associated with the memo criterion are in the correct format for the data analysis tool 116B at step 422 and, if not, determines a set of data manipulation operations to apply to the general ledger file at step 424 in order for the values associated with the memo criterion to be converted to the correct format. The values in the memo criterion may comprise alphanumeric values in each of the data entries linked to comments related to the transaction represented by the particular data entry. The values in the memo criterion may comprise a wide spectrum of information including, but not limited to, reference identifiers to specific documents such as purchase orders, invoices, shipping confirmations, cheque numbers, etc. Steps 420, 422 and 424 are described in more detail with reference to FIG. 5D for one particular sample implementation.

Next, the processing entity determines a set of values in the general ledger file associated with an account ID criterion at step 426, confirms if the values associated with the account ID criterion are in the correct format for the data analysis tool 116B at step 428 and, if not, determines a set of data manipulation operations to apply to the general ledger file at step 430 in order for the values associated with the account ID criterion to be converted to the correct format. The values in the account ID criterion may comprise alphanumeric values in each of the data entries linked to an account identifier related to the transaction represented by the particular data entry. Steps 426, 428 and 430 are described in more detail with reference to FIG. 5E for one particular sample implementation.

In FIG. 4, once the specific five required criterions, date, amount, account, memo, and account ID are processed, the processing entity attempts to determine a set of values in the general ledger file that can be used as a transaction ID criterion, which in some cases may be referred to as a journal entry ID criterion, at step 432. The transaction ID criterion can be used to group data entries by transaction. As will be described with reference to FIGS. 5F and 6A-6B, there are particular behaviors expected from the values that are linked to the transaction ID criterion. Once a particular set of values in the general ledger file are identified as candidate values to be used as the transaction ID criterion, the processing entity confirms if the candidate values have the correct behavior to satisfy the requirements to be values used as the transaction ID criterion at step 434. The correct behavior may relate to the number of data entries with a common value as the transaction ID and/or may relate to whether there are also common values in other criterions that data entries with a common value as the transaction ID share. In some embodiments, the processing entity may generate a confidence score for the candidate values having the correct behavior to satisfy the requirements to be used as the transaction ID criterion and may deem the candidate values have the correct behavior if the confidence score is greater than a minimum threshold. If the candidate values do not have the correct behavior, the processing entity attempts to determine another set of values in the general ledger file that can be used as a transaction ID criterion at step 432. This can be an iterative approach and may result in more than one potential set of values that could be used as the transaction ID criterion.

If the candidate values have the correct behavior to satisfy the requirements to be values used as the transaction ID at step 434, the processing entity conducts the data manipulation operations determined to apply to the general ledger file at step 436 in order for the values associated with the required criterions of FIG. 4 to be converted to the correct format for the data analysis tool 116B. In some implementations, the conducting of the data manipulation operations may not wait until after all of the criterions have been analyzed and instead the conducting of the data manipulation operations may occur when the data manipulation operations are determined for the particular criterion. With the potential of extremely large numbers of data entries in the general ledger file, data manipulation operations of the entire file may be computing power intensive and may preclude further analysis of the data entries until the data manipulation operations are completed. In particular implementations, there may be advantages of conducting the data manipulation operations after each criterion is analyzed or advantages of conducting the data manipulation operations after all of the criterions have been analyzed. Further, since the determining of a set of values to use as the transaction ID criterion may require analysis of values in the data entries for other criterions, in some implementations, the conducting of the data manipulation operations could occur before the determining of the set of values to be used as the transaction ID criterion.

Figure 5A:
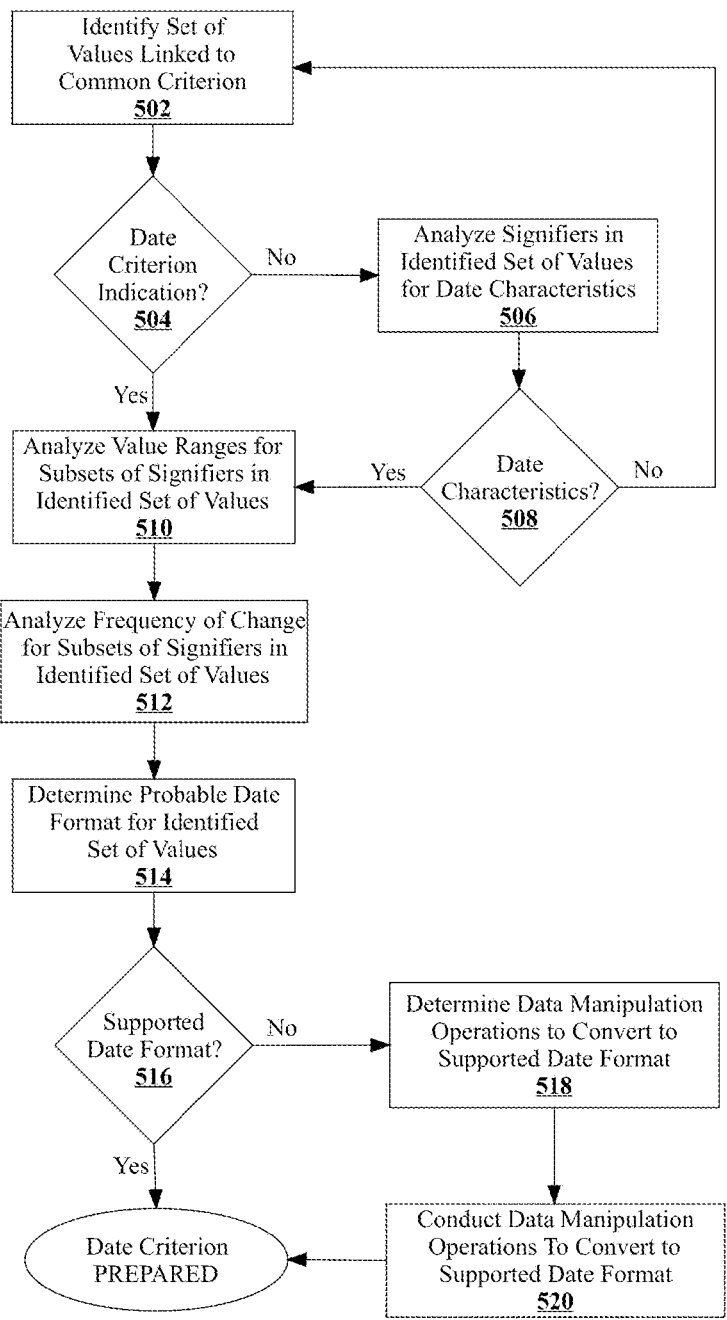
FIGS. 5A, 5B, 5C, 5D, 5E and 5F are flow charts depicting steps performed by the processing entity of FIG. 4 to ensure data in the general ledger are prepared properly based on a set of specific criterions.

FIG. 5A is a flow chart depicting a more detailed set of steps for the processing entity operating the data ingress tool 116A to implement steps 402, 404 and 406 of FIG. 4 according to one implementation. As shown, initially, the processing entity identifies a set of values linked to a common criterion across the data entries in the general ledger data file at step 502. In the case that the general ledger is implemented in a spreadsheet, the set of values linked to a common criterion may be values in one or more columns in the data entries, with or without an associated criterion identifier or header for the column. In other implementations, the set of values may be identified as linked to a common criterion by being in one or more common rows or may be otherwise logically linked. Further, the processing entity determines whether the identified set of values are associated with a date criterion indication at step 504. For instance, a header that comprises a date criterion indication may be identified for a column linked to the identified set of values.

If the identified set of values are not associated with a date criterion indication, the processing entity analyzes signifiers in a plurality of the identified set of values for date criterion characteristics at step 506. Date criterion characteristics may include having subsets of signifiers in each of the identified set of values comprising a) an indication of a year, potentially represented by four numeric signifiers starting with 19 or 20 or two numeric signifiers; b) an indication of a month, potentially represented by numeric signifiers between 1 and 12, or letter signifiers (often two or three letter signifiers that represent abbreviations of the names of the months); c) an indication of a day, potentially represented by numeric signifiers between 1 and 31; and d) separator signifiers between the indications of year, month and day, potentially embodied by dashes, slashes or spaces. At step 508, the processing entity determines if signifiers in the identified set of values have date criterion characteristics. If not, the processing entity may determine that the identified set of values are not the set of values linked to the date criterion and the processing entity returns to step 502 and identifies another set of values linked to a common criterion across the data entries in the general ledger data file in an attempt to locate a set of values that is linked to the date criterion.

If the identified set of values are associated with a date criterion indication at step 504 or if signifiers in the identified set of values have date criterion characteristics at step 508, the processing entity may semantically analyze the set of values or a portion of the full set of values to determine the current date format in the set of values. The processing entity may accomplish this in a number of deterministic and/or probabilistic manners. In one deterministic case, as depicted in step 510, the processing entity may analyze the value ranges for subsets of signifiers in a plurality of the identified set of values in an attempt to identify the sequence of signifiers that are related to various temporal periods such as the year, month of the year and day of the month by comparing the value ranges to acceptable value ranges for the various portions of a typical date. For instance, the year is generally going to comprise four numeric signifiers starting with 19 or 20 or two numeric signifiers from 00-99. The month, if represented in numbers, is generally going to comprise one or two numeric signifiers from 01-12. The day is generally going to comprise one or two numeric signifiers from 01-31. If any subset of signifiers in the identified set of values exceed 31, it is likely that subset of signifiers does not represent the day or month and likely represents the year. If any subset of signifiers in the identified set of values exceed 12, it is likely that subset of signifiers does not represent the month and, if the processing entity already understands that another subset of signifiers represents the year, the subset of signifiers that exceed 12 likely represents the day. If any subset of signifiers in the identified set of values is always equal to or less than 12 and other subsets of signifiers in the identified set of values are understood to be the day and year, the subset of signifiers that is always equal to or less than 12 likely represents the month.

For example, the date depicted as 30-09-95 can be deciphered as likely representing year: 1995, month: September (the $9^{th}$ month), and day 30 of the month September. The extrapolation of 95 to 1995 may be a probable guess by the processing entity as two digit years being converted to four digit years can have an element of risk of error due to each century having the same two digit set of years. The processing entity may be able to use other context information to extrapolate the century such as if the year is to represent a date of transaction in an accounting software, the only option is that the year could be 1995 as accounting software did not exist in previous centuries. In many other examples such as 09-08-07 it is not possible to know with certainty which subset of signifiers (09, 08, 07) represent the day, month and year as all three subsets of signifiers are within the acceptable value ranges for the day, month and year.

The processing entity may semantically analyze a plurality of values in the identified set of values to improve the likelihood of a deterministic determination to be concluded based on the value ranges of the subsets of signifiers and also to improve certainty of its assessment on which subsets of signifiers represent what temporal period (i.e. eliminate determinations based on potential typo errors). With an increase in the number of values in the identified set of values semantically analyzed, there is an increasing probability that one subset of the values will have a quantitative value that precludes them from being the subset associated with the month. By semantically analyzing a plurality of values in the identified set of values, a wider range of included numbers will be identified for each subset of signifiers and therefore it is more likely that one or more of the included numbers will preclude a subset of signifiers from being a specific temporal period. The more values in the identified set of values that are semantically analyzed, the more likely that the value range of the subsets of signifiers in the identified set of values will provide a deterministic conclusion of which of the subset of signifiers represent which temporal period. In some implementations, greater than 1000 values in the identified set of values may be semantically analyzed to improve the likelihood of determining which subset of signifiers represent which temporal period.

There are many formats possible for representing a date with a variety of potential temporal periods represented and formats for the temporal periods. The most common include, but are not limited to, DD-MM-YYYY, YYYY-MM-DD, MM-DD-YYYY, DD/MM/YYYY, YYYY/MM/DD, MM/DD/YY DD-MM-YY, YY-MM-DD, MM-DD-YY, DD/MM/YY, YY/MM/DD, MM/DD/YY where DD, MM and YY or YYYY are variables representing numeric signifiers for the day, month and year respectively. In some cases, the month may be represented by two to three letter signifiers or the full name of the month in the particular language that data is input. The use of these formats is somewhat dictated by local practise and custom. In other formats, date information is presented with additional temporal information. For instance, in some cases, the number of weeks in a year are used instead of the day and month. In this case, it would be understood that the acceptable range for the weeks in a year are 00-52. In other formats, the use of time of day may be included with or without the time zone. In this case, it would be understood that the acceptable range of the hours in a day is 00-23, the acceptable range of the minutes in an hour is 00-59, the acceptable range of the seconds in a minute is 00-59 and there may be a subset of signifiers that indicate AM or PM.

A second manner in which the processing entity may probabilistically determine the current date format in the set of values is to analyze a frequency of change for subsets of signifiers in the identified set of values, as depicted in step 512, in an attempt to identify the subsets of signifiers that are related to various temporal periods such as the year, month of the year and day of the month. For a whole year of data, the expected distribution of different days, months and years is 30.4:12:1. For a half month, the expected distribution of different days, months and years is 15.2:1:1. These expected distributions can be used by the processing entity to generate a probability for each subset of signifiers in the identified set of values representing specific temporal periods. Using a plurality of values in the identified set of values, a frequency of change for each subset of signifiers can be determined. A faster frequency of change across data entries is generally related to a smaller division of time. If the general ledger data file is assumed to be for a single fiscal year of a business, the processing entity may presume that the dates comprise one or two different numbers for years, up to 12 different numbers (or sequences of letters) for months and up to 31 different numbers for days. By sampling a plurality of each subset of signifiers in the identified set of values, the processing entity can determine a quantity of different numeric signifiers in each subset of signifiers. By comparing the quantity of different numeric signifiers in each subset to the expected distribution for quantifications of days, months and years, the processing entity can probabilistically determine which subset of signifiers represents which temporal period. The larger number of values in the identified set of values that are sampled, the processing entity may have a higher potential confidence in the temporal periods it estimates for each subset of signifiers. For instance, with a sampling of 1000 values, it can be expected that the processing entity can have a relatively high confidence in the determination of which subset of signifiers represents the year, which subset of signifiers represents the month of the year and which subset of signifiers represents the day of the month.

Although depicted in FIG. 5A as two separate and distinct steps 510, 512, it should be understood that the processing entity may execute both or only one of these processes separately or simultaneously in assessing the date format in the identified set of values. In some cases, the processing entity may only proceed with the probabilistic analysis of step 512 if the deterministic analysis of step 510 does not provide certainty on the format. In other cases, the processing entity may validate the deterministic analysis of step 510 with the probabilistic analysis of step 512.

Once the processing entity analyzes the identified set of values to determine or estimate the temporal periods for each subset of the signifiers in the identified set of values, the processing entity can determine the format for the date criterion for the set of values at step 514. Determining the format for the date criterion may comprise further semantic analysis to determine the separators used between the temporal periods (i.e. dashes, slashes, spaces) and whether other temporal information such as time of day was also included in the values. Once the format for the date criterion is determined, the processing entity determines whether the format for the date criterion is a supported date format for the data analysis tool 116B at step 516. In one specific implementation, the supported date formats for the data analysis tool 116B are YYYY/MM/DD, YYYY-MM-DD, MM-DD-YYYY, and MM/DD/YYYY, though other supported date formats may be supported or some of these formats may not be supported in some implementations.

If the format for the identified set of values associated with the date criterion is determined to be a supported date format for the data analysis tool 116B, the processing entity can conclude that the set of values associated with the date criterion are identified and in the correct format for further analysis. If the format for the date criterion is determined to not be a supported date format for the data analysis tool 116B, then the processing entity determines one or more data manipulation operations to convert the identified set of values to a supported date format at step 518. For the date criterion, the data manipulation operations may comprise a reformat operation in which subsets of signifiers in the values are reordered; separator signifiers replaced with alternative separator signifiers or no separator signifiers; letter signifiers comprising words/abbreviations representing months replaced with numeric signifier equivalents or vice versa if a particular letter format is proper for the data analysis tool 116B; two numeric signifier years replaced with four numeric signifier years; and/or time of day information deleted if not required by the data analysis tool 116B. Other data manipulation operations may further be required to modify the identified set of values to the proper format of the date criterion for the data analysis tool 116B.

The processing entity may then conduct the data manipulation operations on the data entries in the data file as required to convert the identified set of values to a supported date criterion format at step 520. In some implementations, the conducting of the data manipulation operations only occurs after all data manipulation operations needed for all criterions have been determined while in other implementations the data manipulation operations for the date criterion may be conducted prior to or after the data manipulation operations related to other criterions. In some cases, the data manipulation operations may take the processing entity material time to process and it may be more efficient for the data manipulation operations to be conducted together. After the data manipulation operations are conducted at step 520, the processing entity can conclude that the date criterion is identified and in the correct format for further analysis. In some embodiments, a plurality of date criterion linked to different actions (post date, ship date, invoice date, etc.) may be required. In this case, the steps of FIG. 5A may be repeated for other date criterion using information from criterion indications to understand the different actions associated with the plurality of date criterions.

Figure 5B:
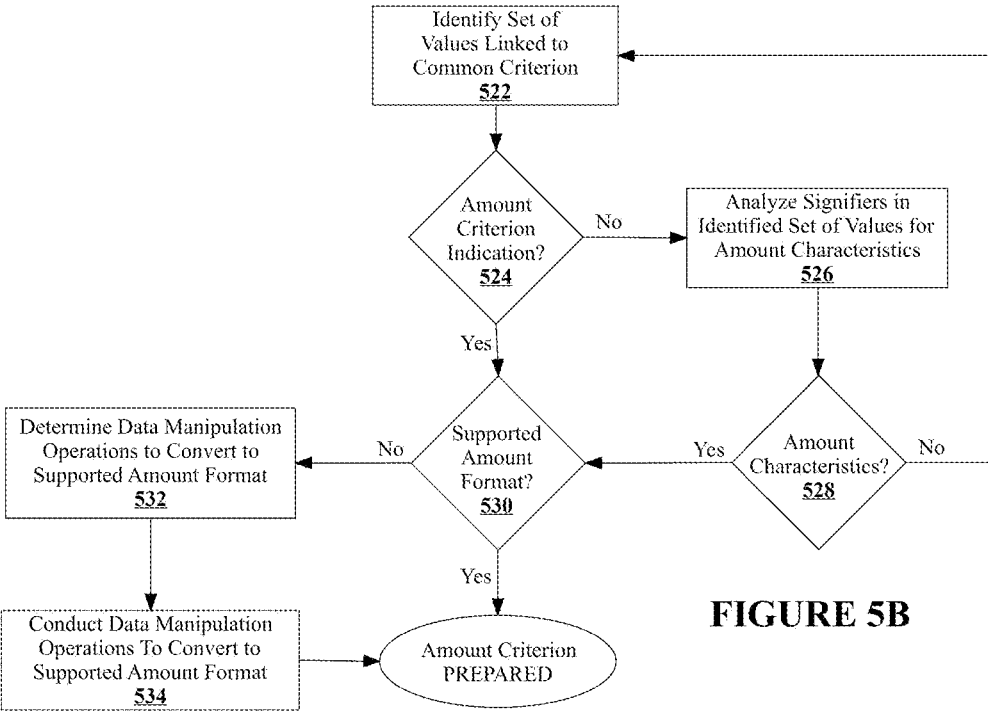

FIG. 5B is a flow chart depicting a more detailed set of steps for the processing entity operating the data ingress tool 116A to implement steps 408, 410 and 412 of FIG. 4 according to one implementation. As shown, initially, the processing entity identifies a set of values linked to a common criterion across the data entries in the general ledger data file at step 522. In the case that the general ledger is implemented in a spreadsheet, the set of values linked to a common criterion may be values in one or more columns in the data entries, with or without an associated criterion identifier or header for the column. In other implementations, the set of values may be identified as linked to a common criterion by being in one or more common rows or may be otherwise logically linked. Further, the processing entity determines whether the identified set of values are associated with an amount criterion indication at step 524. For instance, a header that comprises an amount criterion indication may be identified for a column linked to the identified set of values. The amount criterion indication in some implementations may comprise a debit criterion indication and a credit criterion indication. In this case, the set of values associated with the debit and credit criterion indications together can form the set of values associated with an amount criterion.

If the identified set of values are not associated with an amount criterion indication, the processing entity analyzes signifiers in a plurality of the identified set of values for amount criterion characteristics at step 526. The amount criterion characteristics comprises having signifiers in each of the identified set of values comprising a number indicative of a monetary amount. Indications that a value comprises a number indicative of a monetary amount may include: a) the value comprising numeric digit signifiers; b) the value not comprising letter signifiers; c) the value comprising a currency indication signifier such as a dollar sign or Euro symbol; d) the value comprising a decimal point signifier followed by two numeric digit signifiers to indicate a sub portion of a base currency, such as cents; and/or e) the value comprising a negative sign signifier prior to numeric digit signifiers or bracket signifiers on either side of numeric digit signifiers in the case that the monetary amount is associated with a debit. At step 528, the processing entity determines if signifiers in the identified set of values have amount criterion characteristics. If not, the processing entity may determine that the identified set of values are not the set of values linked to the amount criterion and the processing entity returns to step 522 and identifies another set of values linked to a common criterion across the data entries in the general ledger data file in an attempt to locate a set of values that is linked to the amount criterion. If the identified set of values are associated with an amount criterion indication at step 524 or if signifiers in the identified set of values have amount criterion characteristics at step 528, the processing entity may semantically analyze the set of values or a portion of the full set of values to determine the current amount format in the set of values in step 530. The processing entity may accomplish this in a number of manners depending on the supported formats for the amount criterion in the data analysis tool 116B. In one implementation, the data analysis tool 116B may require the amount criterion to have sets of values for debit and credit to be separated into two sets of values. In this case, all numeric amounts in the values would be positive, as numeric amounts that are negative would be converted to a positive debit amount. In another implementation, the data analysis tool 116B may require the amount criterion to have sets of values for debit and credit to be combined into a single set of values. In this case, each of the values linked to a debit may need a negative signifier to be added to its number signifiers and resultant value added to the set of values linked to credits for their data entries. In other embodiments, the data analysis tool 116B may require the amount criterion to be formatted differently and the processing entity would compare the format of the identified set of values with the supported formats for the amount criterion in the data analysis tool 116B at step 530.

If the format for the identified set of values associated with the amount criterion is determined to be a supported amount format for the data analysis tool 116B, the processing entity can conclude that the set of values associated with the amount criterion are identified and in the correct format for further analysis. If the format for the amount criterion is determined to not be a supported amount format for the data analysis tool 116B, then the processing entity determines one or more data manipulation operations to convert the identified set of values to a supported amount format at step 532. In one implementation in which separate debit and credit sets of values is the proper amount criterion format for the data analysis tool 116B, the data manipulation operations may comprise a split cell operation in which the identified sets of values are split into two sets of values to separate: a) values comprising no negative sign signifier or bracket signifiers indicative of a negative number into a credit set of values; and b) values comprising a negative sign signifier or bracket signifiers indicative of a negative number into a debit set of values. Further, the data manipulation operations may comprise a reformat operation in which the negative sign signifiers or bracket signifiers indicative of a negative number are deleted from the debit set of values. In another implementation in which a combined debit/credit set of value is the proper amount criterion format for the data analysis tool 116B, the data manipulation operations may comprise a combine cell operation in which the identified sets of values include a credit set of values and a debit set of values are combined into a single set of values including a) adding a negative sign signifier or bracket signifiers indicative of a negative number to all debit values; and b) combining the debit and credit sets of values by summing the totals (i.e. eliminating the zero values in the credit or debit values that are not applicable since only one of a credit or debit value for a particular data entry will have numeric signifiers in a typical general ledger). Other data manipulation operations may further be required to modify the identified set of values to the proper format of the amount criterion for data analysis tool 116B.

The processing entity may then conduct the data manipulation operations on the data entries in the data file as required to convert the identified set of values to a supported amount criterion format at step 534. In some implementations, the conducting of the data manipulation operations only occurs after all data manipulation operations needed for all criterions have been determined while in other implementations the data manipulation operations for the amount criterion may be conducted prior to or after the data manipulation operations related to other criterions. In some cases, the data manipulation operations may take the processing entity material time to process and it may be more efficient for the data manipulation operations to be conducted together. After the data manipulation operations are conducted at step 534, the processing entity can conclude that the amount criterion is identified and in the correct format for further analysis.

Figure 5C:
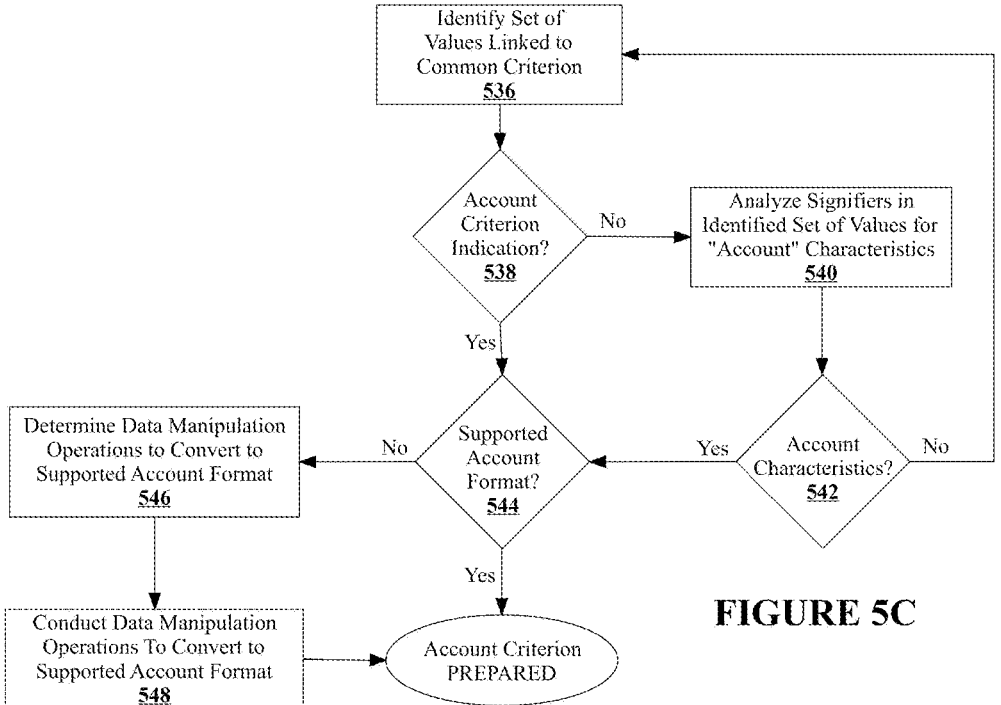

FIG. 5C is a flow chart depicting a more detailed set of steps for the processing entity operating the data ingress tool 116A to implement steps 414, 416 and 418 of FIG. 4 according to one implementation. As shown, initially, the processing entity identifies a set of values linked to a common criterion across the data entries in the general ledger data file at step 536. In the case that the general ledger is implemented in a spreadsheet, the set of values linked to a common criterion may be values in one or more columns in the data entries, with or without an associated criterion identifier or header for the column. In other implementations, the set of values may be identified as linked to a common criterion by being in one or more common rows or may be otherwise logically linked. Further, the processing entity determines whether the identified set of values are associated with an account criterion indication at step 538. For instance, a header that comprises an account criterion indication may be identified for a column linked to the identified set of values. The account criterion indication in some implementations may comprise the word "account", the words "account description" or alternative names for the word "account" such as synonyms or the word "account" or alternative words translated into another language.

If the identified set of values are not associated with an account criterion indication, the processing entity analyzes signifiers in a plurality of the identified set of values for account criterion characteristics at step 540. In some embodiments, the account criterion characteristics comprise having alphanumeric signifiers in each of the identified set of values with at least one of the values recognized by the processing entity as an account name based on a list of potential account names stored in a database, such as one of the databases 118, 128. The list of potential account names may be a predetermined list generated by one skilled in the art related to type of data file being used, such as a general ledger. In this case, typical account names used by entities that generate general ledger data files (i.e. businesses, governments, non-profits, etc.) may be included in the list of potential account names. In one implementation, potential account names include "accounts receivable" or "A/R" or "AR", "accounts payable" or "A/P" or "AP", "cost of goods sold" or "COGS", "inventory", "sales", "tax", "retained earnings", or other account names preset in the list of potential account names.

In some embodiments, the processing entity operating the data ingress tool 116A may learn potential account names from data files that have been processed by the data ingress tool 116A in the past and store these potential account names in a learned account name list that can be referenced as the list of potential account names used by a processing entity operating the data ingress tool 116A. In some implementations, the processing entity may further sort these previous account names by popularity to generate a list of the top 10, 50 or 100 most common account names and then use this list of most common account names as the list of potential account name used by a processing entity operating the data ingress tool 116A.

Although, in some embodiments, the account criterion characteristics comprises having at least one of the values in the identified set of values recognized by the processing entity as an account name based on a list of potential account names stored in a database, it should be understood in other embodiments more than one of the values in the identified set of values should have a value recognized by the processing entity as an account name based on the list of potential account names in order for the identified set of values to be considered to have account criterion characteristics. The more different values in the identified set of values that are recognized as account names on the list of potential account names, the higher confidence level that the processing entity will have that the identified set of values have account criterion characteristics. In some implementations, a particular minimum number of different values should be recognized as account names on the list of potential account names by the processing entity for the identified set of values to be determined to have account criterion characteristics. In some examples, the minimum number of different values recognized as account names is in the range of 2 to 5 while in others it may be 10.

In some implementations, a data file being processed by the processing entity operating the data ingress tool 116A is associated with a particular data file entity (ex. business entity, government entity, non-profit entity, etc.) and the list of potential account names is populated specifically for the data file entity based on previously processed data files from the data file entity or manually entered by a user specifically for the data file entity. In these cases, each data file entity may have a distinct list of potential account names that may be kept confidential from other data file entities that may have data files processed by the processing entity using the data ingress tool 116A. Further, the use of distinct lists of potential account names for each data file entity could allow for the learning of nomenclature, shorthand or language used by the data file entity, which may be unique compared to other data file entities. In other implementations, a data file being processed by the processing entity operating the data ingress tool 116A may be associated with a group of data file entities (ex. business entities, government entities, non-profit entities, etc.) and the list of potential account names is populated specifically for the group of data file entities based on previously processed data files from the group of data file entities or manually entered by a user specifically for the group of data file entities. Data file entities may be grouped by type of entity (i.e. type of business entity, government entity, non-profit entity, etc), industry area, size of entity, geographic location of entity, etc.

At step 542, the processing entity determines if signifiers in the identified set of values have account criterion characteristics. If not, the processing entity may determine that the identified set of values are not the set of values linked to the account criterion and the processing entity returns to step 536 and identifies another set of values linked to a common criterion across the data entries in the general ledger data file in an attempt to locate a set of values that is linked to the account criterion.

If the identified set of values are associated with an account criterion indication at step 538 or if signifiers in the identified set of values have account criterion characteristics at step 542, the processing entity may semantically analyze the set of values or a portion of the full set of values to determine the current account format in the set of values in step 544. The processing entity may accomplish this in a number of manners depending on the supported formats for the account criterion in the data analysis tool 116B. In one implementation, the data analysis tool 116B may require the values associated with the account criterion to use a specific set of signifiers such as simply using alphanumeric signifiers. In other implementations, the data analysis tool 116B may require the values associated with the account criterion to include specific account names required by the data analysis tool 116B which may be referenced in a list of required account names potentially stored in a database such as the database 118 or 128. In this case, the processing entity operating the data ingress tool 116A may compare values in the identified set of values to a list of required account names for the data analysis tool 116B to determine if each of the required account names are included in the identified set of values at step 544.

If the format for the identified set of values associated with the account criterion is determined to be a supported account format for the data analysis tool 116B, the processing entity can conclude that the set of values associated with the account criterion are identified and in the correct format for further analysis. If the format for the account criterion is determined to not be a supported account format for the data analysis tool 116B, then the processing entity determines one or more data manipulation operations to convert the identified set of values to a supported account format at step 546. In one implementation in which the data analysis tool 116B requires values associated with the account criterion to comprise a specific set of signifiers such as alphanumeric signifiers, the data manipulation operations may comprise identifying values in the identified set of values that do not abide by this formatting requirement and deleting non-conforming signifiers, leaving strings of signifiers that do abide by the formatting requirement. In other implementations in which the data analysis tool 116B requires the values associated with the account criterion to include specific account names required by the data analysis tool 116B, the data manipulation operations may comprise comparing the values in the identified set of values to a list of alternative account names potentially stored in a database such as the database 118 or 128 and replacing values in the identified set of values with alternative account names if the values are linked in the list of alternative account names. If after considering the list of alternative account names, the identified set of values still do not comprise the specific account names required by the data analysis tool 116B, either the processing entity may conclude that the identified set of values is not associated with the account criterion and returns to step 536 or the processing entity may initiate a manual intervention for a knowledgeable person or computing apparatus to allow for the account mapping of the values in the identified set of values to the specific account names required by the data analysis tool 116B. Once this manual invention has occurred, the processing entity may add additional entries to the list of alternative account names in order to reduce the need for manual interventions in the future. Other data manipulation operations may further be required to modify the identified set of values to the proper format of the account criterion for data analysis tool 116B.

The processing entity may then conduct the data manipulation operations on the data entries in the data file as required to convert the identified set of values to a supported account criterion format at step 548. In some implementations, the conducting of the data manipulation operations only occurs after all data manipulation operations needed for all criterions have been determined while in other implementations the data manipulation operations for the account criterion may be conducted prior to or after the data manipulation operations related to other criterions. In some cases, the data manipulation operations may take the processing entity material time to process and it may be more efficient for the data manipulation operations to be conducted together. After the data manipulation operations are conducted at step 548, the processing entity can conclude that the account criterion is identified and in the correct format for further analysis.

Although illustrated in FIG. 5C as including both steps 538 and 540, in some implementations, a processing entity operating the data ingress tool 116A may only perform one of these steps. For instance, in some cases, if the identified set of values is not associated with an account criterion indication at step 538, the processing entity may conclude the identified set of values are not associated with the account criterion and return to step 536. In other cases, the processing entity may not determine if the identified set of values is associated with an account criterion indication and instead proceed directly to step 540 and analyze signifiers in the identified set of values for account criterion characteristics. In yet other implementations, the processing entity may conduct both steps 538 and 540 irrespective of whether the identified set of values are associated with an account criterion indication. In this case, the processing entity may use both information concerning whether the identified set of values are associated with an account criterion indication and information concerning whether the identified set of values have account criterion characteristics in order to determine whether the identified set of values should be considered associated with the account criterion. Further, in some implementations, steps 544, 546 and 548 are excluded and the processing entity simply determines whether the identified set of values should be considered associated with the account criterion using step 538, steps 540/542 or both. This case may be applicable if the data analysis tool 116B does not have specific formatting requirements for the account criterion or specific required account names to be used.

Figure 5D:
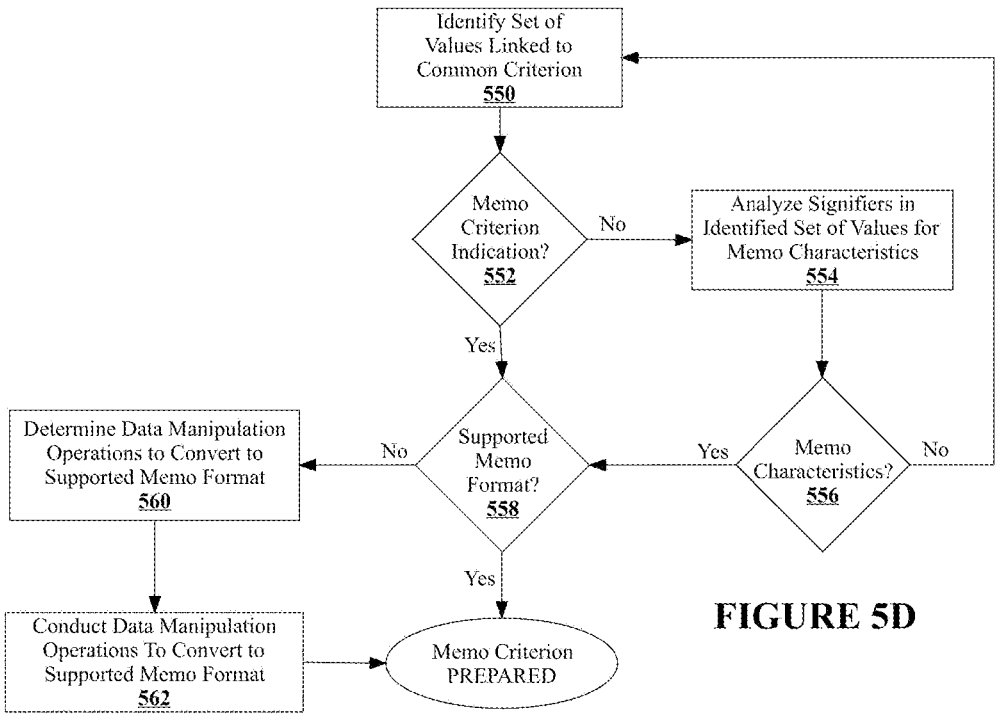

FIG. 5D is a flow chart depicting a more detailed set of steps for the processing entity operating the data ingress tool 116A to implement steps 420, 422 and 424 of FIG. 4 according to one implementation. As shown, initially, the processing entity identifies a set of values linked to a common criterion across the data entries in the general ledger data file at step 550. In the case that the general ledger is implemented in a spreadsheet, the set of values linked to a common criterion may be values in one or more columns in the data entries, with or without an associated criterion identifier or header for the column. In other implementations, the set of values may be identified as linked to a common criterion by being in one or more common rows or may be otherwise logically linked. Further, the processing entity determines whether the identified set of values are associated with a memo criterion indication at step 552. For instance, a header that comprises a memo criterion indication may be identified for a column linked to the identified set of values. The memo criterion indication in some implementations may comprise the word "memo" or similar words; alternative names for the word "memo" such as "comment", "note" or synonyms of "memo", "comment" or "note"; or the word "memo", "comment" or "note" when translated into another language.

If the identified set of values are not associated with a memo criterion indication, the processing entity analyzes signifiers in a plurality of the identified set of values for memo criterion characteristics at step 554. In some embodiments, the memo criterion characteristics comprise having alphanumeric signifiers in each of the identified set of values and not being associated with another criterion. At step 556, the processing entity determines if signifiers in the identified set of values have memo criterion characteristics. If not, the processing entity may determine that the identified set of values are not a set of values linked to the memo criterion and the processing entity returns to step 550 and identifies another set of values linked to a common criterion across the data entries in the general ledger data file in an attempt to locate a set of values that is linked to the memo criterion. In some embodiments, the processing entity may identify a plurality of sets of values to be associated with the memo criterion and the processing entity may repeat steps 550, 552, 554 and 556 for a plurality of sets of values, potentially all of the sets of values in the data file that have not been otherwise associated with another criterion.

If the identified set of values are associated with a memo criterion indication at step 552 or if signifiers in the identified set of values have memo criterion characteristics at step 556, the processing entity may semantically analyze the set of values or a portion of the full set of values to determine the current memo format in the set of values in step 558. The processing entity may accomplish this in a number of manners depending on the supported formats for the memo criterion in the data analysis tool 116B. In one implementation, the data analysis tool 116B may require the values associated with the memo criterion to use a specific set of signifiers such as simply using alphanumeric signifiers. In the case that a plurality of sets of values are determined to be associated with the memo criterion, a supported format for the memo criterion in the data analysis tool 116B may be to have the plurality of sets of values combined into a single set of values (ex. a single column of cells in a spreadsheet program) associated with the memo criterion for processing by the data analysis tool 116B.

If the format for the identified set of values associated with the memo criterion is determined to be a supported memo format for the data analysis tool 116B, the processing entity can conclude that the set of values associated with the memo criterion are identified and in the correct format for further analysis. If the format for the memo criterion is determined to not be a supported memo format for the data analysis tool 116B, then the processing entity determines one or more data manipulation operations to convert the identified set of values to a supported memo format at step 560. In one implementation in which the data analysis tool 116B requires values associated with the memo criterion to comprise a specific set of signifiers such as alphanumeric signifiers, the data manipulation operations may comprise identifying values in the identified set of values that do not abide by this formatting requirement and deleting non-conforming signifiers, leaving strings of signifiers that do abide by the formatting requirement. In other implementations in which the data analysis tool 116B requires the values associated with the memo criterion to be a single set of values (ex. a single column of cells in a spreadsheet program), the data manipulation operations may comprise combining the values in each data entry across the plurality of sets of values associated with the memo criterion. Other data manipulation operations may further be required to modify the identified set of values to the proper format of the memo criterion for data analysis tool 116B.

The processing entity may then conduct the data manipulation operations on the data entries in the data file as required to convert the identified set of values to a supported memo criterion format at step 562. In some implementations, the conducting of the data manipulation operations only occurs after all data manipulation operations needed for all criterions have been determined while in other implementations the data manipulation operations for the memo criterion may be conducted prior to or after the data manipulation operations related to other criterions. In some cases, the data manipulation operations may take the processing entity material time to process and it may be more efficient for the data manipulation operations to be conducted together. After the data manipulation operations are conducted at step 562, the processing entity can conclude that the memo criterion is identified and in the correct format for further analysis.

Figure 5E:
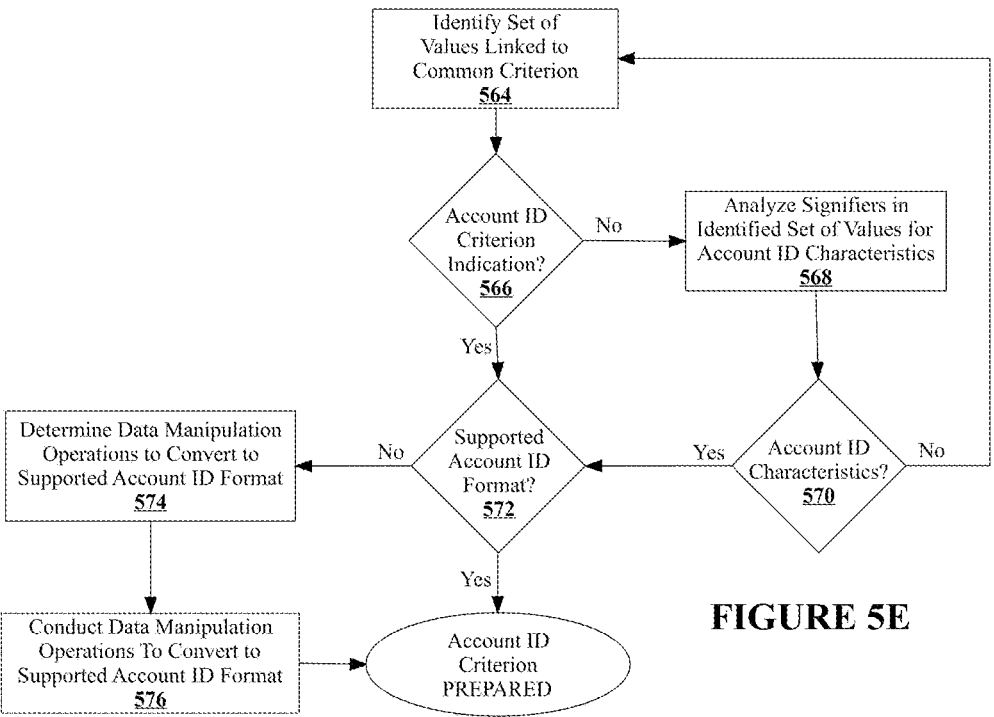

FIG. 5E is a flow chart depicting a more detailed set of steps for the processing entity operating the data ingress tool 116A to implement steps 426, 428 and 430 of FIG. 4 according to one implementation. As shown, initially, the processing entity identifies a set of values linked to a common criterion across the data entries in the general ledger data file at step 564. In the case that the general ledger is implemented in a spreadsheet, the set of values linked to a common criterion may be values in one or more columns in the data entries, with or without an associated criterion identifier or header for the column. In other implementations, the set of values may be identified as linked to a common criterion by being in one or more common rows or may be otherwise logically linked. Further, the processing entity determines whether the identified set of values are associated with an account ID criterion indication at step 566. For instance, a header that comprises an account ID criterion indication may be identified for a column linked to the identified set of values. The account ID criterion indication in some implementations may comprise the word "account ID" or alternative names such as "account number", etc. or a more specific name such as "vendor ID", "customer ID", etc. or similar terms translated into another language.

If the identified set of values are not associated with an account ID criterion indication, the processing entity analyzes signifiers in a plurality of the identified set of values for account ID criterion characteristics at step 568. In some embodiments, the account ID criterion characteristics comprise having alphanumeric signifiers in each of the identified set of values with at least a portion of the values having the same sequence of alphanumeric signifiers, indicating a common format for the account identifiers. For example, the identified set of values could include a portion of values that all are formatted as ###-###-%%% where #=numeric signifier and %=letter signifier. This common pattern in the identified set of values can highlight an account naming structure. The processing entity can gain increased confidence that the identified set of values are associated with the account ID criterion with the more consistency in sequence that the signifiers in the identified set of values contain. In some implementations, the processing entity may reference a list of potential account ID naming structures from a database such as the database 118 or 128 and may compare naming structures from the list of potential account ID naming structures with signifiers of the identified set of values to determine if the signifiers in the identified set of values follow one or more of the naming structures in the list of potential account ID naming structures and therefore determine the identified set of values have account ID characteristics.

The list of potential account ID naming structures may be a predetermined list generated with knowledge of the entity that generated the data file or standards that may have been used by the entity that generated the data file. In some embodiments, the processing entity operating the data ingress tool 116A may learn potential account ID naming structures from data files that have been processed by the data ingress tool 116A in the past and store these potential account ID naming structures in a learned account ID naming structure list that can be referenced as the list of potential account ID naming structures used by a processing entity operating the data ingress tool 116A.

In some implementations, a data file being processed by the processing entity operating the data ingress tool 116A is associated with a particular data file entity (ex. business entity, government entity, non-profit entity, etc.) and the list of potential account ID naming structures is populated specifically for the data file entity based on previously processed data files from the data file entity or manually entered by a user specifically for the data file entity. In these cases, each data file entity may have a distinct list of potential account ID naming structures that may be kept confidential from other data file entities that may have data files processed by the processing entity using the data ingress tool 116A. Further, the use of distinct lists of potential account ID naming structures for each data file entity could allow for the learning of slightly modified ID naming structures used for other purposes (customer IDs, vendor IDs, document IDs, invoice IDs, etc.) used by the data file entity, which may be unique compared to other data file entities. In other implementations, a data file being processed by the processing entity operating the data ingress tool 116A may be associated with a group of data file entities (ex. subsidiaries within a conglomerate, associated business entities, associated government entities, associated non-profit entities, etc.) and the list of potential account ID naming structures is populated specifically for the group of data file entities based on previously processed data files from the group of data file entities or manually entered by a user specifically for the group of data file entities.

At step 570, the processing entity determines if signifiers in the identified set of values have account ID criterion characteristics. If not, the processing entity may determine that the identified set of values are not the set of values linked to the account ID criterion and the processing entity returns to step 564 and identifies another set of values linked to a common criterion across the data entries in the general ledger data file in an attempt to locate a set of values that is linked to the account ID criterion.

If the identified set of values are associated with an account ID criterion indication at step 566 or if signifiers in the identified set of values have account ID criterion characteristics at step 570, the processing entity may semantically analyze the set of values or a portion of the full set of values to determine the current account ID format in the set of values in step 572. The processing entity may accomplish this in a number of manners depending on the supported formats for the account ID criterion in the data analysis tool 116B. In one implementation, the data analysis tool 116B may require the values associated with the account ID criterion to use a specific type of signifiers such as numeric or alphanumeric or a specific naming structure in the signifiers such as one or more naming structures referenced in the list of potential account ID naming structures.

If the format for the identified set of values associated with the account ID criterion is determined to be a supported account ID format for the data analysis tool 116B, the processing entity can conclude that the set of values associated with the account ID criterion are identified and in the correct format for further analysis. If the format for the account ID criterion is determined to not be a supported account ID format for the data analysis tool 116B, then the processing entity determines one or more data manipulation operations to convert the identified set of values to a supported account ID format at step 574. In one implementation in which the data analysis tool 116B requires values associated with the account ID criterion to comprise a specific set of signifiers such as alphanumeric signifiers, the data manipulation operations may comprise identifying values in the identified set of values that do not abide by this formatting requirement and deleting non-conforming signifiers, leaving strings of signifiers that do abide by the formatting requirement. In other implementations in which the data analysis tool 116B requires the values associated with the account ID criterion to follow a specific naming structure, the data manipulation operations may comprise generating a series of replacement values usable for the account ID criterion, assigning the replacement values to values in the identified set of values, and replacing the identified set of values with the replacement values that abide by the required account ID naming structure. Further, in some implementations, a manual intervention may be initiated to determine data manipulation operations that could be used to modify the identified set of values to the proper format of the account ID criterion for data analysis tool 116B.

The processing entity may then conduct the data manipulation operations on the data entries in the data file as required to convert the identified set of values to a supported account ID format at step 576. In some implementations, the conducting of the data manipulation operations only occurs after all data manipulation operations needed for all criterions have been determined while in other implementations the data manipulation operations for the account ID criterion may be conducted prior to or after the data manipulation operations related to other criterions. In some cases, the data manipulation operations may take the processing entity material time to process and it may be more efficient for the data manipulation operations to be conducted together. After the data manipulation operations are conducted at step 576, the processing entity can conclude that the account ID criterion is identified and in the correct format for further analysis.

Although illustrated in FIG. 5E as including both steps 566 and 568, in some implementations, a processing entity operating the data ingress tool 116A may only perform one of these steps. For instance, in some cases, if the identified set of values is not associated with an account ID criterion indication at step 566, the processing entity may conclude the identified set of values are not associated with the account ID criterion and return to step 564. In other cases, the processing entity may not determine if the identified set of values is associated with an account ID criterion indication and instead proceed directly to step 568 and analyze signifiers in the identified set of values for account ID criterion characteristics. In yet other implementations, the processing entity may conduct both steps 566 and 568 irrespective of whether the identified set of values are associated with an account ID criterion indication. In this case, the processing entity may use both information concerning whether the identified set of values are associated with an account ID criterion indication and information concerning whether the identified set of values have account ID criterion characteristics in order to determine whether the identified set of values should be considered associated with the account ID criterion. Further, in some implementations, steps 572, 574 and 576 are excluded and the processing entity simply determines whether the identified set of values should be considered associated with the account ID criterion using step 566, steps 568/570 or both. This case may be applicable if the data analysis tool 116B does not have specific formatting requirements for the account ID criterion or a specific account ID naming structure to be used.

Figure 5F:
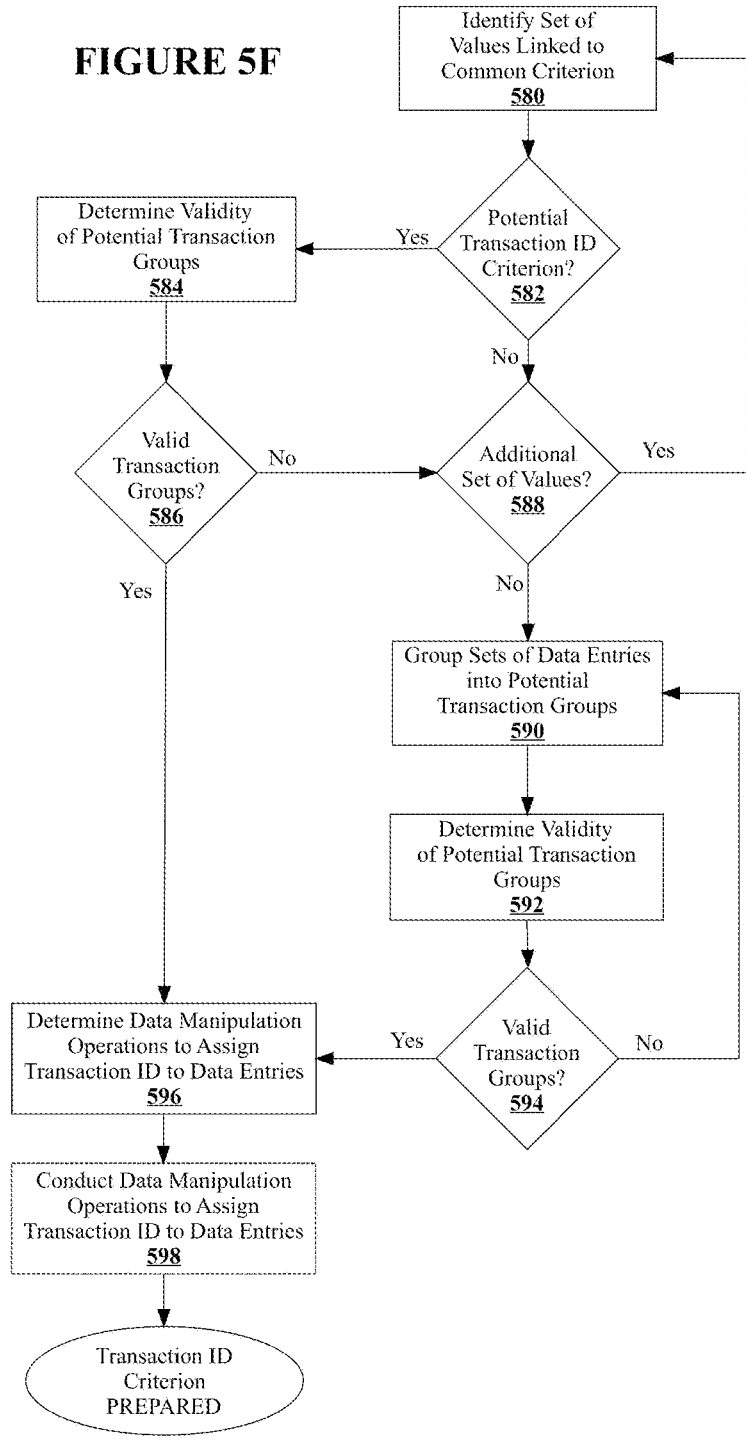

FIG. 5F is a flow chart depicting a more detailed set of steps for the processing entity operating the data ingress tool 116A to implement steps 432 and 434 of FIG. 4 according to one implementation. As shown, initially, the processing entity identifies a set of values linked to a common criterion across the data entries in the general ledger data file at step 580. In the case that the general ledger is implemented in a spreadsheet, the set of values linked to a common criterion may be values in one or more columns in the data entries, with or without an associated criterion identifier or header for the column. In other implementations, the set of values may be identified as linked to a common criterion by being in one or more common rows or may be otherwise logically linked. Further, the processing entity determines whether the identified set of values is associated with a transaction ID criterion indication at step 582, which may also be called a journal entry ID. For instance, a header that comprises a transaction ID criterion indication may be identified for a column linked to the identified set of values. The transaction ID criterion indication in some implementations may comprise the word "transaction ID" or alternative names such as "transaction", "journal entry", "journal entry ID", "trans. no.", "journal entry no." etc. or similar terms translated into another language.

If the identified set of values are associated with a transaction ID criterion indication, the processing entity groups the data entries by the identified set of values to put them into potential transaction groups in which the data entries corresponding to a single transaction are grouped together with the same transaction ID value at step 584. In this case, the processing entity may sort the data entries using the identified set of values and groups the data entries with common values in the identified set of values together. The processing entity subsequently determines whether the potential transaction groups of step 584 are valid by testing behavior characteristics of the potential transaction groups at step 586 and determining if they are consistent with the behavior characteristics expected of transaction groups by the data analysis tool 116B. The testing of the behavior characteristics of the potential transaction groups may be done in a wide range of manners with two potential implementations described with reference to FIGS. 6A and 6B. If the behavior characteristics of the potential transaction groups are deemed to not be consistent with characteristics expected of transaction groups by the data analysis tool 116B, the processing entity can conclude that the identified set of values is not correct for properly grouping data entries by transaction despite being associated with a criterion indication that appears to be a transaction ID criterion indication. In this case, the criterion indication associated with the identified set of values is deemed not to be a proper transaction ID criterion indication for the purposes of the data analysis tool 116B.

If the identified set of values are not associated with a transaction ID criterion indication at step 582 or the potential transaction groups formed using the identified set of values are deemed to not be valid at step 586, the processing entity may determine whether there is at least one additional set of values that are linked to a common criterion that could be reviewed for a proper transaction ID criterion indication at step 588. If there is at least one additional set of values that could be reviewed, the processing entity may return to step 580 and consider whether another set of values linked to a common criterion is associated with a transaction ID criterion indication and, if so, whether the identified set of values can be used to form groups of data entries with proper behavior characteristics for transaction groups. Steps 580, 582, 584, 586 and 588 together can be seen as a filter to identify sets of values associated with potential transaction ID criterion indications and then testing of these sets of values to determine if these sets of values can be used by the data analysis tool 116B as proper transaction IDs for the data entries.

If the processing entity reviews the sets of values and does not identify any sets of values associated with a transaction ID criterion indication that can be used by the data analysis tool 116B as transaction IDs, the processing entity may group sets of data entries into potential transaction groups based upon one or more sets of values associated with other criterions understood by the processing entity at step 590. In some embodiments, the processing entity may understand which sets of values are applicable to a plurality of criterions including, but not limited to, a date criterion, an amount criterion, an account criterion, a memo criterion, an account ID criterion, and/or other criterions that may comprise a user ID and/or document ID (i.e. purchase order number, invoice number, packing slip number, etc.). In order to group sets of data entries into potential transaction groups, the processing entity may sort the data entries by values in the data entries associated with a first criterion and, in some cases, then secondly sort the data entries by values in the data entries associated with a second criterion. If the sorting is done only with the first criterion, the processing entity may group the data entries together that have common values associated with the first criterion or values associated with the first criterion within similar ranges (for example, similar times in the case that the first criterion is a date criterion including an indication of time of day). If the sorting is done with both the first and second criterion, the processing entity may group the data entries together that have common values associated with the first criterion and common values associated with the second criterion; or values associated with the first or second criterion within similar ranges. In other implementations, values associated with more than two criterions could also be used by the processing entity to group the data entries.

The processing entity subsequently determines whether the potential transaction groups of step 590 are valid by testing behavior characteristics of the potential transaction groups at step 592 and determining if they are consistent with the behavior characteristics expected of transaction groups by the data analysis tool 116B. The testing of the behavior characteristics of the potential transaction groups may be done in a wide range of manners with two potential implementations described with reference to FIGS. 6A and 6B. If the behavior characteristics of the potential transaction groups are deemed to not be consistent with characteristics expected of transaction groups by the data analysis tool 116B, the processing entity can conclude that the technique used to sort the data entries in step 590 was not correct for properly grouping data entries by transaction. In this case, the processing entity may return to step 590 and attempt a different technique to group the sets of data entries into potential transaction groups, such as sorting the data entries by values in the data entries associated with a different criterion or a different combination of criterions.

Further, in some embodiments, the processing entity may determine that a first portion of the potential transaction groups are consistent with characteristics expected of transaction groups while a second portion of the potential transaction groups are not consistent with characteristics expected of transaction groups. In this case, the processing entity may treat the potential transaction groups of the first portion as valid and the potential transaction groups of the second portion as invalid. In this case, the processing entity may return to step 590 and attempt a different technique to group the sets of data entries in the second portion into potential transaction groups, such as sorting the data entries by values in the data entries associated with a different criterion or a different combination of criterions. This iterative process of validating portions of the potential transaction groups may be done multiple times until a sufficient portion of the data entries are deemed to be in a valid potential transaction group.

If the potential transaction groups are deemed to be valid at step 586 or step 592, the processing entity may determine one or more data manipulation operations to assign appropriate transaction IDs to each of the data entries at step 594. In the case that the processing entity grouped the data entries into potential transaction groups by sorting the identified set of values associated with a transaction ID criterion indication at step 584, no data manipulation operations may be necessary; or, in some cases, the data manipulation operations may comprise renaming the transaction ID criterion indication to a term such as "Transaction ID" or "Journal Entry ID" if the term(s) used for the transaction ID criterion indication is not proper for the data analysis tool 116B. In the case that the processing entity grouped the data entries into potential transaction groups based upon one or more sets of values associated with other criterions understood by the processing entity at step 590, the data manipulation operations may comprise: a) generating a new criterion in the data entries, potentially by generating a new column; b) adding a transaction ID criterion indication associated to the new criterion, potentially by adding a header to the new column; and c) generating a transaction ID value associated with the new criterion for each data entry. To generate the transaction ID value for each data entry, the processing entity may copy the value associated with the criterion that was used to sort the data entries into the potential transaction groups that were deemed valid at step 592. Alternatively, for each data entry, the processing entity may combine the values associated with the two or more criterions that were used to sort the data entries into the potential transaction groups that were deemed valid at step 592. Alternatively, for each transaction group of data entries, the processing entity may generate a new unique reference that can be included as the transaction ID value in the data entries of the particular transaction group. In other implementations, the processing entity may generate transaction ID values in the data entries using a different technique that allows each transaction group to have a common value that is unique from the transaction ID values used by the other transaction groups. Further, in some implementations, a manual intervention may be initiated to determine data manipulation operations that could be used to assign transaction IDs to the data entries at step 594.

The processing entity may then conduct the data manipulation operations on the data entries in the data file as required to assign transaction IDs to the data entries at step 596. In some implementations, the conducting of the data manipulation operations only occurs after all data manipulation operations needed for all criterions have been determined while in other implementations the data manipulation operations for the transaction ID criterion may be conducted prior to or after the data manipulation operations related to other criterions. In some cases, the data manipulation operations may take the processing entity material time to process and it may be more efficient for the data manipulation operations to be conducted together. After the data manipulation operations are conducted at step 596, the processing entity can conclude that the transaction ID criterion is identified and in the correct format for further analysis.

In one example, the data entries may each comprise: values associated with a time period criterion that is relatively narrow, such as a date/time criterion that indicates a day and time of day to the minute or second in which the transaction related to the data entry occurred. In this example, the processing entity may sort the data entries using values associated with the time period criterion. In this case, the potential transaction groups could each comprise data entries with common values for the time period criterion or data entries with a limited range of values for the time period criterion. The transaction IDs assigned to each of the data entries could comprise the value in the data entry associated with the time period criterion or could comprise a unique reference assigned to the data entries in each transaction group. By using only the time period criterion, the processing entity is assuming that no two transactions occurred at the exact same minute or second or within the limited range of time, which is likely a fair assumption depending on the size of the entity represented by the general ledger file. If the entity is a large company or government, the assumption may not be appropriate for generating potential transaction groups and further narrowing should be done. In some embodiments, the date criterion may simply be used as a factor in generating a confidence score for the validity of the potential transaction groups.

In another example, the data entries may each comprise: values associated with an entry number criterion which indicates an order of entry for the data entries, likely over a particular period of time such as a day, week, month, quarter, year. In this example, the processing entity may sort the data entries using values associated with the entry number criterion. In this case, the potential transaction groups could each comprise data entries close in value for the entry number criterion. The transaction IDs assigned to each of the data entries could comprise a unique reference assigned to the data entries in each transaction group. By using only the entry number criterion, the processing entity is assuming that it can determine where the separation in data entries is from one transaction to another transaction, which may be assessed based on the behavior characteristics of the potential transaction groups (i.e. does the potential transaction groups balance). In some embodiments, the entry number criterion may simply be used as a factor in generating a confidence score for the validity of the potential transaction groups.

In another example, the data entries may each comprise: a) values associated with a time period criterion, such as a date or date/time criterion that indicates a day and time of day to the minute or second in which the transaction related to the data entry occurred; and b) values associated with an entry number criterion, a user ID criterion or a document ID criterion, which may be distinct criterions or may be incorporated in another criterion such as a string of signifiers in the memo criterion. In this example, the processing entity may sort the data entries using values associated with the time period criterion and then further sort the data entries using values associated with the other criterion such as the entry number criterion, user ID criterion, document ID criterion, or specific string of signifiers in the memo criterion linked to the user ID or document ID. In this case, the potential transaction groups could each comprise data entries with common values or values within a similar range for the time period criterion, similar range for the entry number criterion and common values for the other criterion. The transaction IDs assigned to each of the data entries could comprise a combination of the value in the data entry associated with the time period criterion and the value in the data entry associated with the other criterion such as the entry number, user ID or document ID. Alternatively, the transaction IDs assigned to each of the data entries could comprise a unique reference assigned to the data entries in each transaction group. By using the time period criterion and another identifier, the processing entity can have higher confidence that each group of data entries assigned a unique transaction ID is linked to a single transaction compared to only using the time period criterion.

In yet another example, the data entries may each comprise: a) values associated with a time-limited transaction ID criterion (or time-limited journal entry ID criterion); wherein the time-limited transaction ID is a unique reference for a transaction that occurs within a set time period, such as within a day, but where the references are reused in other time periods, such as each day; and b) values associated with a time period criterion, such as a date criterion. In this example, the processing entity may sort the data entries using values associated with the time period criterion and then further sort the data entries using values associated with the time-limited transaction ID criterion. In this case, the potential transaction groups could each comprise data entries with common values for the time period criterion and common values for the time-limited transaction ID criterion. The transaction IDs assigned to each of the data entries could comprise a combination of the value in the data entry associated with the time period criterion and the value in the data entry associated with the time-limited transaction ID criterion. Alternatively, the transaction IDs assigned to each of the data entries could comprise a unique reference assigned to the data entries in each transaction group.

Although illustrated in FIG. 5F as including all of steps 580 to 596, in some implementations, only a subset of these steps may be implemented or a combination of these steps may be implemented in a different order. For example, in some implementations, step 582 is removed and instead each identified set of values of step 580 are used to group sets of data entries into potential transaction groups at step 584 and the potential transaction groups checked for validity at step 586. In another implementation, the criterion indications associated with values in the data entries are not considered as potential transaction ID criterion indications and instead the processing entity operating the data ingress tool 116A only implements steps 590, 592, 594 and potentially 596. In another implementation, only sets of values already linked to a common criterion are considered as potential transaction IDs and the processing entity does not implement steps 590 and 592, instead triggering a manual intervention if sorting by one of the identified sets of values does not generate potential transaction groups that are valid at step 586.

Figures 6A, 6B:
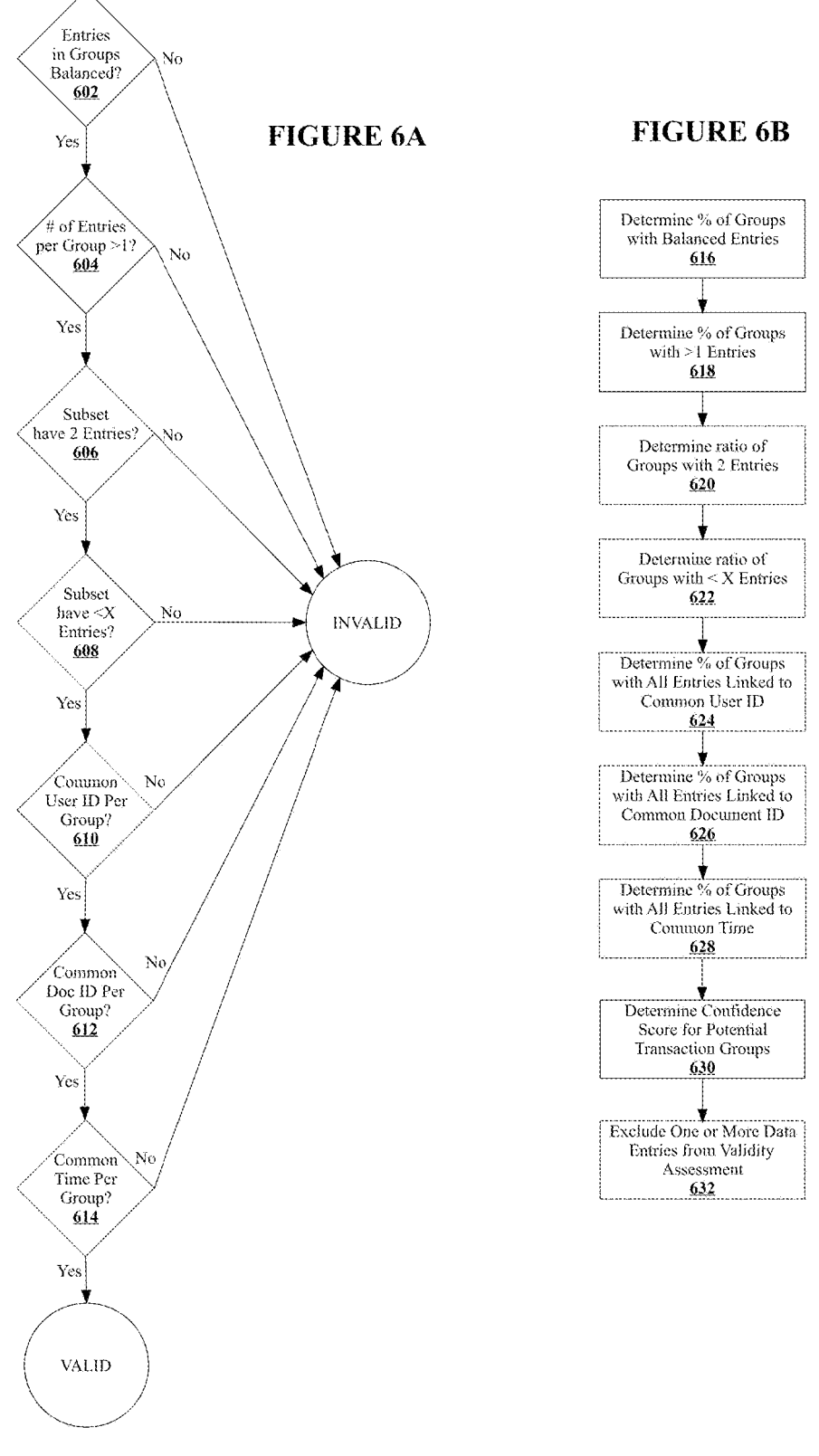
FIGS. 6A and 6B are flow charts depicting steps performed by the processing entity of FIG. 5F to determine validity of potential transaction groups according to embodiments of the present invention.

FIGS. 6A and 6B are flow charts depicting steps performed by the processing entity of FIG. 5F to determine validity of potential transaction groups according to embodiments of the present invention. As depicted, in determining if potential transaction groups are valid at step 586 or step 592, the processing entity may complete a number of tests on the potential transaction groups. These tests are illustrated as occurring in series in FIGS. 6A and 6B, though it should be understood that two or more of the tests could be implemented in parallel. Further, in some implementations, the process of determining if potential transaction groups are valid may comprise additional tests or may comprise fewer tests than illustrated in FIGS. 6A and 6B.

As shown in FIG. 6A, in this particular implementation, the processing entity determines if data entries in each potential transaction group are balanced at step 602 and determines if there are more than one data entries in each of the potential transaction groups at step 604. If either condition is not met, the potential transaction groups are considered invalid as both of these conditions may be considered mandatory in the process of FIG. 6A. In general ledgers, each transaction comprises two or more data entries and the amounts transferred between accounts must always balance to zero. In order to confirm that the data entries in each potential transaction group are balanced, the processing entity may sum all values associated with an amount criterion or sum up all values associated with a credit criterion and subtract all values associated with a debit criterion. If the total of these values across all data entries in a potential transaction group is zero, than the data entries in that potential transaction group may be associated with a single transaction. If all of the potential transaction groups have their amounts balanced across their data entries, than the potential transaction groups may each be associated with a single transaction. If any one of the potential transaction groups does not have data entries that balance to zero, than there is likely a problem with the potential transaction groups and the processing entity may deem the potential transaction groups as invalid. Similarly, if all of the potential transaction groups have their number of data entries being greater than one, than the potential transaction groups may be proper. If any one of the potential transaction groups has only a single data entry, than there is likely a problem with the potential transaction groups and the processing entity may deem the potential transaction groups as invalid. These two mandatory requirements are applicable to general ledger data files, though a set of mandatory requirements for potential transaction groups may be different with other data files comprising data entries with alternative criterions or with a less deterministic process (i.e. a probabilistic process of FIG. 6B).

As depicted in FIG. 6A, the processing entity may further implement a series of optional tests to determine whether the potential transaction groups are deemed to be valid. As shown, the processing entity may determine if a subset of the potential transaction groups comprise two data entries at step 606 and, if not, the processing entity may deem the potential transaction groups as invalid. Often in general ledgers, there is one or more transactions that only include two data entries as amounts may be transferred from one account to one other account. Having at least one of the potential transaction groups comprise only two data entries is a good sign that the potential transaction groups are valid and the data entries in each potential transaction group are associated with a single transaction. Having many of the potential transaction groups comprise only two data entries is an even better sign that the potential transaction groups are valid. Further, the processing entity may determine if a subset of the potential transaction groups comprise less than a minimum level X of data entries at step 608, where X may be a number such as 10, 8 or less. Generally, in general ledgers, a portion of the transactions only include a limited number of data entries. Having all potential transaction groups comprising more than X (such as 10) data entries is a bad sign and an indication that the potential transaction groups are invalid and the data entries in each potential transaction group are not associated with a single transaction.

Yet further, the processing entity may determine if all data entries in each potential transaction group are associated with the same user ID value at step 610, with the user ID value for each data entry potentially being indicated in a user ID criterion or potentially as a string of signifiers in another criterion such as a memo criterion. Generally, transactions take place by a single user and the data entries associated with a single transaction should be input by the same user. Therefore, if a potential transaction group comprises data entries linked to different user ID values, the processing entity may deem the potential transaction groups as invalid as it would appear that each potential transaction group is not linked to a single transaction. Further, the processing entity may determine if all data entries in each potential transaction group are associated with the same document ID value at step 612, with the document ID value for each data entry potentially being indicated in a document ID criterion or potentially as a string of signifiers in another criterion such as a memo criterion. Generally, all data entries in a single transaction would reference the same document or set of documents. Therefore, if a potential transaction group comprises data entries linked to different document ID values, the processing entity may deem the potential transaction groups as invalid as it would appear that each potential transaction group is not linked to a single transaction. Yet further, the processing entity may determine if all data entries in each potential transaction group are associated with the same time and/or date value at step 614, with the time and/or date value for each data entry potentially being indicated in a date criterion. Generally, all data entries associated with a single transaction would be entered at a very similar time, typically simultaneously or, if manually entered, within seconds or minutes. Therefore, if a potential transaction group comprises data entries linked to different time and/or date values, the processing entity may deem the potential transaction groups as invalid as it would appear that each potential transaction group is not linked to a single transaction.

As shown in FIG. 6A, in this implementation, if the processing entity determines that the outcome of all of steps 602, 604, 606, 608, 610 612 and 614 are positive, the processing entity may deem the potential transaction groups as valid and likely each of the potential transaction groups comprise data entries linked to a single unique transaction. It should be understood that all of the steps of FIG. 6A may not be implemented and additional steps may be added to test the validity of the potential transaction groups. Also, the steps of FIG. 6A may be processed in a different order and/or two or more of the steps may be processed in parallel.

FIG. 6B illustrates a flow chart similar to that of FIG. 6A but with steps 602, 604, 606, 608, 610, 612 and 614 replaced with probabilistic steps instead of deterministic steps. As depicted in FIG. 6A, if any of the steps 602, 604, 606, 608, 610, 612 or 614 are negative, the processing entity may determine that the potential transaction groups are invalid. In FIG. 6B, the processing entity may determine a percentage of the potential transaction groups in which all of the data entries in the potential transaction group are balanced at step 616; determine a percentage of the potential transaction groups with more than one data entry at step 618; determine a percentage of the potential transaction groups that comprise two data entries at step 620; determine a percentage of the potential transaction groups that comprise less than a minimum level X of data entries at step 622; determine a percentage of the potential transaction groups in which all data entries in the potential transaction group are associated with the same user ID value at step 624; determine a percentage of the potential transaction groups in which all data entries in the potential transaction group are associated with the same document ID value at step 626; and determine a percentage of the potential transaction groups in which all data entries in the potential transaction group are associated with the same time and/or date value at step 628.

At step 630, the processing entity may then determine a confidence score for the potential transaction groups based on the results of one or more of steps 616, 618, 620, 622, 624, 626 and 628. In this case, the processing entity may determine a probability that the potential transaction groups are valid and the data entries in each potential transaction group are linked to a single transaction, unique from all other groups. The calculation of the confidence score may be accomplished in many ways using different algorithms that may combine a variety of variables related to steps 616, 618, 620, 622, 624, 626, 628 and potentially other tests performed by the processing entity or other factors known to the processing entity. In some embodiments, a high percentage for steps 616 and 618 may be deemed important to calculating a high confidence score. Further, in some cases, the ratios for steps 620 and/or 622 may be compared to an expected range of ratios when calculating the confidence score with the confidence score increasing if the ratio(s) are within expected range of ratios. Further, a high percentage for steps 624, 626 and 628 may be used to improve the confidence score. The processing entity may have a minimum confidence score required to deem the potential transaction groups as valid and, if the minimum confidence score is not met, the processing entity may either deem the potential transaction groups as invalid or, in some cases, may trigger a manual intervention to confirm whether the potential transaction groups are valid if a confidence score is below a threshold. In some cases, the minimum confidence score may be flexible based on user settings or may not be used and the confidence score may simply be displayed or used by the data analysis tool when processing the data file.

In some embodiments, the processing entity may further identify one or more potential transaction groups or data entries in potential transaction groups that cause the percentages of steps 616, 618, 624, 626 and/or 628 to be lower. In some cases, one or more data entries may cause the percentages of a plurality of steps 616, 618, 624, 626 and/or 628 to be lower. In these cases, as shown at step 632, the processing entity may exclude one of more data entries and rerun the calculations for steps 616 to 630 to determine if the confidence score increases to the minimum confidence score. These excluded data entries may be entries that include typos or potentially entries that do not represent the same type of information as the other data entries. For instance, the excluded data entries may be opening or closing balances, rather than distinct data entries associated with a transaction.

It should be understood that all of the steps of FIG. 6B may not be implemented and additional steps may be added to test the validity of the potential transaction groups. Also, the steps of FIG. 6B may be processed in a different order and/or two or more of the steps may be processed in parallel. Further, step 632 of excluding one or more data entries may further apply in the deterministic process of FIG. 6A.

Further, it should be understood that a mix of the steps of FIGS. 6A and 6B may be implemented in which a portion of the steps are deterministic and directly determine validity while other steps are probabilistic and are used to calculate a confidence score that is measured against a minimum acceptable confidence score.

In determining the validity of the potential transaction groups, the processing entity may generate a histogram that summarizes the number of data entries linked to each of the potential transaction groups. In this way, the processing entity or a person in the case of a manual intervention can quickly review the number of potential transaction groups with only a single data entry (a sign that the potential transaction groups are invalid), the number of potential transaction groups with two data entries (typically many transactions only include two accounts and therefore only two data entries would be included in a transaction group), the number of potential transaction groups with two to five data entries (typically a majority of transactions would include two to five data entries per transaction), the number of potential transaction groups with two to ten data entries (typically most transactions would include less than ten data entries per transaction) and the spread of potential transaction groups that over ten data entries (this is not typical and a high proportion of potential transaction groups with more than ten data entries may indicate a systematic flaw in how the potential transaction groups were formed and the potential invalidity of the potential transaction groups). It should be understood that, although these limits that could be observed on a histogram are signs of the validity or invalidity of the potential transaction groups, each data file may have a very different spread of number of data entries per transaction and the processing entity may need to be flexible when determining whether potential transaction groups are valid. In some implementations, the processing entity may learn further conditions or signs of validity or invalidity of potential transaction groups and apply further tests to potential transaction groups based on these learned conditions or signs of validity or invalidity.

Table 3 illustrates an example set of data entries that may be a subset of data entries in a general ledger data file.

TABLE 3

| EXAMPLE OF DATA ENTRIES | | | | | |
|---|---|---|---|---|---|
| Account # | Account Name | Journal ID | Posted Date | Amount | Currency |
| 1100 | Accounts Receivable | 123 | 43191 | 8097.26 | CAD |
| 4005 | Sales London/ South East | 123 | 43191 | −6747.72 | CAD |
| 2200 | Sales Tax Control Account | 123 | 43191 | −1349.54 | CAD |
| 2100 | Accounts Payable | 124 | 43191 | −2146.27 | CAD |
| 7100 | Rent | 124 | 43191 | 1788.56 | CAD |
| 2201 | Purchase Tax Control Account | 124 | 43191 | 357.71 | CAD |
| 2100 | Accounts Payable | 125 | 43191 | −461.7 | CAD |
| 7103 | General Rates | 125 | 43191 | 384.75 | CAD |
| 2201 | Purchase Tax Control Account | 125 | 43191 | 76.95 | CAD |
| 2100 | Accounts Payable | 126 | 43191 | −3376.48 | CAD |
| 7100 | Rent | 126 | 43191 | 2813.73 | CAD |
| 2201 | Purchase Tax Control Account | 126 | 43191 | 562.75 | CAD |
| 2100 | Accounts Payable | 127 | 43191 | −267.41 | CAD |
| 7101 | Marketing | 127 | 43191 | 222.84 | CAD |
| 2201 | Purchase Tax Control Account | 127 | 43191 | 44.57 | CAD |

TABLE 3-continued

| EXAMPLE OF DATA ENTRIES | | | | | |
|---|---|---|---|---|---|
| Account # | Account Name | Journal ID | Posted Date | Amount | Currency |
| 2100 | Accounts Payable | 128 | 43191 | −798.88 | CAD |
| 7103 | General Rates | 128 | 43191 | 665.73 | CAD |
| 2201 | Purchase Tax Control Account | 128 | 43191 | 133.15 | CAD |
| 2100 | Accounts Payable | 129 | 43191 | −2323.33 | CAD |
| 7100 | Rent | 129 | 43191 | 1936.11 | CAD |
| 2201 | Purchase Tax Control Account | 129 | 43191 | 387.22 | CAD |
| 2100 | Accounts Payable | 130 | 43191 | −69.68 | CAD |
| 7100 | Rent | 130 | 43191 | 58.07 | CAD |
| 2201 | Purchase Tax Control Account | 130 | 43191 | 11.61 | CAD |

As is shown in Table 3, there are six criterions in this particular example with criterion indications "Account #", "Account Name", "Journal ID", "Posted Date", "Amount" and "Currency" shown on the first row. In processing the data file comprising the data entries of Table 3, the processing entity operating the data ingress tool 116A may perform a plurality of steps to analyze the data and ensure the data is compatible for the data analysis tool 116B. To illustrate how the processes of FIGS. 5A-5F may operate in a specific example, the processing of the data file that comprises the data entries of Table 3 is described.

When processing the data file comprising the data entries of Table 3, in identifying different sets of values linked to a common criterion at step 502, the processing entity may identify the "Posted Date" criterion indication as a date criterion indication at step 504 and then begin to analyze the values in this column to determine the probable date format used. In this case, although not illustrated in Table 3, the processing entity may determine that the numeric signifiers in the values associated with the date criterion are all over 40000 and increment slowly by one with five out of every seven numbers being utilized. This information may allow the processing entity to determine that the values associated with the date criterion represent individual days in which most posted dates take place Monday to Friday (5 out of 7 days of the week). Based on the range of the numeric signifiers and frequency of change, the processing entity may determine at step 514 that the values are converted representations made by Microsoft Excel, a popular spreadsheet software program, which, in some circumstances, converts dates to numbers indicating the number of days since Dec. 31, 1899. In this case, the processing entity would determine that the date format may not be supported by the data analysis tool 116B at step 516 and may determine data manipulation operations to convert the values associated with the date criterion to a supported format at step 518. In one example, this may convert the numeric signifiers "43191" to "2018-04-01" representing the date Apr. 1, 2018. Other values associated with the date criterion that may be in other data entries (not shown) could further be converted to the supported date format.

When processing the data file comprising the data entries of Table 3, in identifying different sets of values linked to a common criterion at step 522, the processing entity may identify the "Amount" criterion indication as an amount criterion indication at step 524 and then begin to analyze the values in this column to determine if the amount format used is supported by the data analysis tool 116B at step 530. In this case, the processing entity may determine that the numeric signifiers in the values associated with the amount criterion include negative signifiers and therefore are combined column with credit and debit amounts combined. For some data analysis tools, separate credit and debit columns are the proper format for the amount criterion. Therefore, the processing entity may determine the data manipulation operations at step 532 to be performed include generating two new columns, applying a criterion indication or header of "credits" to one column, applying a criterion indication or header of "debits" to the other column, copying the values associated with the amount criterion into the column labelled as "credits" if the value associated with the amount criterion does not comprise a negative signifier, copying the values associated with the amount criterion into the column labelled as "debits" if the value associated with the amount criterion does comprise a negative signifier while removing the negative signifier, and deleting the column associated labelled as "amount". After these data manipulation operations are performed, the values associated with the amount criterion can be considered the two columns of values associated with the credit and debit criterion indications.

When processing the data file comprising the data entries of Table 3, in identifying different sets of values linked to a common criterion at step 536, the processing entity may identify the "Account Name" criterion indication as an account criterion indication at step 538 and then begin to analyze the values in this column to determine if the account format used is supported by the data analysis tool 116B at step 544. In this case, the processing entity may determine that the signifiers in the values associated with the account criterion are in a supported format and no data manipulation operations may be necessary. In this implementation, the processing entity may recognize one or more of the names as potentially relevant account names; for example "Accounts Payable".

When processing the data file comprising the data entries of Table 3, in identifying different sets of values linked to a common criterion at step 550, the processing entity may identify the "Currency" criterion indication as a criterion indication that is not applicable to other required criterion and could therefore be included in a memo criterion at step 552 and then begin to analyze the values in this column to determine if the memo format used is supported by the data analysis tool 116B at step 558. In this case, the processing entity may determine that the signifiers in the values associated with the currency criterion are in a supported format and the only data manipulation operation that may be necessary is to change the criterion indication from the label "Currency" to "Memo", though in some implementations this would be an unnecessary data manipulation operation.

When processing the data file comprising the data entries of Table 3, in identifying different sets of values linked to a common criterion at step 564, the processing entity may identify the "Account #" criterion indication as an account ID criterion indication at step 566 and then begin to analyze the values in this column to determine if the account ID format used is supported by the data analysis tool 116B at step 572. In this case, the processing entity may determine that the signifiers in the values associated with the account ID criterion are in a recognized account ID naming structure and no data manipulation operations may be necessary.

When processing the data file comprising the data entries of Table 3, in identifying different sets of values linked to a common criterion at step 580, the processing entity may identify the "Journal #" criterion indication as a potential transaction ID criterion indication at step 582 and then sort the data entries based on the values in this column to generate potential transaction groups at step 584. In the case of Table 3, the values in the "Journal #" are time-limited transaction identifiers with the number used reset each day. In this case, when a larger set of data entries than are illustrated in Table 3 are shown, duplicate values would be displayed each day in the "Journal #" column. After generating potential transaction groups at step 584, the processing entity may attempt to validate that the potential transaction groups at step 586 and determine if the values associated with the potential transaction criterion indication of "Journal #" can be used as transaction IDs. In this case, where the values in the column "Journal #" are time-limited transaction identifiers, sorting by these values will result in data entries from a plurality of transactions being grouped in a single potential transaction group. In this case, the processing entity may determine: a) entries in all potential transaction groups balance as data entries for each of the transactions in each of the potential transaction groups would balance; and b) all of the potential transaction groups would comprise two or more data entries. Therefore, if only these tests were applied by the processing entity, the processing entity may conclude that the potential transaction groups are valid. The processing entity may further determine if any of the potential transaction groups only includes two data entries; and/or if any of the potential transaction groups has less than X data entries. In these cases, the processing entity may determine that no potential transaction group comprises only two data entries since the values in the "Journal #" column may be repeated over many days. Further, the processing entity may determine that no potential transaction group comprises less than a set number X data entries as each potential transaction group may comprise tens or hundreds of data entries depending on the number of days of data that is included in the data file. The processing entity may further determine if any of the data entries in any of the potential transaction groups have values associated with the date criterion that are different. In this case, the processing entity would determine that each potential transaction group comprises data entries with different values associated with the date criterion, this being a clear indication of invalidity for the potential transaction groups and an indication that the values in the "Journal #" column should not be used as transaction IDs. Yet further, although the data entries in Table 3 do not include user IDs or document IDs, in other implementations, the processing entity may review values associated with user IDs and/or document IDs. In this case, likely some of the user IDs and/or document IDs in data entries of potential transaction groups would be different as the data entries would be related to different transactions that may have been entered by different users and/or different transactions that are related to different documentation (ex. invoices, purchase orders, etc.).

After determining invalidity of the potential transaction groups formed by sorting the data entries by the values associated with the "Journal #" criterion indication, the processing entity may conclude that there are no sets of values that can be used as transaction IDs in the data entries as currently formed at step 588. In this case, the processing entity may attempt to group sets of data entries into potential transaction groups using one or more sets of values in the data entries at step 590. The processing entity may attempt many different potential transaction groups and may attempt to validate each grouping of data entries at step 592. In one scenario, the processing entity may attempt to sort the data entries by values associated with the date criterion, but it would find that the potential transaction groups formed by sorting the data entries by values associated with the date criterion would not pass the validity tests. Further, the processing entity may attempt to sort the data entries by values associated with the date criterion and further by values associated with the Journal #criterion. In this case, the potential transaction groups formed may pass all of the validity tests of FIG. 6A or FIG. 6B. At this point, the processing entity may determine the data manipulation operations required to assign transaction IDs to the data entries at step 594. In one implementation, the data manipulation operations may comprise generating a new column, labelling the new column as "transaction ID", adding values for each data entry into the new column by copying signifiers from values associated with the date criterion and copying signifiers from values associated with the Journal #criterion. For instance, if, for a particular data entry, the value associated with the date criterion is 2018-04-01 and the value associated with the Journal #criterion is 126, the assigned value to be added to the column associated with the transaction ID criterion may be 12620180401 or another combination of the signifiers. Alternatively, the processing entity could simply assign the data entries in each transaction group with a unique reference based on a naming structure decided by the data ingress tool 116A.

After competing all of the steps to analyze the data entries of Table 3, the processing entity may conduct the data manipulation operations determined to be done for each of the required criterions in order to make the data file compatible to the data analysis tool 116B. In one particular implementation, the data entries of Table 3 could be reformatted to the data entries of Table 4 below.

and other formatting requirements may be implemented in other embodiments of the present invention. For instance, in some embodiments, the data file may comprise financial instrument trading data such as data from a stock exchange. In this case, transaction ID criterion may need to be generated based on values associated with specific date/time criterion and user ID criterion. In some cases, trading transaction data may require criterions such as a buyer name criterion and a seller name criterion, either of which may comprise an identifier of a person or business entity including, but not limited to, a name of a person, other unique identifier of a person such as a social insurance number, a name of a business entity or a unique identifier of a business entity such as a business number. Further, address criterion may be required for one or both of the buyer entity and the seller entity. These criterions may be required to allow the processing entity to do analysis on the buyer and/or seller in transactions to determine if either one of them are related to an entity on a deny party list that may be sanctioned or otherwise not authorized to conduct a particular type of trade transaction. For instance, a seller entity may need to "know your customer" in order to satisfy regulations designed to mitigate money laundering and/or to satisfy regulations requiring deny party checks. Further, the processing entity may need to understand the beneficial owner and may check addresses and accounts used in trade transactions to determine if buyer and seller parties are arms length parties. In these scenarios, the use of a data ingress tool similar to that described herein may be used to ensure all required criteri-

TABLE 4

EXAMPLE OF REFORMATTED DATA ENTRIES

| Account ID | Account | Transaction ID | Date | Credits | Debits | Memo |
|---|---|---|---|---|---|---|
| 1100 | Accounts Receivable | 12320180401 | Apr. 1, 2018 | 8097.26 | 0 | CAD |
| 4005 | Sales London/South East | 12320180401 | Apr. 1, 2018 | 0 | 6747.72 | CAD |
| 2200 | Sales Tax Control Account | 12320180401 | Apr. 1, 2018 | 0 | 1349.54 | CAD |
| 2100 | Accounts Payable | 12420180401 | Apr. 1, 2018 | 0 | 2146.27 | CAD |
| 7100 | Rent | 12420180401 | Apr. 1, 2018 | 1788.56 | 0 | CAD |
| 2201 | Purchase Tax Control Account | 12420180401 | Apr. 1, 2018 | 357.71 | 0 | CAD |
| 2100 | Accounts Payable | 12520180401 | Apr. 1, 2018 | 0 | 461.7 | CAD |
| 7103 | General Rates | 12520180401 | Apr. 1, 2018 | 384.75 | 0 | CAD |
| 2201 | Purchase Tax Control Account | 12520180401 | Apr. 1, 2018 | 76.95 | 0 | CAD |
| 2100 | Accounts Payable | 12620180401 | Apr. 1, 2018 | 0 | 3376.48 | CAD |
| 7100 | Rent | 12620180401 | Apr. 1, 2018 | 2813.73 | 0 | CAD |
| 2201 | Purchase Tax Control Account | 12620180401 | Apr. 1, 2018 | 562.75 | 0 | CAD |
| 2100 | Accounts Payable | 12720180401 | Apr. 1, 2018 | 0 | 267.41 | CAD |
| 7101 | Marketing | 12720180401 | Apr. 1, 2018 | 222.84 | 0 | CAD |
| 2201 | Purchase Tax Control Account | 12720180401 | Apr. 1, 2018 | 44.57 | 0 | CAD |
| 2100 | Accounts Payable | 12820180401 | Apr. 1, 2018 | 0 | 798.88 | CAD |
| 7103 | General Rates | 12820180401 | Apr. 1, 2018 | 665.73 | 0 | CAD |
| 2201 | Purchase Tax Control Account | 12820180401 | Apr. 1, 2018 | 133.15 | 0 | CAD |
| 2100 | Accounts Payable | 12920180401 | Apr. 1, 2018 | 0 | 2323.33 | CAD |
| 7100 | Rent | 12920180401 | Apr. 1, 2018 | 1936.11 | 0 | CAD |
| 2201 | Purchase Tax Control Account | 12920180401 | Apr. 1, 2018 | 387.22 | 0 | CAD |
| 2100 | Accounts Payable | 13020180401 | Apr. 1, 2018 | 0 | 69.68 | CAD |
| 7100 | Rent | 13020180401 | Apr. 1, 2018 | 58.07 | 0 | CAD |
| 2201 | Purchase Tax Control Account | 13020180401 | Apr. 1, 2018 | 11.61 | 0 | CAD |

It should be understood that the reformatting of the data entries of Table 3 may be done in a different manner and with different required criterions and different required formatting than was described and illustrated in Table 4. The scope of the present invention should not be limited to the specific requirements of this example.

Although the descriptions of embodiments of the present invention are focused on analysis and modification of data files comprising general ledger data, it should be understood that the present invention should not be limited to this embodiments. Other data sources, other required criterions ons are present and formatted properly for a specific data analysis tool that is to be run.

In another embodiment, the data file may comprise health data that may be used by a data analysis tool. In this case, specific required criterion could be specified and embedded in a data ingress tool. Similar to the embodiments described herein, a processing entity may implement the data ingress tool and semantically determine values associated with the required criterions and determine data manipulation operations that may be necessary to reformat the values associated with the required criterions in order to be processed by the data analysis tool. Further, similar to described with reference to FIG. 2A, there may be signatures in the data files comprising health data that would indicate a specific format of the data file which could then allow the processing entity to determine a predetermined set of data manipulation operations to apply to the data file. Yet further, similar to described with reference to FIG. 2B, the processing entity may truncate the data entries in the data file to remove all values not associated with a required criterion and/or remove identifying information from the data prior to transmitting the data file to the data analysis tool for processing. In this case, private health information may be removed while still enabling processing of the data entries for a variety of important purposes.

In yet other embodiments, the data file being processed may comprise a block chain which is a ledger with unique validation identifiers. In this case, a data ingress tool could prepare the data file similar to that described herein with specific required criterion and requirements for values associated with the required criterion. In this case, specific algorithms could be applied to ensure the unique validation identifier meets specific requirements. For instance, the processing entity may determine if all validation identifiers are unique in the data file and meet specific formatting requirements.

It should be understood that the process of FIG. 5F, or modified versions thereof, may be used to generate transaction identifiers for data entries without such values. Specifically, a processing entity may group data entries into potential transaction groups, validate the potential transaction groups and then assign transaction IDs to data entries if the potential transaction groups are valid. This process can be useful in a wide range of applications in which transaction connections between data entries are required for future data analysis. For example, if a general ledger is generated from a selection of unconnected sources, a processing entity may need to review the resulting data entries to link data entries into transaction groups in which each transaction group comprises a plurality of data entries linked to a single transaction. In one scenario, sets of receipts, bank statements, credit card statements, documents such as invoices and cheque stubs may be entered or scanned into a general ledger without proper linkages based on transactions. In this case, a processing entity may operate a data ingress tool similar to that described herein to group the data entries into separate distinct transactions and then assign unique transaction IDs to the data entries, thus enabling a data analysis tool to properly understand the transaction correlations between data entries.

Although various embodiments of the present invention have been described and illustrated, it will be apparent to those skilled in the art that numerous modifications and variations can be made without departing from the scope of the invention, which is defined in the appended claims.

What is claimed is:

1. A method implemented by a computing apparatus for shaping data in a general ledger into a desired format, the method comprising:

receiving the general ledger, wherein the general ledger comprises a plurality of data entries without proper linkages to identify transactions in the general ledger and the desired format having all of the data entries linked to one of a plurality of transactions with unique transaction identifiers, and wherein each of the data entries having a value for an amount criterion and a value for each of a plurality of other criterions;

grouping sets of the data entries in the general ledger into potential transaction groups based on similar values in at least one transaction-related criterion in the data entries, the transaction-related criterion comprising one of the other criterions;

determining validity of the potential transaction groups by evaluating one or more desired group characteristics of the potential transaction groups, wherein each of the desired group characteristics provide an indication that the data entries in each of the potential transaction groups are associated with a common transaction; and assigning transaction identifiers to the data entries based on their potential transaction groups if the potential transaction groups are validated.

2. The method according to claim 1, wherein determining validity of the potential transaction groups comprises determining a probability that the data entries in each of the potential transaction groups are associated with a common transaction based on the evaluation of the desired group characteristics and determining if the probability is greater than a predetermined probability threshold for potential transaction groups to be considered valid.

3. The method according to claim 1, wherein evaluating a first one of the desired group characteristics of the potential transaction groups comprises determining a first proportion of the potential transaction groups that have values in the amount criterions of all of their data entries balance to zero and determining validity of the potential transaction groups based at least partially on the first proportion of the potential transaction groups.

4. The method according to claim 3, wherein determining validity of the potential transaction groups comprises determining if the first proportion comprises all of the potential transaction groups.

5. The method according to claim 3, wherein determining validity of the potential transaction groups comprises determining if the first proportion is greater than a predetermined minimum proportion of potential transaction groups that have values in the amount criterions of all of their data entries balance to zero.

6. The method according to claim 3, wherein evaluating a second one of the desired group characteristics bf the potential transaction groups comprises determining a second proportion of the potential transaction groups that have a quantity of data entries greater than one and determining validity of the potential transaction groups based at least partially on the second proportion of the potential transaction groups.

7. The method according to claim 6, wherein determining validity of the potential transaction groups comprises determining if the second proportion comprises all of the potential transaction groups.

8. The method according to claim 3, wherein evaluating a second one of the desired group characteristics of the potential transaction groups comprises determining a second proportion of the potential transaction groups that have a quantity of data entries within a predetermined range and determining validity of the potential transaction groups based at least partially on the second proportion of the potential transaction groups.

9. The method according to claim 3, wherein evaluating a second one of the desired group characteristics of the potential transaction groups comprises determining a second proportion of the potential transaction groups that have all data entries with a common value for a user identifier indicating a common user entered the data entries and determining validity of the potential transaction groups based at least partially on the second proportion of the potential transaction groups.

10. The method according to claim 3, wherein evaluating a second one of the desired group characteristics of the potential transaction groups comprises determining a second proportion of the potential transaction groups that have all data entries with similar values for temporal information and determining validity of the potential transaction groups based at least partially on the second proportion of the potential transaction groups.

11. The method according to claim 1, wherein the transaction-related criterion comprises at least one of:
a temporal criterion and, for each data entry, a value in the transaction-related criterion comprises temporal information for the data entry; and
a criterion associated with document identifiers and, for each data entry, a value in the transaction-related criterion comprises a document identifier for the data entry indicating a document linked to a transaction.

12. The method according to claim 1, wherein the grouping sets of the data entries into potential transaction groups is based on first similar values in a first transaction-related criterion in the data entries and second similar values in a second transaction-related criterion in the data entries; wherein the first transaction-related criterion comprises a temporal criterion and, for each data entry, a value in the first transaction-related criterion comprises temporal information for the data entry; and wherein the second transaction-related criterion comprises at least one of:
a criterion associated with time-limited transaction identifiers and, for each data entry, a value in the second transaction-related criterion comprises a transaction identifier for the data entry unique for a particular limited time period;
a criterion associated with entry numbers and, for each data entry, a value in the second transaction-related criterion comprises an entry number for the data entry indicating an order of entry of the data entry;
a criterion associated with user identifiers and, for each data entry, a value in the second transaction-related criterion comprises a user identifier for the data entry indicating a user that entered the data entry; and
a criterion associated with document identifiers and, for each data entry, a value in the second transaction-related criterion comprises a document identifier for the data entry indicating a document linked to a transaction.

13. The method according to claim 1, wherein assigning transaction identifiers to the data entries comprises generating a transaction identifier criterion in each of the data entries and assigning a common transaction identifier to all of the data entries in each of the potential transaction groups, wherein each of the transaction identifiers across the potential transaction groups is unique.

14. The method according to claim 1, wherein assigning transaction identifiers to the data entries comprises assigning the transaction-related criterion as a transaction identifier criterion.

15. The method according to claim 1 further comprising: filtering the data entries into a subset of data entries based on values in one of the other criterions across the data entries; wherein determining validity of the potential transaction groups comprises determining validity of the potential transaction groups that include the subset of data entries only; and wherein the assigning transaction identifiers to the data entries comprises assigning transaction identifiers to all of the data entries in the general ledger based on their potential transaction groups if the potential transaction groups are validated.

16. The method according to claim 15, wherein the other criterion used for filtering the data entries comprises a temporal criterion and, for each data entry, a value in the other criterion comprises temporal information for the data entry.

17. A computing apparatus for shaping data in a general ledger into a desired format, the computing apparatus comprising:
a processing entity operable to receive the general ledger, wherein the general ledger comprises a plurality of data entries without proper linkages to identify transactions in the general ledger and the desired format having all of the data entries linked to one of a plurality of transactions with unique transaction identifiers, and wherein each of the data entries having a value for an amount criterion and a value for each of a plurality of other criterions; to group sets of the data entries in the general ledger into potential transaction groups based on similar values in at least one transaction-related criterion in the data entries, the transaction-related criterion comprising one of the other criterions; to determine validity of the potential transaction groups by evaluating one or more desired group characteristics of the potential transaction groups, wherein each of the desired group characteristics provide an indication that the data entries in each of the potential transaction groups are associated with a common transaction; and to assign transaction identifiers to the data entries based on their potential transaction groups if the potential transaction groups are validated.

18. The computing apparatus according to claim 17, wherein, to determine validity of the potential transaction groups, the processing entity is operable to determine a probability that the data entries in each of the potential transaction groups are associated with a common transaction based on the evaluation of the desired group characteristics and to determine if the probability is greater than a predetermined probability threshold for potential transaction groups to be considered valid.

19. The computing apparatus according to claim 17, wherein, to evaluate a first one of the desired group characteristics of the potential transaction groups, the processing entity is operable to determine a first proportion of the potential transaction groups that have values in the amount criterions of all of their data entries balance to zero and to determine validity of the potential transaction groups based at least partially on the first proportion of the potential transaction groups.

20. The computing apparatus according to claim 19, wherein, to evaluate a second one of the desired group characteristics of the potential transaction groups, the processing entity is operable to determine a second proportion of the potential transaction groups that have a quantity of data entries within a predetermined range and to determine validity of the potential transaction groups based at least partially on the second proportion of the potential transaction groups.

21. The computing apparatus according to claim 19, wherein, to evaluate a second one of the desired group characteristics of the potential transaction groups, the processing entity is operable to determine a second proportion of the potential transaction groups that have all data entries with a common value for a user identifier indicating a common user entered the data entries and to determine validity of the potential transaction groups based at least partially on the second proportion of the potential transaction groups.

22. The computing apparatus according to claim 19, wherein, to evaluate a second one of the desired group characteristics of the potential transaction groups, the processing entity is operable to determine a second proportion of the potential transaction groups that have all data entries with similar values for temporal information and to determine validity of the potential transaction groups based at least partially on the second proportion of the potential transaction groups.

23. The computing apparatus according to claim 17, wherein the transaction-related criterion comprises at least one of:

a temporal criterion and, for each data entry, a value in the transaction-related criterion comprises temporal information for the data entry; and a criterion associated with document identifiers and, for each data entry, a value in the transaction-related criterion comprises a document identifier for the data entry indicating a document linked to a transaction.

24. The computing apparatus according to claim 17, wherein, to group sets of the data entries into potential transaction groups, the processing entity is operable to group sets of the data entries based on first similar values in a first transaction-related criterion in the data entries and second similar values in a second transaction-related criterion in the data entries; wherein the first transaction-related criterion comprises a temporal criterion and, for each data entry, a value in the first transaction-related criterion comprises temporal information for the data entry; and wherein the second transaction-related criterion comprises at least one of:

a criterion associated with time-limited transaction identifiers and, for each data entry, a value in the second transaction-related criterion comprises a transaction identifier for the data entry unique for a particular limited time period;

a criterion associated with entry numbers and, for each data entry, a value in the second transaction-related criterion comprises an entry number for the data entry indicating an order of entry of the data entry;

a criterion associated with user identifiers and, for each data entry, a value in the second transaction-related criterion comprises a user identifier for the data entry indicating a user that entered the data entry; and a criterion associated with document identifiers and, for each data entry, a value in the second transaction-related criterion comprises a document identifier for the data entry indicating a document linked to a transaction.

25. The computing apparatus according to claim 17, wherein, to assign transaction identifiers to the data entries, the processing entity is operable to generate a transaction identifier criterion in each of the data entries and to assign a common transaction identifier to all of the data entries in each of the potential transaction groups, wherein each of the transaction identifiers across the potential transaction groups is unique.

26. The computing apparatus according to claim 17, wherein, to assign transaction identifiers to the data entries, the processing entity is operable to assign the transaction-related criterion as a transaction identifier criterion.

27. Non-transitory computer-readable media containing a program element executable by a computing system to perform a method for shaping data in a general ledger into a desired format the computer-readable media comprising:

first program code for receiving the general ledger, wherein the general ledger comprises a plurality of data entries without proper linkages to identify transactions in the general ledger and the desired format having all of the data entries linked to one of a plurality of transactions with unique transaction identifiers, and wherein each of the data entries having a value for an amount criterion and a value for each of a plurality of other criterions;

second program code for grouping sets of the data entries in the general ledger into potential transaction groups based on similar values in at least one transaction-related criterion in the data entries, the transaction-related criterion comprising one of the other criterions;

third program code for determining validity of the potential transaction groups by evaluating one or more desired group characteristics of the potential transaction groups, wherein each of the desired group characteristics provide an indication that the data entries in each of the potential transaction groups are associated with a common transaction; and fourth program code for assigning transaction identifiers to the data entries based on their potential transaction groups if the potential transaction groups are validated.

\* \* \* \* \*